(12) United States Patent
Hellman et al.

(10) Patent No.: US 11,741,849 B2
(45) Date of Patent: Aug. 29, 2023

(54) SYSTEMS AND METHODS FOR INTERFACE-BASED MACHINE LEARNING MODEL OUTPUT CUSTOMIZATION

(71) Applicant: Pearson Education, Inc., Hoboken, NJ (US)

(72) Inventors: Scott Hellman, Dallas, TX (US);
William Murray, Fort Collins, CO (US); Kyle Habermehl, Niwot, CO (US); Alok Baikadi, Boulder, CO (US); Jill Budden, Boulder, CO (US); Andrew Gorman, Bloomington, MN (US); Mark Rosenstein, Boulder, CO (US); Lee Becker, Boulder, CO (US); Stephen Hopkins, Huntington Station, NY (US); Peter Foltz, Boulder, CO (US)

(73) Assignee: PEARSON EDUCATION, INC., Bloomington, MN (US)

( * ) Notice: Subject to any disclaimer, the term of this patent is extended or adjusted under 35 U.S.C. 154(b) by 752 days.

(21) Appl. No.: 16/281,048

(22) Filed: Feb. 20, 2019

(65) Prior Publication Data
US 2019/0259293 A1    Aug. 22, 2019

Related U.S. Application Data

(60) Provisional application No. 62/739,015, filed on Sep. 28, 2018, provisional application No. 62/632,924, filed on Feb. 20, 2018.

(51) Int. Cl.
*G09B 7/02* (2006.01)
*G06F 16/904* (2019.01)
(Continued)

(52) U.S. Cl.
CPC ............. *G09B 7/02* (2013.01); *G06F 3/0481* (2013.01); *G06F 9/451* (2018.02); *G06F 16/40* (2019.01);
(Continued)

(58) Field of Classification Search
CPC .. G06K 9/6257; G06K 9/6256; G06K 9/6262; G06K 9/6263; G06F 9/451;
(Continued)

(56) References Cited

U.S. PATENT DOCUMENTS 6,260,033 B1   7/2001   Tatsuoka
7,533,019 B1   5/2009   Hakkani-Tur et al.
(Continued)

FOREIGN PATENT DOCUMENTS

KR   10-2014-0052265 A   5/2014
KR   1020140052265 A   5/2014
(Continued)

OTHER PUBLICATIONS

Tao et al., Ruber: An Unsupervised Method for Automatic Evaulation of Open-Domain Dialog Systems, arXiv:1701.03079v2 [cs.CL], Jul. 16, 2017, 10 pp.
(Continued)

*Primary Examiner* — Hope C Sheffield
(74) *Attorney, Agent, or Firm* — QUARLES & BRADY LLP

(57) ABSTRACT

Systems and methods for automated custom training of a scoring model are disclosed herein. The method include: receiving a plurality of responses received from a plurality of students in response to providing of a prompt; identifying an evaluation model relevant to the provided prompt, which evaluation model can be a machine learning model trained to output a score relevant to at least portions of a response; generating a training indicator that provides a graphical
(Continued)

depiction of the degree to which the identified evaluation model is trained; determining a training status of the model; receiving at least one evaluation input when the model is identified as insufficiently trained; updating training of the evaluation model based on the at least one received evaluation input; and controlling the training indicator to reflect the degree to which the evaluation model is trained subsequent to the updating of the training of the evaluation model.

18 Claims, 34 Drawing Sheets

(51) Int. Cl.
  *G06N 20/00* (2019.01)
  *G06F 9/451* (2018.01)
  *G06F 16/40* (2019.01)
  *G06F 3/0481* (2022.01)
  *G09B 7/06* (2006.01)
  *G06F 40/30* (2020.01)
  *G06F 40/205* (2020.01)
  *G06F 18/214* (2023.01)
  *G06F 18/21* (2023.01)

(52) U.S. Cl.
  CPC .......... *G06F 16/904* (2019.01); *G06F 18/214* (2023.01); *G06F 18/217* (2023.01); *G06F 18/2148* (2023.01); *G06F 18/2178* (2023.01); *G06F 40/205* (2020.01); *G06F 40/30* (2020.01); *G06N 20/00* (2019.01); *G09B 7/06* (2013.01)

(58) Field of Classification Search
  CPC ...... G06F 16/40; G06F 16/904; G06F 40/205; G06F 40/30; G06F 3/0481; G06N 20/00; G09B 7/02; G09B 7/06
  See application file for complete search history.

(56) References Cited

U.S. PATENT DOCUMENTS

| | | | |
|---|---|---|---|
| 7,835,910 B1 | 11/2010 | Hakkani-Tur et al. | |
| 8,244,522 B2 | 8/2012 | Nakano et al. | |
| 8,725,756 B1 | 5/2014 | Garg et al. | |
| 9,443,193 B2 | 9/2016 | Haberman et al. | |
| 9,881,088 B1 | 1/2018 | Leber | |
| 9,928,466 B1 | 3/2018 | Sarmento et al. | |
| 10,115,055 B2 | 10/2018 | Weiss et al. | |
| 10,148,589 B2 | 12/2018 | Dronen et al. | |
| 10,153,984 B2 | 12/2018 | Dronen, Jr. et al. | |
| 10,200,457 B2 | 2/2019 | Shariat et al. | |
| 10,268,676 B1 | 4/2019 | Meisner | |
| 10,665,122 B1 | 5/2020 | Meisner | |
| 2008/0294637 A1 | 11/2008 | Liu | |
| 2009/0162827 A1* | 6/2009 | Benson | G09B 7/02 434/350 |
| 2011/0008758 A1 | 1/2011 | Kortas et al. | |
| 2012/0130978 A1 | 5/2012 | Li et al. | |
| 2014/0045164 A1 | 2/2014 | Kearns | |
| 2014/0272909 A1* | 9/2014 | Isensee | G09B 7/02 434/362 |
| 2014/0278355 A1 | 9/2014 | Sarikaya et al. | |
| 2014/0379615 A1 | 12/2014 | Brigham et al. | |
| 2015/0026106 A1 | 1/2015 | Oh et al. | |
| 2015/0170049 A1 | 6/2015 | Mann et al. | |
| 2015/0332169 A1 | 11/2015 | Bivens et al. | |
| 2016/0162456 A1 | 6/2016 | Munro et al. | |
| 2016/0196504 A1 | 7/2016 | Allen et al. | |
| 2016/0364692 A1 | 12/2016 | Bhaskaran et al. | |
| 2017/0061286 A1 | 3/2017 | Kumar et al. | |
| 2017/0193090 A1 | 7/2017 | Byron et al. | |
| 2017/0278416 A1* | 9/2017 | Liu | G09B 7/00 |
| 2017/0300198 A1* | 10/2017 | Rosenberg | G06F 3/011 |
| 2017/0329782 A1 | 11/2017 | Gui et al. | |
| 2017/0364832 A1 | 12/2017 | Habermehl et al. | |
| 2017/0366496 A1 | 12/2017 | Habermehl et al. | |
| 2018/0081718 A1 | 3/2018 | Dronen et al. | |
| 2018/0096617 A1 | 4/2018 | Tapuhi et al. | |
| 2018/0137433 A1 | 5/2018 | Devarakonda et al. | |
| 2018/0247549 A1 | 8/2018 | Martin et al. | |
| 2019/0103035 A1 | 4/2019 | Beller et al. | |
| 2019/0147350 A1 | 5/2019 | Bai et al. | |
| 2019/0171726 A1 | 6/2019 | Ahmed et al. | |
| 2019/0172466 A1 | 6/2019 | Lee et al. | |
| 2019/0340172 A1 | 11/2019 | McElvain et al. | |
| 2020/0020319 A1 | 1/2020 | Malhotra et al. | |
| 2020/0175416 A1 | 6/2020 | Zhao et al. | |

FOREIGN PATENT DOCUMENTS

| | | |
|---|---|---|
| KR | 10-0616909 B1 | 4/2016 |
| KR | 101616909 B1 | 4/2016 |
| KR | 10-2017-0139916 A | 12/2017 |
| KR | 1020170139916 A | 12/2017 |

OTHER PUBLICATIONS

Tao, et al., "Ruber: An Unsupervised Method for Automatic Evaluation of Open Domain Dialog Systems", Available Online at: arXiv preprint arXiv: 1701.03079, 10 pages, Jul. 16, 2017.

* cited by examiner

My Courses

Intelligent Scoring Assistant

The Intelligent Scoring Assistant (ISA) is a system that learns from you as you score your students' writing. Once ISA has been trained with a sufficient number of manual scores, the remaining submissions are scored automatically. You can adjust the scores if necessary, and finalize them individually or in a batch. Click here to learn more.

Send feedback

Add Course — 974

| Short Name | Name | Actions |
|---|---|---|
| PSYC 1001 | General Psychology | ✎ Edit    ⊗ Remove |

Edit Assignment
Essay about neurotransmitters

Important! To make the most of ISA auto-scoring, be a clear and concise as possible, with no extraneous details.

◉ Remove

Essay about neurotransmitters

Neurotransmitters: can't live with em; can't live without em!

◀ Assignment Details (optional) — 912

Learning Objective - You can enter a goal for this assignment that students can see.

In this assignment you will learn how to user auto-scoring.

Due Date
10/31/2018

Cancel    Send Feedback

SYSTEMS AND METHODS FOR INTERFACE-BASED MACHINE LEARNING MODEL OUTPUT CUSTOMIZATION

CROSS-REFERENCES TO RELATED APPLICATIONS

This application claims the benefit of U.S. Provisional Application No. 62/632,924, filed on Feb. 20, 2018, and entitled "REAL TIME DEVELOPMENT OF AUTO SCORING ESSAY MODELS FOR CUSTOM CREATED PROMPTS", and this application claims the benefit of U.S. Provisional Application No. 62/739,015, filed on Sep. 28, 2018, and entitled "REAL TIME DEVELOPMENT OF AUTO SCORING ESSAY MODELS FOR CUSTOM CREATED PROMPTS", the entirety of each of which is hereby incorporated by reference herein.

This application is related to U.S. Provisional Application No. 62/057,140, filed on Sep. 29, 2014, and entitled "RESOURCE ALLOCATION AND DISTRIBUTED PROCESSING SYSTEMS", U.S. application Ser. No. 14/869,748, filed on Sep. 29, 2015, and entitled "RESOURCE ALLOCATION IN DISTRIBUTED PROCESSING SYSTEMS"; U.S. application Ser. No. 15/824,960, filed on Nov. 28, 2017, and entitled "RESOURCE ALLOCATION IN DISTRIBUTED PROCESSING SYSTEMS"; U.S. application Ser. No. 15/640,101, filed on Jun. 30, 2017, and entitled "RESOURCE ALLOCATION IN DISTRIBUTED PROCESSING SYSTEMS"; U.S. Provisional Application No. 62/352,890, filed Jun. 21, 2016, and entitled "SMART ROUTING FOR OPTIMIZED SCORING BASED UPON SCORING DIFFICULTY/CONTINUOUS FLOW"; U.S. application Ser. No. 15/629,382, filed on Jun. 21, 2017, and entitled "SYSTEM AND METHOD FOR AUTOMATED EVALUATION SYSTEM ROUTING"; and U.S. application Ser. No. 15/629,422, filed on Jun. 21, 2017, and entitled "SYSTEMS AND METHODS FOR REAL-TIME MACHINE LEARNING MODEL TRAINING", the entirety of each of which is hereby incorporated by reference herein.

BACKGROUND

A computer network or data network is a telecommunications network which allows computers to exchange data. In computer networks, networked computing devices exchange data with each other along network links (data connections). The connections between nodes are established using either cable media or wireless media. The best-known computer network is the Internet.

Network computer devices that originate, route, and terminate the data are called network nodes. Nodes can include hosts such as personal computers, phones, servers, as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology and organizational intent. In most cases, communications protocols are layered on (i.e. work using) other more specific or more general communications protocols, except for the physical layer that directly deals with the transmission media.

BRIEF SUMMARY

One aspect of the present disclosure relates to a system for customizing an evaluation model to an evaluation style. The system includes a memory including: a content library database containing a plurality of prompts and evaluation data associated with each of the plurality of prompts; and a model database including a plurality of evaluation models for automated evaluation of received user responses. In some embodiments, the evaluation data of each of the plurality of prompts includes a pointer linking to the associated evaluation model. The system includes at least one processor that can: receive a plurality of responses received from a plurality of users in response to providing of a prompt; identify an evaluation model relevant to the provided prompt, the evaluation model including a machine learning model trained to output a score relevant to at least portions of a response; generate a training indicator, the training indicator providing a graphical depiction of the degree to which the identified evaluation model is trained; determine a training status of the identified model; when the model is identified as insufficiently trained, receive at least one evaluation input; update training of the evaluation model based on the at least one received evaluation input; and control the training indicator to reflect the degree to which the evaluation model is trained subsequent to the updating of the training of the evaluation model.

In some embodiments, the evaluation model includes a plurality of evaluation models. In some embodiments, each of the plurality of evaluation models is associated with an evaluation portion of the provided prompt. In some embodiments, the at least one processor can determine a first response ordering. In some embodiments, the first response ordering identifies an order of providing responses to the user for evaluation. In some embodiments, the response ordering is determined based on the estimated contribution of each response towards completion of training of the evaluation model.

In some embodiments, the at least one processor can determine a second training status of the identified model subsequent to the updating of the training of the evaluation model based on the at least one received evaluation input. In some embodiments, the at least one processor can: auto-evaluate the response when the second training status of the identified model is identified as sufficiently trained; determine an acceptability of the auto-evaluating of the response; and determine a second response ordering when the auto-evaluating of the response is determined as unacceptable.

In some embodiments, identifying an evaluation model relevant to the provided prompt includes: identifying prompt evaluation portions; and retrieving a sub-model associated with each of the identified prompt evaluation portions. In some embodiments, the at least one server can determine a training level of the identified model. In some embodiments, determining a training level of the identified model includes: retrieving sub-model data for each of the retrieved sub-models; determining a sub-model confidence level for each of the retrieved sub-models; and determining an aggregate confidence level based on a combination of the determined sub-model confidence levels.

One aspect of the present disclosure relates to a method of customizing an evaluation model to an evaluation style. The method includes: receiving a plurality of responses received from a plurality of users in response to providing of a prompt; identifying an evaluation model relevant to the provided prompt, which evaluation model includes a machine learning model trained to output a score relevant to at least portions of a response; generating a training indicator, which training indicator provides a graphical depiction of the degree to which the identified evaluation model is trained; determining a training status of the identified model;

when the model is identified as insufficiently trained, receiving at least one evaluation input; updating training of the evaluation model based on the at least one received evaluation input; and controlling the training indicator to reflect the degree to which the evaluation model is trained subsequent to the updating of the training of the evaluation model.

In some embodiments, the evaluation model includes a plurality of evaluation models. In some embodiments, each of the plurality of evaluation models is associated with an evaluation portion of the provided prompt. In some embodiments, the method includes determining a first response ordering, wherein the first response ordering identifies an order of providing responses for evaluation by the user.

In some embodiments, the response ordering is determined based on the estimated contribution of each response towards completion of training of the evaluation model. In some embodiments, the method includes: determining a second training status of the identified model subsequent to the updating of the training of the evaluation model based on the at least one received evaluation input. In some embodiments, the method includes: auto-evaluating the response when the second training status of the identified model is identified as sufficiently trained; determining an acceptability of the auto-evaluating of the response; and determining a second response ordering when the auto-evaluating of the response is determined as unacceptable.

In some embodiments, identifying an evaluation model relevant to the provided prompt includes: identifying prompt evaluation portions; and retrieving a sub-model associated with each of the identified prompt evaluation portions. In some embodiments, the method includes determining a training level of the identified model. In some embodiments, determining a training level of the identified model includes: retrieving sub-model data for each of the retrieved sub-models; determining a sub-model confidence level for each of the retrieved sub-models; and determining an aggregate confidence level based on a combination of the determined sub-model confidence levels.

One aspect of the present disclosure relates to a system for controlling training quality of a machine learning model. The system includes a memory including: a content library database containing a plurality of prompts and evaluation data associated with each of the plurality of prompts; and a model database including a plurality of evaluation models for automated evaluation of received user responses. The system includes at least one processor. The at least one processor can: receive a plurality of responses received from a plurality of users in response to providing of at least one prompt; identify an evaluation model relevant to the provided prompt, which evaluation model includes a machine learning model trained to output a score relevant to at least portions of a response; generate a training indicator, which training indicator provides a graphical depiction of the degree to which the identified evaluation model is trained; determine a training status of the identified model; control the training indicator to identify the training status of the identified model; automatically evaluate the plurality of responses with the evaluation model when the model is identified as sufficiently trained; generate a graphical indicator of evaluation model performance, which indicator of evaluation model performance characterizes an attribute of the evaluation; and control a user interface to display the graphical indicator of evaluation model performance.

In some embodiments, the graphical indicator indicates at least one of: a distribution of scores generated by the evaluation model; a confidence level of the evaluation model; and an accuracy level of the evaluation model. In some embodiments, the graphical indicator identifies outlier scores based on historical user data. In some embodiments, identifying outliner scores based on historical user data includes: retrieving historical data; comparing the historical data to results of evaluating the plurality of responses; and indicating an outlier score when a discrepancy between the historical data and results of evaluating the plurality of responses exceeds a threshold level.

In some embodiments, the historical data includes a historical evaluation result distribution. In some embodiments, the results of evaluating the plurality of responses includes an evaluation result distribution. In some embodiments, the historical data includes user historical data. In some embodiments, the user historical data relates to at least one users previously received evaluation results.

In some embodiments, the at least one processor can determine acceptability of the evaluation. In some embodiments, the acceptability of the evaluation is determined based on the identified outlier scores. In some embodiments, the at least one processor can further train the evaluation model when the evaluation is unacceptable. In some embodiments, the at least one processor can: receive a selection of at least one response for reevaluation; receive an evaluation input for the at least one response; and update training of the evaluation model based on the received evaluation input for the at least one response.

One aspect of the present disclosure relates to a method of controlling training quality of a machine learning model. The method includes: receiving a plurality of responses received from a plurality of users in response to providing of at least one prompt; identifying an evaluation model relevant to the provided prompt, which evaluation model includes a machine learning model trained to output a score relevant to at least portions of a response; generating a training indicator, which training indicator provides a graphical depiction of the degree to which the identified evaluation model is trained; determining a training status of the identified model; controlling the training indicator to identify the training status of the identified model; automatically evaluating the plurality of responses with the evaluation model when the model is identified as sufficiently trained; generating a graphical indicator of evaluation model performance, which indicator of evaluation model performance characterizes an attribute of the evaluation; and controlling a user interface to display the graphical indicator of evaluation model performance.

In some embodiments, the graphical indicator indicates at least one of: a distribution of scores generated by the evaluation model; a confidence level of the evaluation model; and an accuracy level of the evaluation model. In some embodiments, the graphical indicator identifies outlier scores based on historical user data. In some embodiments, identifying outliner scores based on historical user data includes: retrieving historical data; comparing the historical data to results of evaluating the plurality of responses; and indicating an outlier score when a discrepancy between the historical data and results of evaluating the plurality of responses exceeds a threshold level.

In some embodiments, the historical data includes a historical evaluation result distribution. In some embodiments, the results of evaluating the plurality of responses includes an evaluation result distribution. In some embodiments, the historical data includes user historical data. In some embodiments, the user historical data relates to at least one users previously received evaluation results.

In some embodiments, the method includes determining an acceptability of the evaluation. In some embodiments, the acceptability of the evaluation is determined based on the identified outlier scores. In some embodiments, the method includes training the evaluation model when the evaluation is unacceptable. In some embodiments, the method includes: receiving a selection of at least one response for reevaluation; receiving an evaluation input for the at least one response; and updating training of the evaluation model based on the received evaluation input for the at least one response.

One aspect of the present disclosure relates to a system for training a model for a custom authored prompt. The system includes a memory including: a content library database including a plurality of prompts; and a model database including a at least one model trained to evaluate prompts. The system includes at least one processor that can: receive a prompt; parse the prompt to identifying a plurality of prompt evaluation portions associated with the received prompt; identify pre-existing data relevant to one of the evaluation portions of the received prompt; train a model for evaluating responses to the prompt at least in part based on the pre-existing data.

In some embodiments, parsing the prompt includes identifying a complexity of each of the plurality of prompt evaluation portions associated with the received prompt. In some embodiments, the pre-existing data includes at least one of: a pre-existing model trained to evaluate responses to another prompt; and pre-existing response data generated from responses to other prompts.

In some embodiments, the at least one processor can identify a creator of the received prompt. In some embodiments, the at least one of: the pre-existing model; and the pre-existing response data are identified based on the creator of the received prompt. In some embodiments, identifying pre-existing response data includes identifying response data corresponding to at least one of the plurality of prompt evaluation portions via a similarity score.

In some embodiments, the at least one processor can iteratively: evaluate sufficiency of the training of the model; and generate new training data when the training of the model is insufficient. In some embodiments, the processor can provide the prompt to a user; and receive a response to the provided prompt. In some embodiments, generating new training data includes: generating an evaluation of the received response; and updating the training based on the received response and on the evaluation of the received response. In some embodiments, updating the training based on the received response and on the evaluation of the received response includes: receiving a plurality of responses and a plurality of evaluations to the received responses; determining an ordering to the received responses; and training based on the ordering of the received responses.

In some embodiments, the at least one processor can generate a graphical training indicator. In some embodiments, the graphical training indicator provides a graphical depiction of the degree to which the identified evaluation model is trained. In some embodiments, the at least one processor can control the training indicator to reflect the degree to which the evaluation model is trained subsequent to the updating of the training of the evaluation model.

One aspect of the present disclosure relates to a method of training a model for a custom authored prompt. The method includes: receiving a prompt; parsing the prompt to identifying a plurality of prompt evaluation portions associated with the received prompt; identifying pre-existing data relevant to one of the evaluation portions of the received prompt; and automatically training a model for evaluating responses to the prompt at least in part based on the pre-existing data.

In some embodiments, parsing the prompt includes identifying a complexity of each of the plurality of prompt evaluation portions associated with the received prompt. In some embodiments, the pre-existing data includes at least one of: a pre-existing model trained to evaluate responses to another prompt; and pre-existing response data generated from responses to other prompts. In some embodiments, the method includes identifying a creator of the received prompt. In some embodiments, the at least one of: the pre-existing model; and the pre-existing response data are identified based on the creator of the received prompt.

In some embodiments, identifying pre-existing response data includes identifying response data corresponding to at least one of the plurality of prompt evaluation portions via a similarity score. In some embodiments, the method includes iteratively: evaluating sufficiency of the training of the model; and generating new training data when the training of the model is insufficient.

In some embodiments, the method includes: providing the prompt to a user; and receiving a response to the provided prompt. In some embodiments, generating new training data includes: generating an evaluation of the received response; and updating the training based on the received response and on the evaluation of the received response. In some embodiments, updating the training based on the received response and on the evaluation of the received response includes: receiving a plurality of responses and a plurality of evaluations to the received responses; determining an ordering to the received responses; and training based on the ordering of the received responses.

In some embodiments, the method includes generating a graphical training indicator. In some embodiments, the graphical training indicator provides a graphical depiction of the degree to which the identified evaluation model is trained. In some embodiments, the method includes controlling the training indicator to reflect the degree to which the evaluation model is trained subsequent to the updating of the training of the evaluation model.

One aspect of the present disclosure relates to a system for training a model for a custom authored prompt evaluation. The system includes a memory including: a content library database including a plurality of prompts; and a model database including a at least one model trained to evaluate prompts. The system includes at least one processor that can: iteratively receive a prompt from a user via a prompt creation window within a user interface; provide iterative feedback to a user via the prompt creation window; parse the prompt to identifying a plurality of prompt evaluation portions associated with the received prompt; identify pre-existing data relevant to one of the evaluation portions of the received prompt; train a model for evaluating responses to the prompt at least in part based on the pre-existing data; and provide training information to the user via a training level indicator in the user interface.

In some embodiments, the at least one processor can iteratively: gather new training data; update training of the model with the new training data; and evaluate the training of the model. In some embodiments, the at least one processor can determine that the model is sufficiently trained. In some embodiments, the at least one processor can control an evaluation interface to generate a launch window upon determining that the model is sufficiently trained. In some embodiments, the launch window provides at least one of: an indicator of sufficiency of training of the model; and a feature manipulable to initiate auto evaluation with the model of responses received to the prompt.

In some embodiments, the at least one processor can: provide the prompt to a plurality of users; receive a response from each of the plurality of users; determine that the model is sufficiently trained; and auto-evaluate the responses with the model. In some embodiments, the at least one processor can control the evaluation interface to display at least one of the auto-evaluated responses. In some embodiments, the at least one processor can receive a modification to the displayed at least one of the auto-evaluated responses via an input feature of the evaluation interface.

In some embodiments, the at least one processor can control the evaluation interface to modify an appearance of the input feature in response to the received modification. In some embodiments, the at least one processor can control generation of an output data interface. In some embodiments, the output data interface includes a scoring summary window identifying scoring status of received responses. In some embodiments, the output data interface includes a distribution window including a graphical display of a distribution of the auto-evaluations of the responses.

One aspect of the present disclosure relates to a method for training a model for custom authored prompt evaluation. The method includes: iteratively receiving a prompt from a user via a prompt creation window within a user interface; providing iterative feedback to a user via the prompt creation window; parsing the prompt to identifying a plurality of prompt evaluation portions associated with the received prompt; identifying pre-existing data relevant to one of the evaluation portions of the received prompt; training a model for evaluating responses to the prompt at least in part based on the pre-existing data; and providing training information to the user via a training level indicator in the user interface.

In some embodiments, the method includes iteratively: gathering new training data; updating training of the model with the new training data; and evaluating the training of the model. In some embodiments, the method includes determining that the model is sufficiently trained. In some embodiments, the method includes controlling an evaluation interface to generate a launch window upon determining that the model is sufficiently trained. In some embodiments, the launch window provides at least one of: an indicator of sufficiency of training of the model; and a feature manipulable to initiate auto evaluation with the model of responses received to the prompt.

In some embodiments, the method includes: providing the prompt to a plurality of users; receiving a response from each of the plurality of users; determining that the model is sufficiently trained; and auto-evaluating the responses with the model. In some embodiments, the method includes controlling the evaluation interface to display at least one of the auto-evaluated responses. In some embodiments, the method includes receiving a modification to the displayed at least one of the auto-evaluated responses via an input feature of the evaluation interface.

In some embodiments, the method includes controlling the evaluation interface to modify an appearance of the input feature in response to the received modification. In some embodiments, the method includes controlling generation of an output data interface. In some embodiments, the output data interface includes a scoring summary window identifying scoring status of received responses. In some embodiments, the output data interface includes a graphical display of the auto-evaluations of the responses.

One aspect of the present disclosure relates to a system for interface-based evaluation output customization. The system includes a memory including: a content library database containing a plurality of prompts and evaluation data associated with each of the plurality of prompts; and a model database including a plurality of evaluation models for automated evaluation of received user responses. In some embodiments, the evaluation data of each of the plurality of prompts includes a pointer linking to the associated evaluation model. The system can include at least one processor that can: receive a plurality of responses from a plurality of users to a provided prompt; evaluate the received plurality of responses with an evaluation model, the evaluation model including a machine learning model trained to output a score relevant to at least portions of a response; generate evaluation data characterizing at least one attribute of the evaluated plurality of responses; and generate an output panel including at least one performance modification interface, which performance modification identifies an attribute of the evaluated plurality of responses, and which performance modification interface includes an input feature. In some embodiments, the input feature is user manipulable to change the attribute of the evaluated plurality of responses. The at least one processor can receive a input via the input feature; modify the attribute of the evaluated plurality of responses; and generate updated evaluation data based at least in part on the modified attribute of the evaluated plurality of responses.

In some embodiments, the attribute of the evaluated plurality of responses includes a score distribution generated by the evaluation model. In some embodiments, the input received via the input feature changes at least one of: a shape of the score distribution; a width of the score distribution; and a center of the score distribution. In some embodiments, evaluating the received responses includes generating a first score for each of the received responses. In some embodiments, generating updated evaluation data includes generating a second score for each of the received responses. In some embodiments, the second score is generated at least in part based on the input received via the input feature.

In some embodiments, the output panel further includes a model panel characterizing at least one attribute of the evaluation model. In some embodiments, the at least one attribute of the evaluation model includes at least one of: a generic evaluation parameter; and a model identifier. In some embodiments, the generic evaluation parameter identifies: a selected generic evaluation parameter; and an application stringency. In some embodiments, the generic evaluation parameter includes at least one of: a formatting style; a proficiency level; and a language. In some embodiments, the output panel includes selection feature whereby a user can select one of a plurality of generic evaluation parameters. In some embodiments, the evaluation model training is based at least in part of each of the plurality of generic evaluation parameters.

One aspect of the present disclosure relates to a method for interface-based evaluation output customization. The method includes: receiving a plurality of responses from a plurality of users to a provided prompt; evaluating the received plurality of responses with an evaluation model, the evaluation model including a machine learning model trained to output a score relevant to at least portions of a response; generating evaluation data characterizing at least one attribute of the evaluated plurality of responses; and generating an output panel including at least one performance modification interface. In some embodiments, the performance modification identifies an attribute of the evaluated plurality of responses. In some embodiments, the performance modification interface includes an input feature. In some embodiments, the input feature is user manipulable to change the attribute of the evaluated plurality of responses. The method can include: receiving a input via the input feature; modifying the attribute of the evaluated plurality of responses; and generating updated evaluation data based at least in part on the modified attribute of the evaluated plurality of responses.

In some embodiments, the attribute of the evaluated plurality of responses includes a score distribution generated by the evaluation model. In some embodiments, the input received via the input feature changes at least one of: a shape of the score distribution; a width of the score distribution; and a center of the score distribution. In some embodiments, evaluating the received responses includes generating a first score for each of the received response; and wherein generating updated evaluation data includes generating a second score for each of the received responses. In some embodiments, the second score is generated at least in part based on the input received via the input feature.

In some embodiments, the output panel further includes a model panel characterizing at least one attribute of the evaluation model. In some embodiments, the at least one attribute of the evaluation model includes at least one of: a generic evaluation parameter; and a model identifier. In some embodiments, the generic evaluation parameter identifies: a selected generic evaluation parameter; and an application stringency. In some embodiments, the generic evaluation parameter includes at least one of: a formatting style; a proficiency level; and a language. In some embodiments, the output panel includes selection feature whereby a user can select one of a plurality of generic evaluation parameters. In some embodiments, the evaluation model training is based at least in part of each of the plurality of generic evaluation parameters.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIG. 21 is a graphical depiction of one embodiment of a landing window.

FIG. 24 is graphical depiction of one embodiment of an assignment editing window.

FIG. 33 is a graphical depiction of one embodiment of an output data interface.

Figure 1:
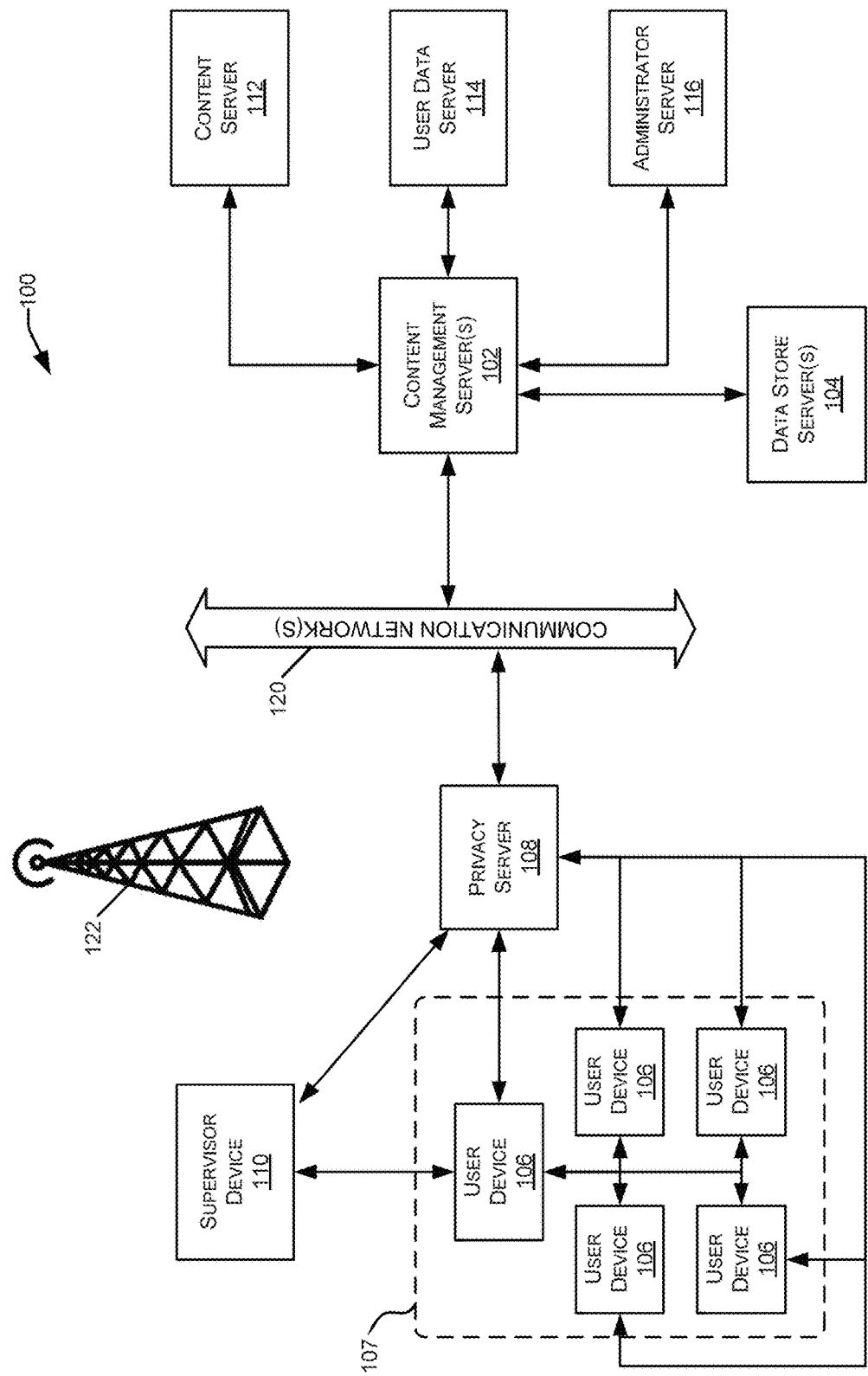
FIG. 1 is a block diagram illustrating an example of a content distribution network.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability, or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Current machine learning models for evaluation, also referred to herein as grading, are large and cumbersome models. These are trained with large sets of training data and are not customized to the tendencies of a single specific grader. Due to the reliance of these models on large sets of training data, these models can be used in circumstances with smaller set of data. Specifically, as the size of the set of training data decreases, the accuracy of the model diminishes.

While these models are, in some aspects, satisfactory for evaluation of large numbers of responses to the same question or prompt, they can be unsatisfactory in other circumstances. Limitations of these models are particularly apparent in their inability to be used in grading and/or evaluating small numbers of responses to unique questions and/or according to unique or customized criteria. Thus, while evaluation technology has improved for large-scale assessments, evaluation for small-scale assessment still relies on human evaluators.

The present disclosure relates to systems and methods for providing customizable machine learning evaluation. This can include the customizing of a model according to one or several attributes of the teacher and/or the teachers evaluation preference. In some embodiments, this can include the generating and/or customizing of one or several models for evaluation custom prompts. The training and/or customization of the models can include identification and use of pre-existing data to perform a portion of the training. The use of the pre-existing data can effectively increase the size of the set of training data. In some embodiments, training can be further accelerated by the identification of one or several responses for manual evaluation, which one or several responses can be identified as representative of some or all of the received responses. Due to the representativeness of these identified one or several responses, their manual evaluation and inclusion in the training set can accelerate the completion training.

The training and customization of the models can include iterative retraining of the model and/or iterative generation of new piece of training data based on inputs received from a user such as the customizer the model. In some embodiments, for example, after the model has been trained, evaluation output of the model can be provided to the user. The user can provide feedback, which can include acceptance of the results indicated in the evaluation output and/or a request for further training of the model.

Systems and methods according to the disclosure herein accelerate training of machine learning models and improve performance of machine learning models trained with small data sets. Further, systems and methods according to the disclosure herein provide for automated evaluation of custom and/or customized prompts With reference now to FIG. 1, a block diagram is shown illustrating various components of a content distribution network (CDN) 100 which implements and supports certain embodiments and features described herein. In some embodiments, the content distribution network 100 can comprise one or several physical components and/or one or several virtual components such as, for example, one or several cloud computing components. In some embodiments, the content distribution network 100 can comprise a mixture of physical and cloud computing components.

Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing unit, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatively connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives (e.g., Serial AT Attachment drives) or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 114, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO (e.g., Europe's global positioning system), or the like, or location systems or features including, for example, one or several transceivers that can determine location of the one or several components of the content distribution network 100 via, for example, triangulation. All of these are depicted as navigation system 122.

In some embodiments, navigation system 122 can include or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
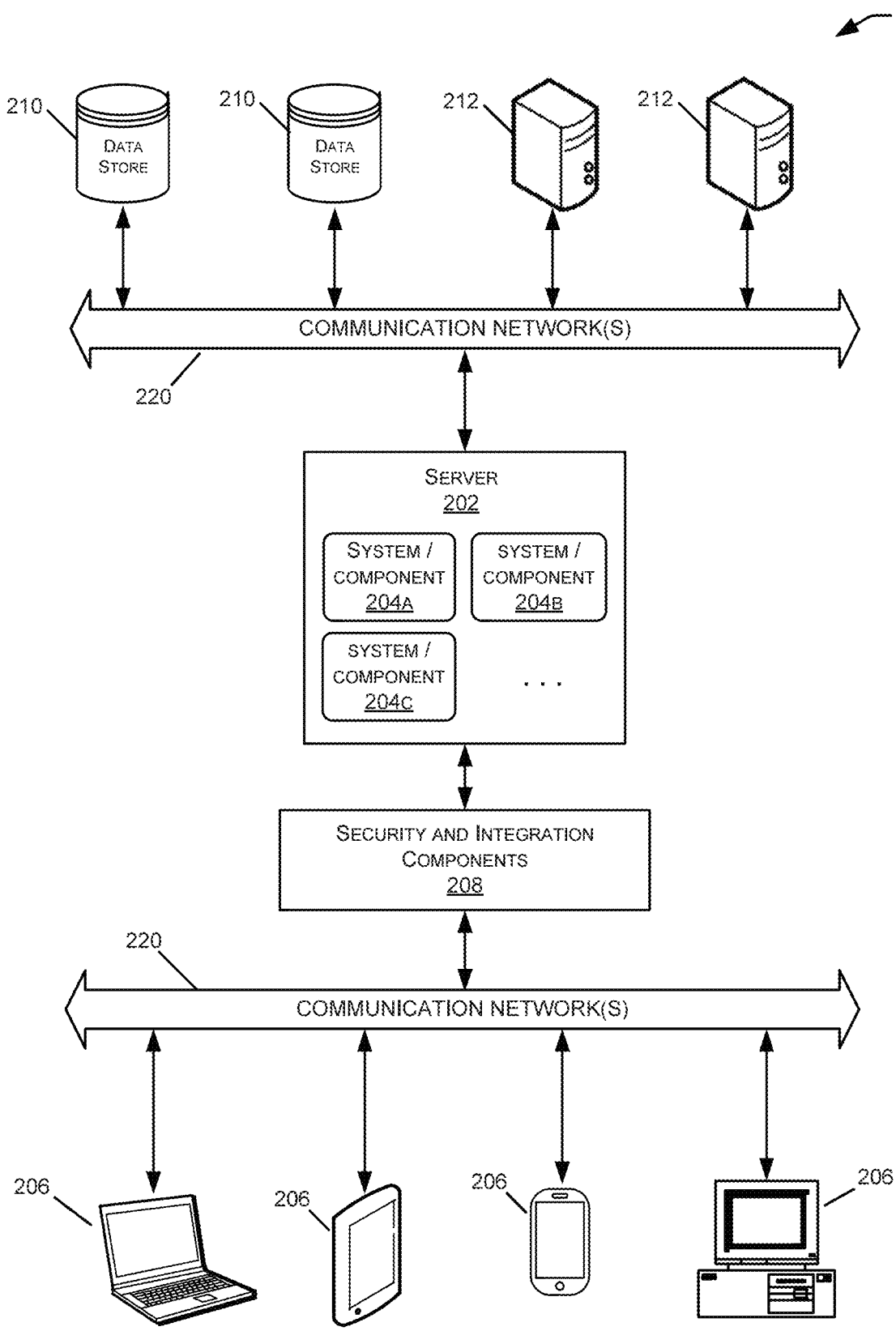
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of the same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines.

Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP (e.g., Simple Object Access Protocol) messages using Extensible Markup Language (XML) encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring, and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
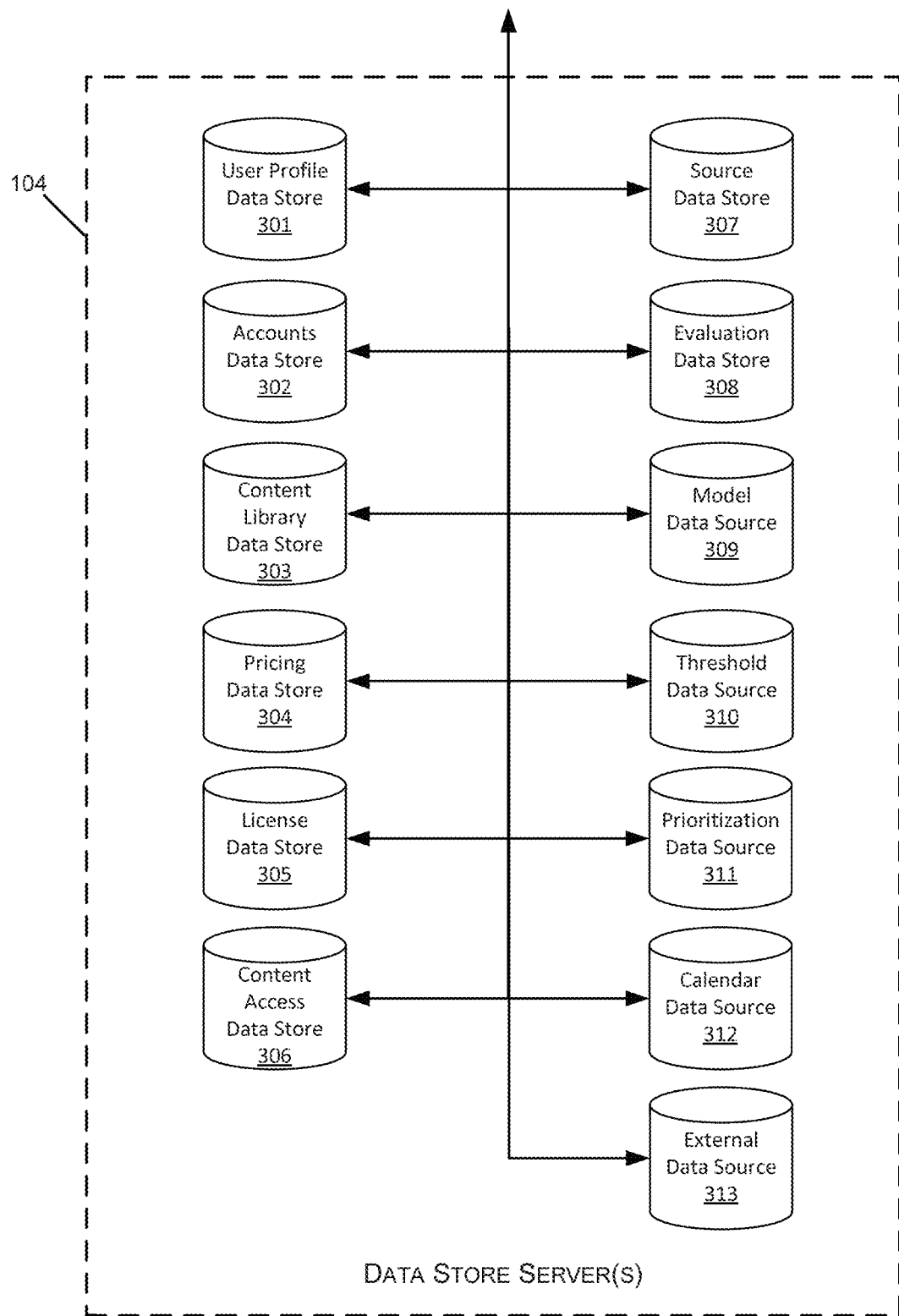
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-313 may reside in storage on a single computer server 104 (or a single server farm or cluster) under the control of a single entity, may be virtually implemented, or may reside on separate servers operated by different entities and/or at remote locations. In some embodiments, data stores 301-313 may be accessed by the content management server 102 and/or other devices and servers within the network 100 (e.g., user devices 106, supervisor devices 110, administrator servers 116, etc.). Access to one or more of the data stores 301-313 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-313, including their functionality and types of data stored therein, are illustrative and non-limiting. Data stores server architecture, design, and the execution of specific data stores 301-313 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

The user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100. In some embodiments, this can comprise response information such as, for example, information identifying one or several questions or pieces of content and responses provided to the same. In some embodiments, this response information can be formed into one or several matrices "D" containing information for n users responding top items, these one or several matrices D are also referred to herein as the matrix D, the D matrix, the user matrix, and/or the response matrix. Thus, the matrix D can have n×p dimensions, and in some embodiments, the matrix D can identify whether user responses to items were correct or incorrect. In some embodiments, for example, the matrix D can include an entry "1" for an item when a user response to that item is correct and can otherwise include and entry "0".

The user profile database 301 can include information relating to one or several student learning preferences. In some embodiments, for example, the user, also referred to herein as the student or the student-user, may have one or several preferred learning styles, one or several most effective learning styles, and/or the like. In some embodiments, the user's learning style can be any learning style describing how the user best learns or how the user prefers to learn. In one embodiment, these learning styles can include, for example, identification of the user as an auditory learner, as a visual learner, and/or as a tactile learner. In some embodiments, the data identifying one or several user learning styles can include data identifying a learning style based on the user's educational history such as, for example, identifying a user as an auditory learner when the user has received significantly higher grades and/or scores on assignments and/or in courses favorable to auditory learners. In some embodiments, this information can be stored in a tier of memory that is not the fastest memory in the content delivery network 100.

In some embodiments, the user profile data store 301 can further include information identifying one or several user skill levels. In some embodiments, these one or several user skill levels can identify a skill level determined based on past performance by the user interacting with the content delivery network 100, and in some embodiments, these one or several user skill levels can identify a predicted skill level determined based on past performance by the user interacting with the content delivery network 100 and one or several predictive models.

The user profile database 301 can further include information relating to one or several teachers and/or instructors who are responsible for organizing, presenting, and/or managing the presentation of information to the user. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, these data packets in the content library database 303 can be linked to from an object network, or specifically to form a Bayes Net content network or learning graph. In some embodiments, these data packets can be linked in the object network according to one or several prerequisite relationships that can, for example, identify the relative hierarchy and/or difficulty of the data objects. In some embodiments, this hierarchy of data objects can be generated by the content distribution network 100 according to user experience with the object network, and in some embodiments, this hierarchy of data objects can be generated based on one or several existing and/or external hierarchies such as, for example, a syllabus, a table of contents, or the like. In some embodiments, for example, the object network can correspond to a syllabus such that content for the syllabus is embodied in the object network.

In some embodiments, the content library data store 303 can comprise a syllabus, a schedule, or the like. In some embodiments, the syllabus or schedule can identify one or several tasks and/or events relevant to the user. In some embodiments, for example, when the user is a member of a group such as, a section or a class, these tasks and/or events relevant to the user can identify one or several assignments, quizzes, exams, or the like.

In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library data store 303 can contain information used in evaluating responses received from users. In some embodiments, for example, a user can receive content from the content distribution network 100 and can, subsequent to receiving that content, provide a response to the received content. In some embodiments, for example, the received content can comprise one or several questions, prompts, or the like, and the response to the received content can comprise an answer to those one or several questions, prompts, or the like. In some embodiments, information, referred to herein as "comparative data," from the content library data store 303 can be used to determine whether the responses are the correct and/or desired responses.

In some embodiments, the content library database 303 and/or the user profile database 301 can comprise an aggregation network also referred to herein as a content network or content aggregation network. The aggregation network can comprise a plurality of content aggregations that can be linked together by, for example: creation by common user; relation to a common subject, topic, skill, or the like; creation from a common set of source material such as source data packets; or the like. In some embodiments, the content aggregation can comprise a grouping of content comprising the presentation portion that can be provided to the user in the form of, for example, a flash card and an extraction portion that can comprise the desired response to the presentation portion such as for example, an answer to a flash card. In some embodiments, one or several content aggregations can be generated by the content distribution network 100 and can be related to one or several data packets they can be, for example, organized in object network. In some embodiments, the one or several content aggregations can be each created from content stored in one or several of the data packets.

In some embodiments, the content aggregations located in the content library database 303 and/or the user profile database 301 can be associated with a user-creator of those content aggregations. In some embodiments, access to content aggregations can vary based on, for example, whether a user created the content aggregations. In some embodiments, the content library database 303 and/or the user profile database 301 can comprise a database of content aggregations associated with a specific user, and in some embodiments, the content library database 303 and/or the user profile database 301 can comprise a plurality of databases of content aggregations that are each associated with a specific user. In some embodiments, these databases of content aggregations can include content aggregations created by their specific user and in some embodiments, these databases of content aggregations can further include content aggregations selected for inclusion by their specific user and/or a supervisor of that specific user. In some embodiments, these content aggregations can be arranged and/or linked in a hierarchical relationship similar to the data packets in the object network and/or linked to the object network in the object network or the tasks or skills associated with the data packets in the object network or the syllabus or schedule.

In some embodiments, the content aggregation network, and the content aggregations forming the content aggregation network, can be organized according to the object network and/or the hierarchical relationships embodied in the object network. In some embodiments, the content aggregation network, and/or the content aggregations forming the content aggregation network, can be organized according to one or several tasks identified in the syllabus, schedule or the like.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee or pricing based on network usage. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A model data store 309, also referred to herein as a model database 309 can store information relating to one or several predictive models. In some embodiments, these can include one or several evidence models, risk models, skill models, or the like. In some embodiments, an evidence model can be a mathematically-based statistical model. The evidence model can be based on, for example, Item Response Theory (IRT), Bayesian Network (Bayes net), Performance Factor Analysis (PFA), or the like. The evidence model can, in some embodiments, be customizable to a user and/or to one or several content items. Specifically, one or several inputs relating to the user and/or to one or several content items can be inserted into the evidence model. These inputs can include, for example, one or several measures of user skill level, one or several measures of content item difficulty and/or skill level, or the like. The customized evidence model can then be used to predict the likelihood of the user providing desired or undesired responses to one or several of the content items.

In some embodiments, the risk models can include one or several models that can be used to calculate one or several model function values. In some embodiments, these one or several model function values can be used to calculate a risk probability, which risk probability can characterize the risk of a student-user failing to achieve a desired outcome such as, for example, failing to correctly respond to one or several data packets, failure to achieve a desired level of completion of a program, for example in a pre-defined time period, failure to achieve a desired learning outcome, or the like. In some embodiments, the risk probability can identify the risk of the student-user failing to complete 60% of the program.

In some embodiments, these models can include a plurality of model functions including, for example, a first model function, a second model function, a third model function, and a fourth model function. In some embodiments, some or all of the model functions can be associated with a portion of the program such as, for example a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are less than the desired level of completion of the program. Specifically, in some embodiments, these completion statuses can be selected to all be at less than 60% completion of the program, and more specifically, in some embodiments, the first completion status can be at 20% completion of the program, the second completion status can be at 30% completion of the program, the third completion status can be at 40% completion of the program, and the fourth completion status can be at 50% completion of the program. Similarly, any desired number of model functions can be associated with any desired number of completion statuses.

In some embodiments, a model function can be selected from the plurality of model functions based on a user's progress through a program. In some embodiments, the user's progress can be compared to one or several status trigger thresholds, each of which status trigger thresholds can be associated with one or more of the model functions. If one of the status triggers is triggered by the user's progress, the corresponding one or several model functions can be selected.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program status parameters. In some embodiments, each of the model functions can use the same program status parameters, and in some embodiments, the model functions can use different program status parameters. In some embodiments, the model functions use different program status parameters when at least one of the model functions uses at least one program status parameter that is not used by others of the model functions.

In some embodiments, a skill model can comprise a statistical model identifying a predictive skill level of one or several users. In some embodiments, this model can identify a single skill level of a user and/or a range of possible skill levels of a user. In some embodiments, this statistical model can identify a skill level of a student-user and an error value or error range associated with that skill level. In some embodiments, the error value can be associated with a confidence interval determined based on a confidence level. Thus, in some embodiments, as the number of user interactions with the content distribution network increases, the confidence level can increase and the error value can decrease such that the range identified by the error value about the predicted skill level is smaller.

In some embodiments, the model database 309, can further include data characterizing one or several attributes of one or several of the model stored in the model database. In some embodiments, this data can characterize aspects of the training of one or several of the model stored in the model database including, for example, identification of one or several sets of training data, identification of attributes of one or several sets of training data, such as, for example, the size of the sets of training data, or the like. In some embodiments, this data can further include data characterizing the confidence of one or several models stored in the model database 309.

A threshold database 310 can store one or several threshold values. These one or several threshold values can delineate between states or conditions. In one exemplary embodiment, for example, a threshold value can delineate between an acceptable user performance and an unacceptable user performance, between content appropriate for a user and content that is inappropriate for a user, between risk levels, or the like.

A prioritization database 311 can include data relating to one or several tasks and the prioritization of those one or several tasks with respect to each other. In some embodiments, the prioritization database 311 can be unique to a specific user, and in some embodiments, the prioritization database 311 can be applicable to a plurality of users. In some embodiments in which the prioritization database 311 is unique to a specific user, the prioritization database 311 can be a sub-database of the user profile database 301. In some embodiments, the prioritization database 311 can include information identifying a plurality of tasks and a relative prioritization amongst that plurality of tasks. In some embodiments, this prioritization can be static and in some embodiments, this prioritization can be dynamic in that the prioritization can change based on updates, for example, one or several of the tasks, the user profile database 301, or the like. In some embodiments, the prioritization database 311 can include information relating to tasks associated with a single course, group, class, or the like, and in some embodiments, the prioritization database 311 can include information relating to tasks associated with a plurality of courses, groups, classes, or the like.

A task can define an objective and/or outcome and can be associated with one or several data packets that can, for example, contribute to user attainment of the objective and/or outcome. In some embodiments, some or all of the data packets contained in the content library database 303 can be linked with one or several tasks stored in the prioritization database 311 such that a single task can be linked and/or associated with one or several data packets.

The prioritization database 311 can further include information relevant to the prioritization of one or several tasks and/or the prioritization database 311 can include information that can be used in determining the prioritization of one or several tasks. In some embodiments, this can include weight data which can identify a relative and/or absolute weight of a task. In some embodiments, for example, the weight data can identify the degree to which a task contributes to an outcome such as, for example, a score or a grade. In some embodiments, this weight data can specify the portion and/or percent of a grade of a class, section, course, or study that results from, and/or that is associated with the task.

The prioritization database 311 can further include information relevant to the composition of the task. In some embodiments, for example, this information, also referred to herein as a composition value, can identify one or several sub-tasks and/or content categories forming the tasks, as well as a contribution of each of those sub-tasks and/or content categories to the task. In some embodiments, the application of the weight data to the composition value can result in the identification of a contribution value for the task and/or for the one or several sub-tasks and/or content categories forming the task. This contribution value can identify the contribution of one, some, or all of the sub-tasks and/or content categories to the outcome such as, for example, the score or the grade.

The calendar data source 312, also referred to herein as the calendar database 312 can include timing information relevant to the tasks contained in the prioritization database 311. In some embodiments, this timing information can identify one or several dates by which the tasks should be completed, one or several event dates associated with the task such as, for example, one or several due dates, test dates, or the like, holiday information, or the like. In some embodiments, the calendar database 312 can further include any information provided to the user relating to other goals, commitments, or the like.

In addition to the illustrative data stores described above, data store server(s) 104 (e.g., database servers, file-based storage servers, etc.) may include one or more external data aggregators 313. External data aggregators 313 may include third-party data sources accessible to the content management network 100, but not maintained by the content management network 100. External data aggregators 313 may include any electronic information source relating to the users, content resources, or applications of the content distribution network 100. For example, external data aggregators 313 may be third-party data stores containing demographic data, education related data, consumer sales data, health related data, and the like. Illustrative external data aggregators 313 may include, for example, social networking web servers, public records data stores, learning management systems, educational institution servers, business servers, consumer sales data stores, medical record data stores, etc. Data retrieved from various external data aggregators 313 may be used to verify and update user account information, suggest user content, and perform user and content evaluations.

Figure 4:
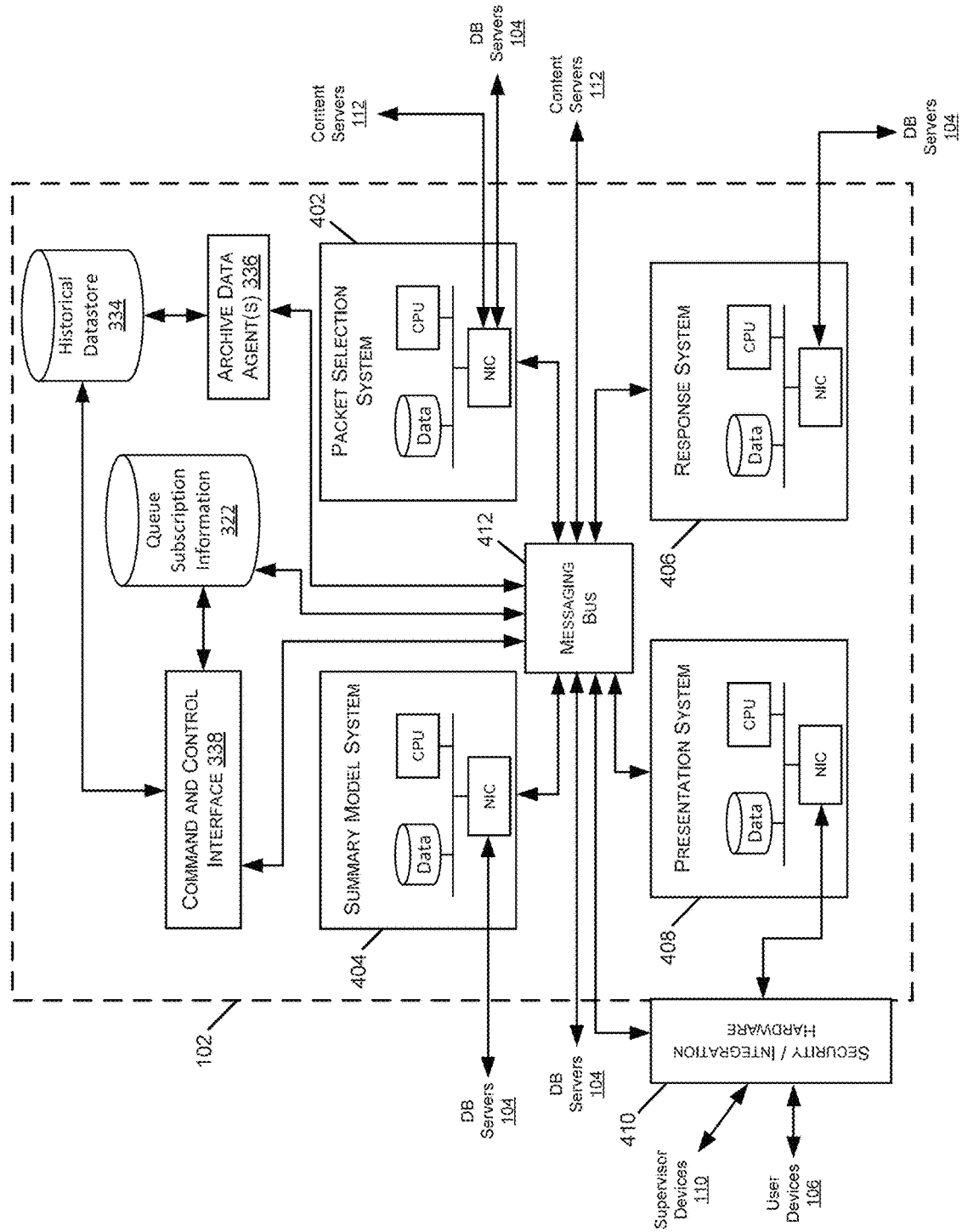
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. In such an embodiment, content management server 102 performs internal data gathering and processing of streamed content along with external data gathering and processing. Other embodiments could have either all external or all internal data gathering. This embodiment allows reporting timely information that might be of interest to the reporting party or other parties. In this embodiment, the content management server 102 can monitor gathered information from several sources to allow it to make timely business and/or processing decisions based upon that information. For example, reports of user actions and/or responses, as well as the status and/or results of one or several processing tasks could be gathered and reported to the content management server 102 from a number of sources.

Internally, the content management server 102 gathers information from one or more internal components 402-408. The internal components 402-408 gather and/or process information relating to such things as: content provided to users; content consumed by users; responses provided by users; user skill levels; content difficulty levels; next content for providing to users; etc. The internal components 402-408 can report the gathered and/or generated information in real-time, near real-time or along another time line. To account for any delay in reporting information, a time stamp or staleness indicator can inform others of how timely the information was sampled. The content management server 102 can opt to allow third parties to use internally or externally gathered information that is aggregated within the server 102 by subscription to the content distribution network 100.

A command and control (CC) interface 338 configures the gathered input information to an output of data streams, also referred to herein as content streams. APIs for accepting gathered information and providing data streams are provided to third parties external to the server 102 who want to subscribe to data streams. The server 102 or a third party can design as yet undefined APIs using the CC interface 338. The server 102 can also define authorization and authentication parameters using the CC interface 338 such as authentication, authorization, login, and/or data encryption. CC information is passed to the internal components 402-408 and/or other components of the content distribution network 100 through a channel separate from the gathered information or data stream in this embodiment, but other embodiments could embed CC information in these communication channels. The CC information allows throttling information reporting frequency, specifying formats for information and data streams, deactivation of one or several internal components 402-408 and/or other components of the content distribution network 100, updating authentication and authorization, etc.

The various data streams that are available can be researched and explored through the CC interface 338. Those data stream selections for a particular subscriber, which can be one or several of the internal components 402-408 and/or other components of the content distribution network 100, are stored in the queue subscription information database 322. The server 102 and/or the CC interface 338 then routes selected data streams to processing subscribers that have selected delivery of a given data stream. Additionally, the server 102 also supports historical queries of the various data streams that are stored in an historical data store 334 as gathered by an archive data agent 336. Through the CC interface 338 various data streams can be selected for archiving into the historical data store 334.

Components of the content distribution network 100 outside of the server 102 can also gather information that is reported to the server 102 in real-time, near real-time, or along another time line. There is a defined API between those components and the server 102. Each type of information or variable collected by server 102 falls within a defined API or multiple APIs. In some cases, the CC interface 338 is used to define additional variables to modify an API that might be of use to processing subscribers. The additional variables can be passed to all processing subscribes or just a subset. For example, a component of the content distribution network 100 outside of the server 102 may report a user response, but define an identifier of that user as a private variable that would not be passed to processing subscribers lacking access to that user and/or authorization to receive that user data. Processing subscribers having access to that user and/or authorization to receive that user data would receive the subscriber identifier along with the response reported to that component. Encryption and/or unique addressing of data streams or sub-streams can be used to hide the private variables within the messaging queues.

The user devices 106 and/or supervisor devices 110 communicate with the server 102 through security and/or integration hardware 410. The communication with security and/or integration hardware 410 can be encrypted or not. For example, a socket using a TCP connection could be used. In addition to TCP, other transport layer protocols like Control Transmission Protocol (SCTP) and User Datagram Protocol (UDP) could be used in some embodiments to intake the gathered information. A protocol such as SSL could be used to protect the information over the TCP connection. Authentication and authorization can be performed to any user devices 106 and/or supervisor device interfacing to the server 102. The security and/or integration hardware 410 receives the information from one or several of the user devices 106 and/or the supervisor devices 110 by providing the API and any encryption, authorization, and/or authentication. In some cases, the security and/or integration hardware 410 reformats or rearranges this received information The messaging bus 412, also referred to herein as a messaging queue or a messaging channel, can receive information from the internal components of the server 102 and/or components of the content distribution network 100 outside of the server 102 and distribute the gathered information as a data stream to any processing subscribers that have requested the data stream from the messaging queue 412. As indicated in FIG. 4, processing subscribers are indicated by a connector to the messaging bus 412, the connector having an arrow head pointing away from the messaging bus 412. In some examples, only data streams within the messaging queue 412 that a particular processing subscriber has subscribed to may be read by that processing subscriber if received at all. Gathered information sent to the messaging queue 412 is processed and returned in a data stream in a fraction of a second by the messaging queue 412. Various multicasting and routing techniques can be used to distribute a data stream from the messaging queue 412 that a number of processing subscribers have requested. Protocols such as Multicast or multiple Unicast could be used to distributed streams within the messaging queue 412. Additionally, transport layer protocols like TCP, SCTP and UDP could be used in various embodiments.

Through the CC interface 338, an external or internal processing subscriber can be assigned one or more data streams within the messaging queue 412. A data stream is a particular type of messages in a particular category. For example, a data stream can comprise all of the data reported to the messaging bus 412 by a designated set of components. One or more processing subscribers could subscribe and receive the data stream to process the information and make a decision and/or feed the output from the processing as gathered information fed back into the messaging queue 412. Through the CC interface 338 a developer can search the available data streams or specify a new data stream and its API. The new data stream might be determined by processing a number of existing data streams with a processing subscriber.

The CDN 110 has internal processing subscribers 402-408 that process assigned data streams to perform functions within the server 102. Internal processing subscribers 402-408 could perform functions such as providing content to a user, receiving a response from a user, determining the correctness of the received response, updating one or several models based on the correctness of the response, recommending new content for providing to one or several users, or the like. The internal processing subscribers 402-408 can decide filtering and weighting of records from the data stream. To the extent that decisions are made based upon analysis of the data stream, each data record is time stamped to reflect when the information was gathered such that additional credibility could be given to more recent results, for example. Other embodiments may filter out records in the data stream that are from an unreliable source or stale. For example, a particular contributor of information may prove to have less than optimal gathered information and that could be weighted very low or removed altogether.

Internal processing subscribers 402-408 may additionally process one or more data streams to provide different information to feed back into the messaging queue 412 to be part of a different data stream. For example, hundreds of user devices 106 could provide responses that are put into a data stream on the messaging queue 412. An internal processing subscriber 402-408 could receive the data stream and process it to determine the difficulty of one or several data packets provided to one or several users and supply this information back onto the messaging queue 412 for possible use by other internal and external processing subscribers.

As mentioned above, the CC interface 338 allows the CDN 110 to query historical messaging queue 412 information. An archive data agent 336 listens to the messaging queue 412 to store data streams in a historical database 334. The historical database 334 may store data streams for varying amounts of time and may not store all data streams. Different data streams may be stored for different amounts of time.

With regards to the components 402-408, the content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a packet selection system 402. The packet selection system 402 may be implemented using dedicated hardware within the content distribution network 100 (e.g., a packet selection server 402), or using designated hardware and software resources within a shared content management server 102. In some embodiments, the packet selection system 402 may adjust the selection and adaptive capabilities of content resources to match the needs and desires of the users receiving the content. For example, the packet selection system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the packet selection system 402 may modify content resources for individual users.

In some embodiments, the packet selection system 402 can include a recommendation engine, also referred to herein as an adaptive recommendation engine. In some embodiments, the recommendation engine can select one or several pieces of content, also referred to herein as data packets, for providing to a user. These data packets can be selected based on, for example, the information retrieved from the database server 104 including, for example, the user profile database 301, the content library database 303, the model database 309, or the like. In some embodiments, these one or several data packets can be adaptively selected and/or selected according to one or several selection rules. In one embodiment, for example, the recommendation engine can retrieve information from the user profile database 301 identifying, for example, a skill level of the user. The recommendation engine can further retrieve information from the content library database 303 identifying, for example, potential data packets for providing to the user and the difficulty of those data packets and/or the skill level associated with those data packets.

The recommendation engine can identify one or several potential data packets for providing and/or one or several data packets for providing to the user based on, for example, one or several rules, models, predictions, or the like. The recommendation engine can use the skill level of the user to generate a prediction of the likelihood of one or several users providing a desired response to some or all of the potential data packets. In some embodiments, the recommendation engine can pair one or several data packets with selection criteria that may be used to determine which packet should be delivered to a user based on one or several received responses from that student-user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a summary model system 404. The summary model system 404 may be implemented using dedicated hardware within the content distribution network 100 (e.g., a summary model server 404), or using designated hardware and software resources within a shared content management server 102. In some embodiments, the summary model system 404 may monitor the progress of users through various types of content resources and groups, such as media compilations, courses, or curriculums in training or educational contexts, interactive gaming environments, and the like. For example, the summary model system 404 may query one or more databases and/or data store servers 104 to retrieve user data such as associated content compilations or programs, content completion status, user goals, results, and the like.

A content management server 102 also may include a response system 406, which can include, in some embodiments, a response processor. The response system 406 may be implemented using dedicated hardware within the content distribution network 100 (e.g., a response server 406), or using designated hardware and software resources within a shared content management server 102. The response system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the response server 406 may analyze the information to determine the effectiveness or appropriateness of content resources with, for example, a subject matter, an age group, a skill level, or the like. In some embodiments, the response system 406 may provide updates to the packet selection system 402 or the summary model system 404, with the attributes of one or more content resources or groups of resources within the network 100. The response system 406 also may receive and analyze user evaluation data from user devices 106, supervisor devices 110, and administrator servers 116, etc. For instance, response system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the response system 406 can be further configured to receive one or several responses from the user and analyze these one or several responses. In some embodiments, for example, the response system 406 can be configured to translate the one or several responses into one or several observables. As used herein, an observable is a characterization of a received response. In some embodiments, the translation of the one or several response into one or several observables can include determining whether the one or several response are correct responses, also referred to herein as desired responses, or are incorrect responses, also referred to herein as undesired responses. In some embodiments, the translation of the one or several response into one or several observables can include characterizing the degree to which one or several response are desired responses and/or undesired responses. In some embodiments, one or several values can be generated by the response system 406 to reflect user performance in responding to the one or several data packets. In some embodiments, these one or several values can comprise one or several scores for one or several responses and/or data packets.

A content management server 102 also may include a presentation system 408. The presentation system 408 may be implemented using dedicated hardware within the content distribution network 100 (e.g., a presentation server 408), or using designated hardware and software resources within a shared content management server 102. The presentation system 408 can include a presentation engine that can be, for example, a software module running on the content delivery system.

The presentation system 408, also referred to herein as the presentation module or the presentation engine, may receive content resources from the packet selection system 402 and/or from the summary model system 404, and provide the resources to user devices 106. The presentation system 408 may determine the appropriate presentation format for the content resources based on the user characteristics and preferences, and/or the device capabilities of user devices 106. If needed, the presentation system 408 may convert the content resources to the appropriate presentation format and/or compress the content before transmission. In some embodiments, the presentation system 408 may also determine the appropriate transmission media and communication protocols for transmission of the content resources.

In some embodiments, the presentation system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrator servers 116, and other devices in the network 100.

Figure 5:
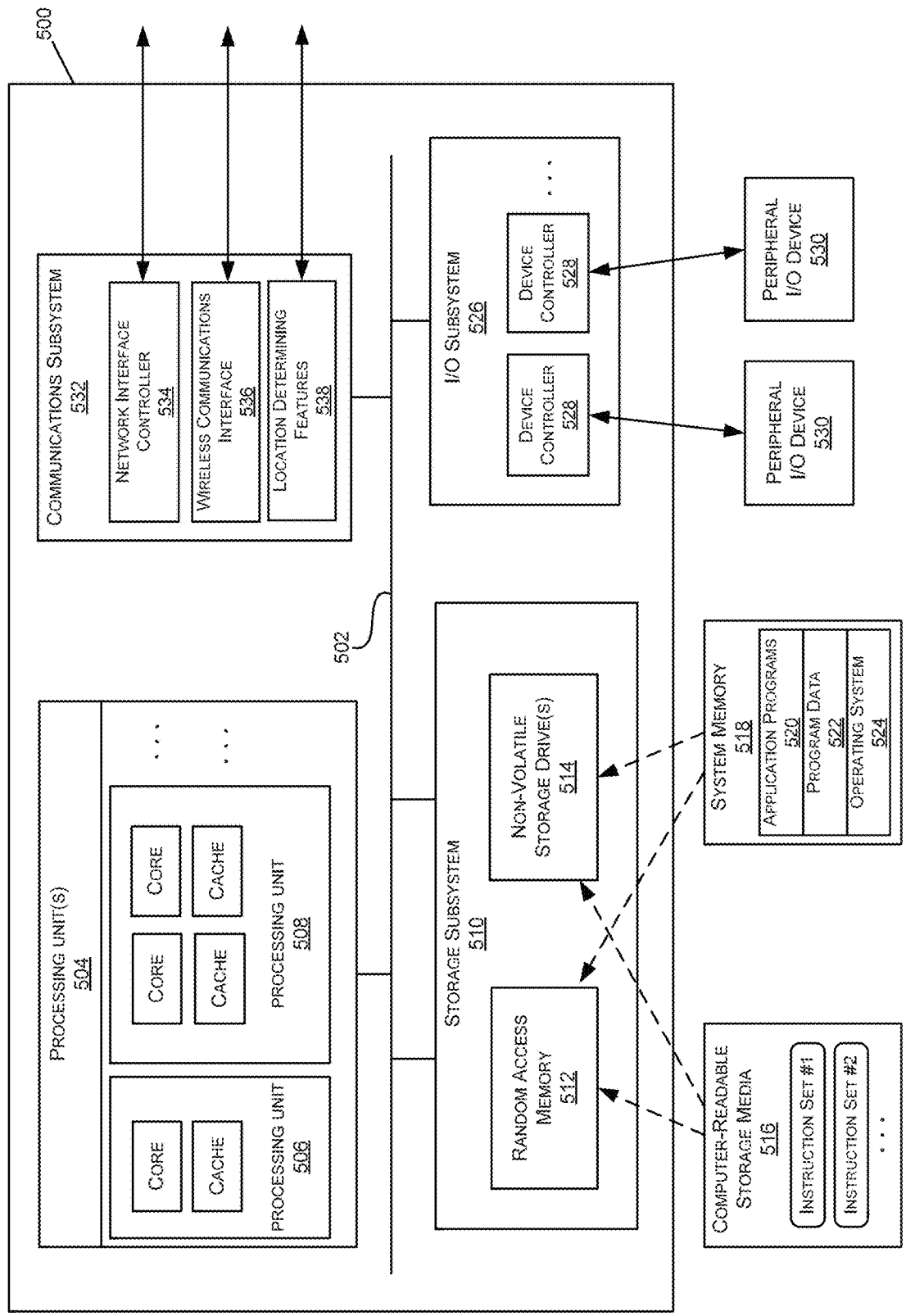
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, micro-phones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics, and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 518 may be stored in volatile memory (such as random access memory (RAM) 512) and/or in non-volatile storage drives 514 (such as read-only memory (ROM), flash memory, etc.). The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 510 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., external data source 313). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
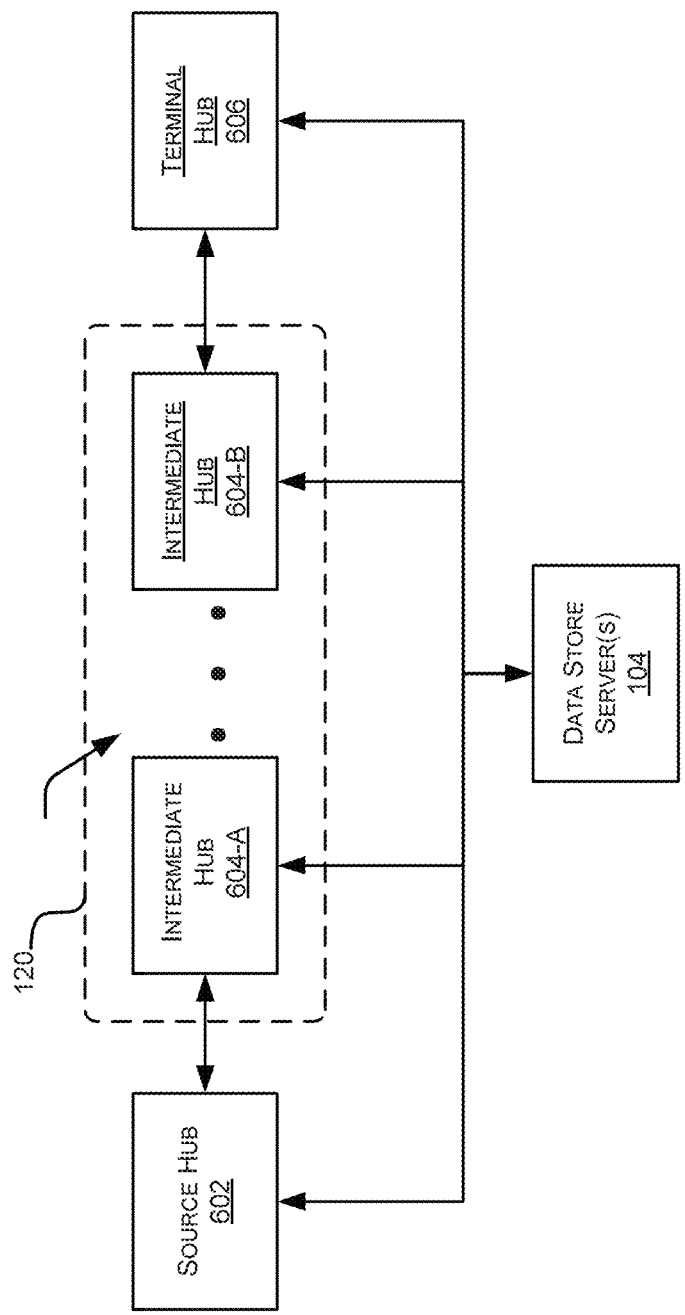
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 and a terminal hub 606 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatively connected with the data store 104. In such an embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
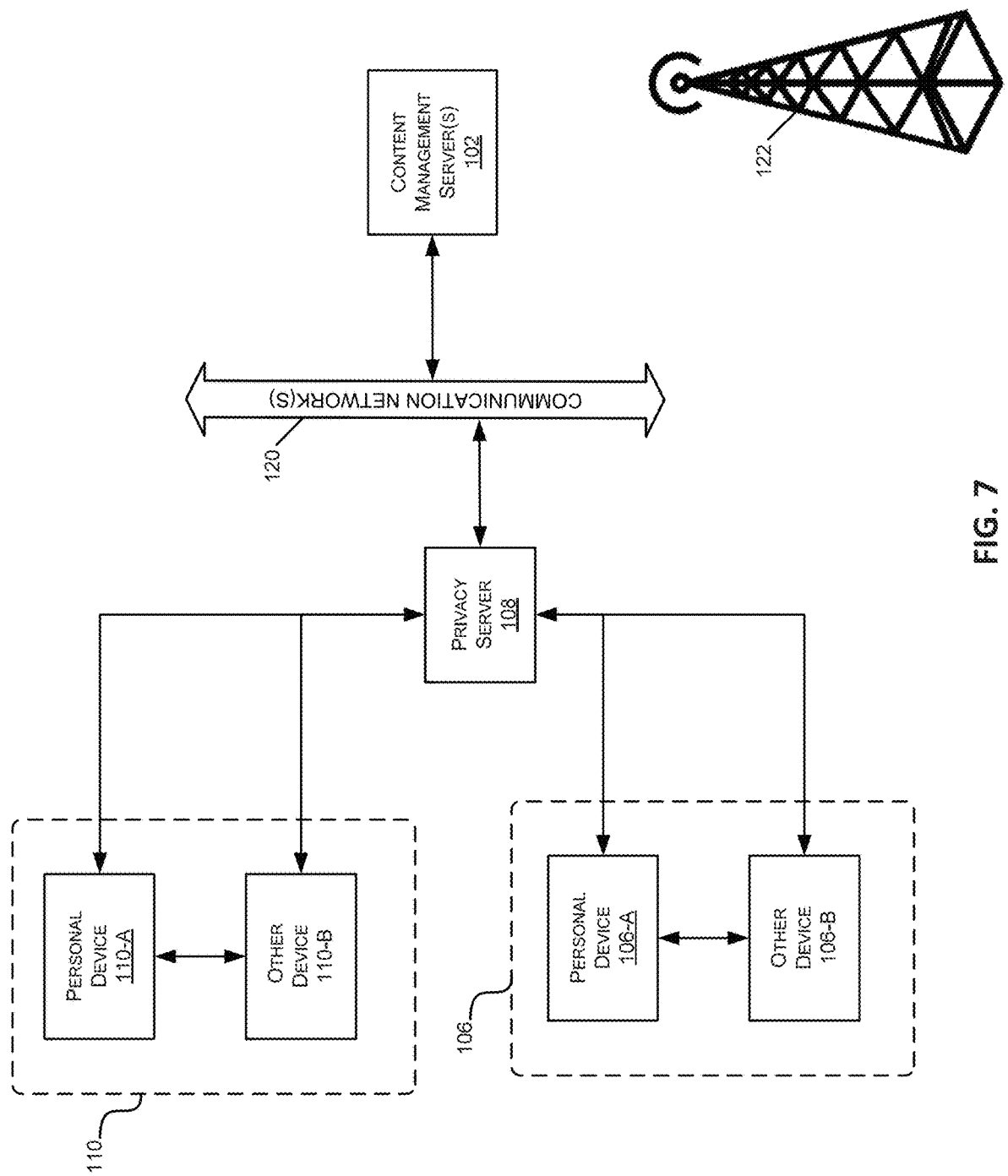
FIG. 7 is a block diagram illustrating one embodiment of user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a smartphone, a tablet, a smartwatch, a laptop, a PC, or the like. In some embodiments, the other device can be any computing device in addition to the personal device. This other device can include, for example, a laptop, a PC, a smartphone, a tablet, a smartwatch, or the like. In some embodiments, the other device differs from the personal device in that the personal device is registered as such within the content distribution network 100 and the other device is not registered as a personal device within the content distribution network 100.

Specifically with respect to FIG. 7 in view of the devices illustrated with FIG. 1, the user device 106 can include a personal user device 106-A and one or several other user devices 106-B. In some embodiments, one or both of the personal user device 106-A and the one or several other user devices 106-B can be communicatively connected to the content management server 102 and/or to the navigation system 122. Similarly, the supervisor device 110 can include a personal supervisor device 110-A and one or several other supervisor devices 110-B. In some embodiments, one or both of the personal supervisor device 110-A and the one or several other supervisor devices 110-B can be communicatively connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert.

In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B, and/or account that is actively being used. If the user is not actively using another device 106-B, 110-B, and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an oral, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an oral, tactile, and/or visual indicator of the alert and/or of the receipt of the alert. In some embodiments, this can include controlling a screen of the supervisor device 110 to display the alert, data contained in alert and/or an indicator of the alert.

Figure 8:
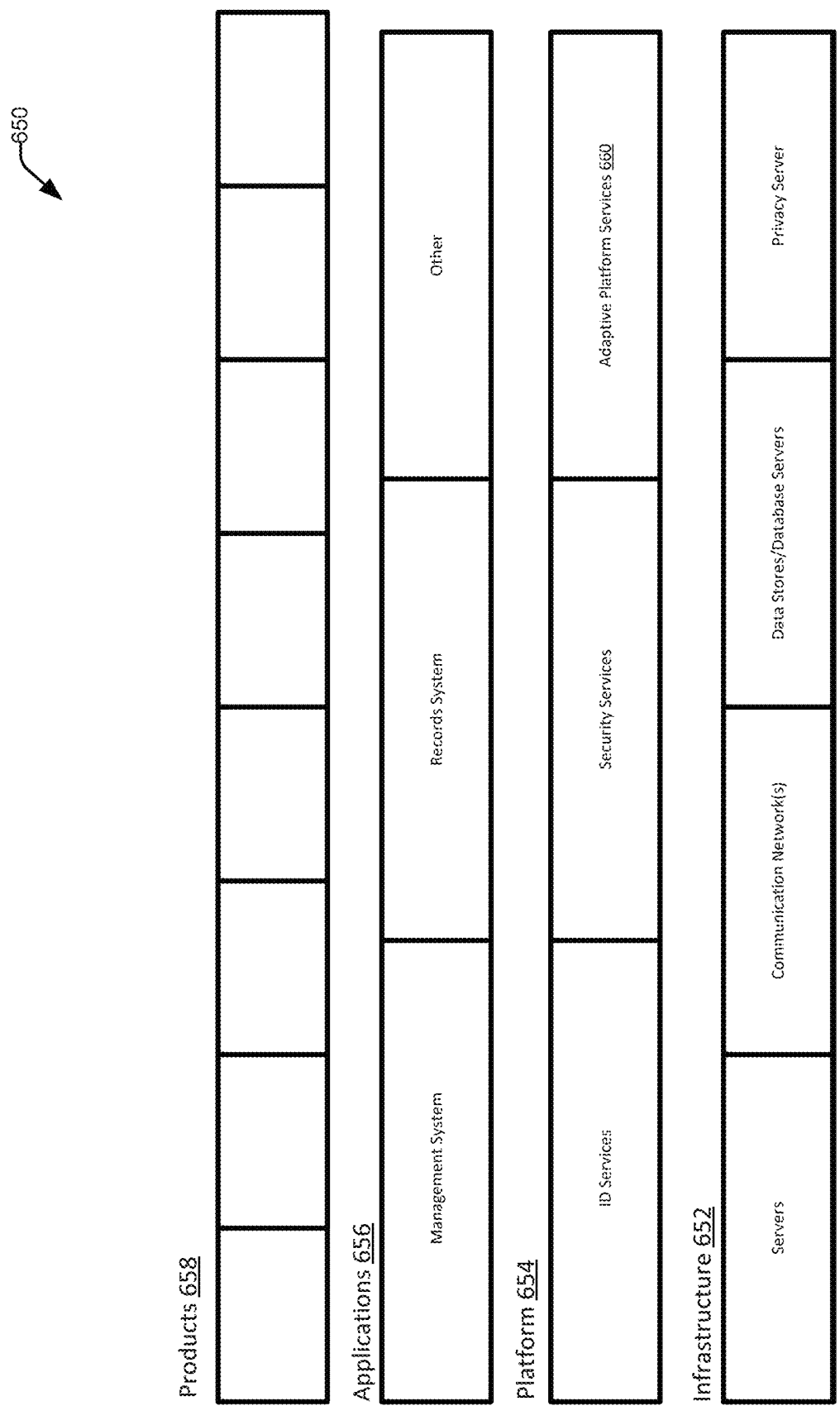
FIG. 8 is a schematic illustration of one embodiment of a computing stack.

With reference now to FIG. 8, a schematic illustration of one embodiment of an application stack, and particularly of a stack 650 is shown. In some embodiments, the content distribution network 100 can comprise a portion of the stack 650 that can include an infrastructure layer 652, a platform layer 654, an applications layer 656, and a products layer 658. In some embodiments, the stack 650 can comprise some or all of the layers, hardware, and/or software to provide one or several desired functionalities and/or productions.

As depicted in FIG. 8, the infrastructure layer 652 can include one or several servers, communication networks, data stores, privacy servers, and the like. In some embodiments, the infrastructure layer can further include one or several user devices 106 and/or supervisor devices 110 connected as part of the content distribution network.

The platform layer can include one or several platform software programs, modules, and/or capabilities. These can include, for example, identification services, security services, and/or adaptive platform services 660. In some embodiments, the identification services can, for example, identify one or several users, components of the content distribution network 100, or the like. The security services can monitor the content distribution network for one or several security threats, breaches, viruses, malware, or the like. The adaptive platform services 660 can receive information from one or several components of the content distribution network 100 and can provide predictions, models, recommendations, or the like based on that received information. The functionality of the adaptive platform services 660 will be discussed in greater detail in FIGS. 9-11, below.

The applications layer 656 can include software or software modules upon or in which one or several product softwares or product software modules can operate. In some embodiments, the applications layer 656 can include, for example, a management system, record system, or the like. In some embodiments, the management system can include, for example, a Learning Management System (LMS), a Content Management System (CMS), or the like. The management system can be configured to control the delivery of one or several resources to a user and/or to receive one or several responses from the user. In some embodiments, the records system can include, for example, a virtual gradebook, a virtual counselor, or the like.

The products layer can include one or several software products and/or software module products. These software products and/or software module products can provide one or several services and/or functionalities to one or several users of the software products and/or software module products.

Figure 9:
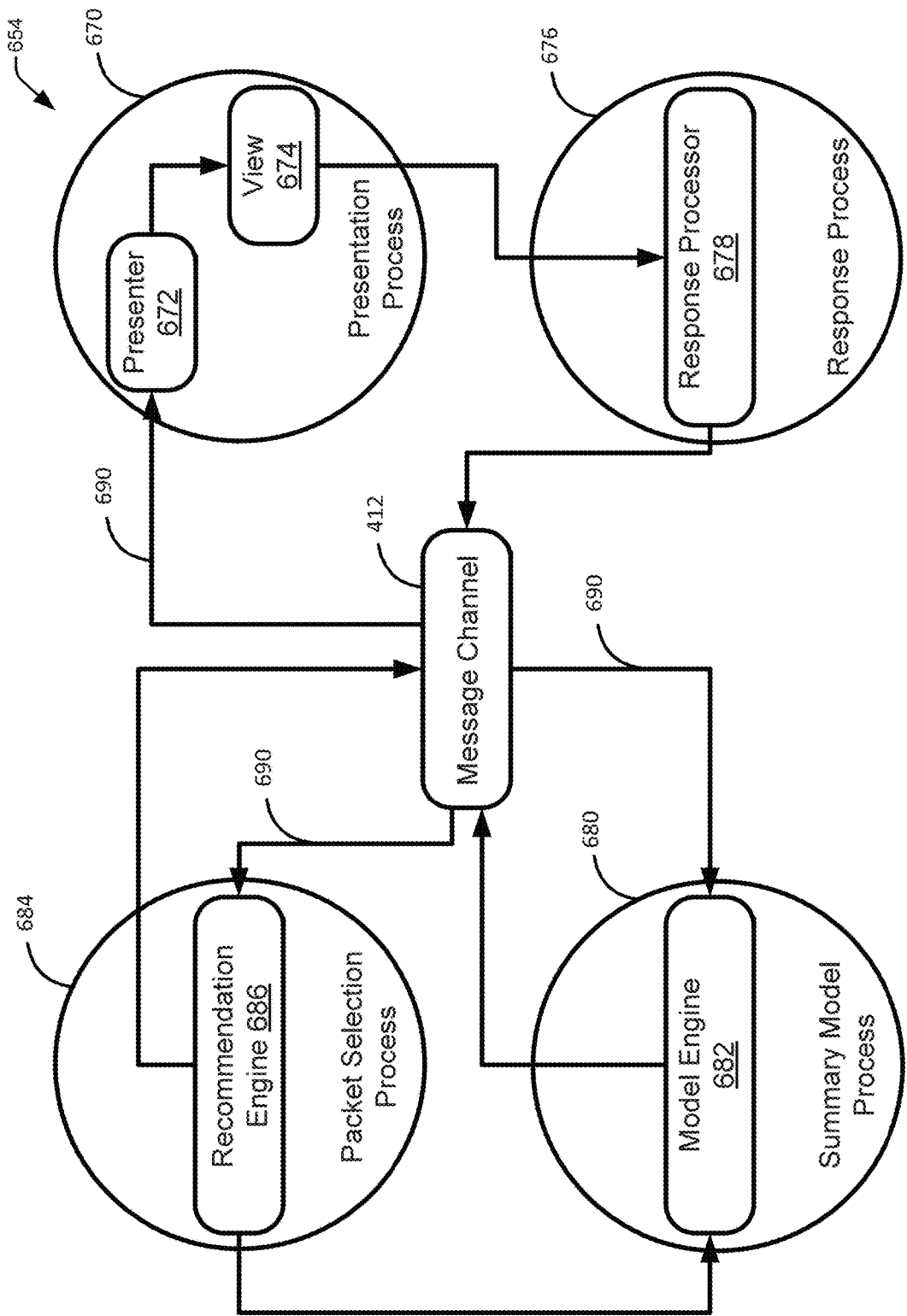
FIG. 9 is a schematic illustration of one embodiment of communication and processing flow of modules within the content distribution network.
Figure 10:
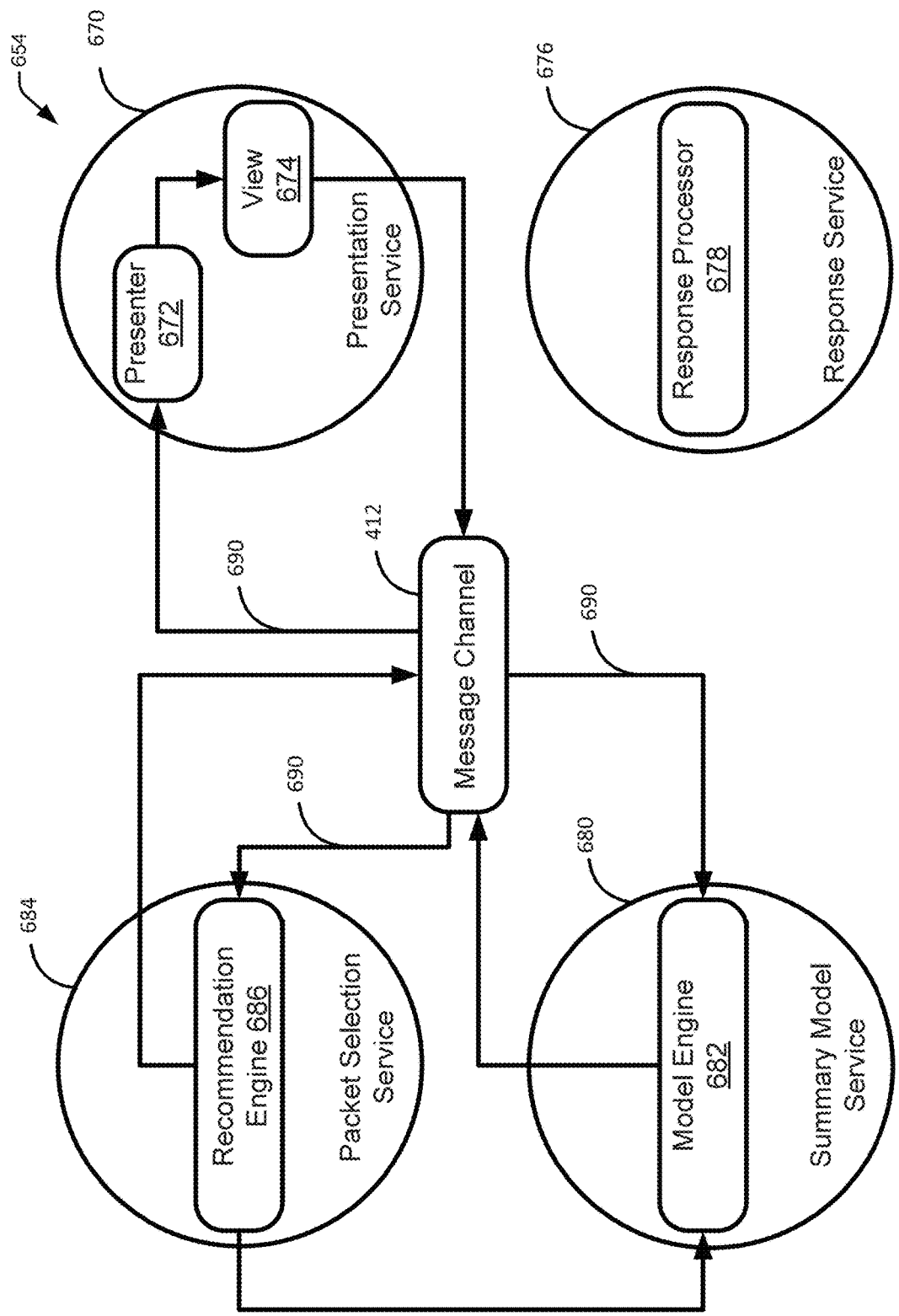
FIG. 10 is a schematic illustration of one embodiment of communication and processing flow of modules within the content distribution network.
Figure 11:
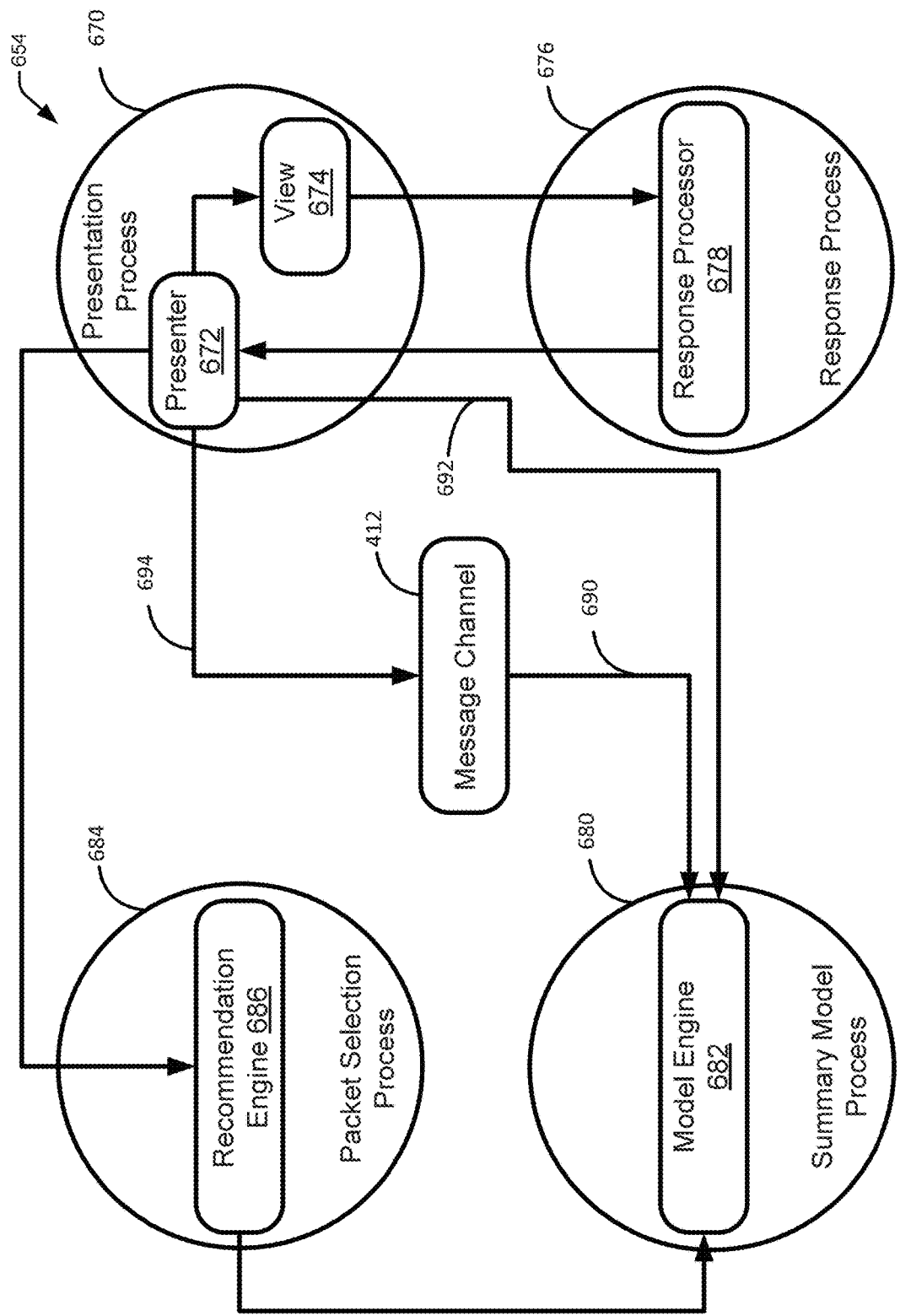
FIG. 11 is a schematic illustration of one embodiment of communication and processing flow of modules within the content distribution network.

With reference now to FIG. 9-11, schematic illustrations of embodiments of communication and processing flow of modules within the content distribution network 100 are shown. In some embodiments, the communication and processing can be performed in portions of the platform layer 654 and/or applications layer 656. FIG. 9 depicts a first embodiment of such communications or processing that can be in the platform layer 654 and/or applications layer 656 via the message channel 412.

The platform layer 654 and/or applications layer 656 can include a plurality of modules that can be embodied in software or hardware. In some embodiments, some or all of the modules can be embodied in hardware and/or software at a single location, and in some embodiments, some or all of these modules can be embodied in hardware and/or software at multiple locations. These modules can perform one or several processes including, for example, a presentation process 670, a response process 676, a summary model process 680, and a packet selection process 684.

The presentation process 670 can, in some embodiments, include one or several method and/or steps to deliver content to one or several user devices 106 and/or supervisor devices 110. The presentation process 670 can be performed by a presenter module 672 and a view module 674. The presenter module 672 can be a hardware or software module of the content distribution network 100, and specifically of the server 102. In some embodiments, the presenter module 672 can include one or several portions, features, and/or functionalities that are located on the server 102 and/or one or several portions, features, and/or functionalities that are located on the user device 106. In some embodiments, the presenter module 672 can be embodied in the presentation system 408.

The presenter module 672 can control the providing of content to one or several user devices 106 and/or supervisor devices 110. Specifically, the presenter module 672 can control the generation of one or several messages to provide content to one or several desired user devices 106 and/or supervisor devices 110. The presenter module 672 can further control the providing of these one or several messages to the desired one or several desired user devices 106 and/or supervisor devices 110. Thus, in some embodiments, the presenter module 672 can control one or several features of the communications subsystem 532 to generate and send one or several electrical signals comprising content to one or several user devices 106 and/or supervisor devices 110.

In some embodiments, the presenter module 672 can control and/or manage a portion of the presentation functions of the presentation process 670, and can specifically manage an "outer loop" of presentation functions. As used herein, the outer loop refers to tasks relating to the tracking of a user's progress through all or a portion of a group of data packets. In some embodiments, this can include the identification of one or several completed data packets or nodes and/or the non-adaptive selection of one or several next data packets or nodes according to, for example, one or several fixed rules. Such non-adaptive selection does not rely on the use of predictive models, but rather on rules identifying next data packets based on data relating to the completion of one or several previously completed data packets or assessments and/or whether one or several previously completed data packets were successfully completed.

In some embodiments, and due to the management of the outer loop of presentation functions including the non-adaptive selection of one or several next data packets, nodes, or tasks by the presenter module, the presenter module can function as a recommendation engine referred to herein as a first recommendation engine or a rules-based recommendation engine. In some embodiments, the first recommendation engine can be configured to select a next node for a user based on one or all of: the user's current location in the content network; potential next nodes; the user's history including the user's previous responses; and one or several guard conditions associated with the potential next nodes. In some embodiments, a guard condition defines one or several prerequisites for entry into, or exit from, a node.

In some embodiments, the presenter module 672 can include a portion located on the server 102 and/or a portion located on the user device 106. In some embodiments, the portion of the presenter module 672 located on the server 102 can receive data packet information and provide a subset of the received data packet information to the portion of the presenter module 672 located on the user device 106. In some embodiments, this segregation of functions and/or capabilities can prevent solution data from being located on the user device 106 and from being potentially accessible by the user of the user device 106.

In some embodiments, the portion of the presenter module 672 located on the user device 106 can be further configured to receive the subset of the data packet information from the portion of the presenter module 672 located on the server 102 and provide that subset of the data packet information to the view module 674. In some embodiments, the portion of the presenter module 672 located on the user device 106 can be further configured to receive a content request from the view module 674 and to provide that content request to the portion of the presenter module 674 located on the server 102.

The view module 674 can be a hardware or software module of some or all of the user devices 106 and/or supervisor devices 110 of the content distribution network 100. The view module 674 can receive one or several electrical signals and/or communications from the presenter module 672 and can provide the content received in those one or several electrical signals and/or communications to the user of the user device 106 and/or supervisor device 110 via, for example, the I/O subsystem 526.

In some embodiments, the view module 674 can control and/or monitor an "inner loop" of presentation functions. As used herein, the inner loop refers to tasks relating to the tracking and/or management of a user's progress through a data packet. This can specifically relate to the tracking and/or management of a user's progression through one or several pieces of content, questions, assessments, and/or the like of a data packet. In some embodiments, this can further include the selection of one or several next pieces of content, next questions, next assessments, and/or the like of the data packet for presentation and/or providing to the user of the user device 106.

In some embodiments, one or both of the presenter module 672 and the view module 674 can comprise one or several presentation engines. In some embodiments, these one or several presentation engines can comprise different capabilities and/or functions. In some embodiments, one of the presentation engines can be configured to track the progress of a user through a single data packet, task, content item, or the like, and in some embodiments, one of the presentation engines can track the progress of a user through a series of data packets, tasks, content items, or the like.

The response process 676 can comprise one or several methods and/or steps to evaluate a response. In some embodiments, this can include, for example, determining whether the response comprises a desired response and/or an undesired response. In some embodiments, the response process 676 can include one or several methods and/or steps to determine the correctness and/or incorrectness of one or several received responses. In some embodiments, this can include, for example, determining the correctness and/or incorrectness of a multiple choice response, a true/false response, a short answer response, an essay response, or the like. In some embodiments, the response processor can employ, for example, natural language processing, semantic analysis, or the like in determining the correctness or incorrectness of the received responses.

In some embodiments, the response process 676 can be performed by a response processor 678. The response processor 678 can be a hardware or software module of the content distribution network 100, and specifically of the server 102. In some embodiments, the response processor 678 can be embodied in the response system 406. In some embodiments, the response processor 678 can be communicatively connected to one or more of the modules of the presentation process 670 such as, for example, the presenter module 672 and/or the view module 674. In some embodiments, the response processor 678 can be communicatively connected with, for example, the message channel 412 and/or other components and/or modules of the content distribution network 100.

The summary model process 680 can comprise one or several methods and/or steps to generate and/or update one or several models. In some embodiments, this can include, for example, implementing information received either directly or indirectly from the response processor 678 to update one or several models. In some embodiments, the summary model process 680 can include the update of a model relating to one or several user attributes such as, for example, a user skill model, a user knowledge model, a learning style model, or the like. In some embodiments, the summary model process 680 can include the update of a model relating to one or several content attributes including attributes relating to a single content item and/or data packet and/or attributes relating to a plurality of content items and/or data packets. In some embodiments, these models can relate to an attribute of the one or several data packets such as, for example, difficulty, discrimination, required time, or the like.

In some embodiments, the summary model process 680 can be performed by the model engine 682. In some embodiments, the model engine 682 can be a hardware or software module of the content distribution network 100, and specifically of the server 102. In some embodiments, the model engine 682 can be embodied in the summary model system 404.

In some embodiments, the model engine 682 can be communicatively connected to one or more of the modules of the presentation process 760 such as, for example, the presenter module 672 and/or the view module 674, can be connected to the response processor 678 and/or the recommendation. In some embodiments, the model engine 682 can be communicatively connected to the message channel 412 and/or other components and/or modules of the content distribution network 100.

The packet selection process 684 can comprise one or several steps and/or methods to identify and/or select a data packet for presentation to a user. In some embodiments, this data packet can comprise a plurality of data packets. In some embodiments, this data packet can be selected according to one or several models updated as part of the summary model process 680. In some embodiments, this data packet can be selected according to one or several rules, probabilities, models, or the like. In some embodiments, the one or several data packets can be selected by the combination of a plurality of models updated in the summary model process 680 by the model engine 682. In some embodiments, these one or several data packets can be selected by a recommendation engine 686. The recommendation engine 686 can be a hardware or software module of the content distribution network 100, and specifically of the server 102. In some embodiments, the recommendation engine 686 can be embodied in the packet selection system 402. In some embodiments, the recommendation engine 686 can be communicatively connected to one or more of the modules of the presentation process 670, the response process 676, and/or the summary model process 680 either directly and/or indirectly via, for example, the message channel.

In some embodiments, and as depicted in FIG. 9, a presenter module 672 can receive a data packet for presentation to a user device 106. This data packet can be received, either directly or indirectly, from a recommendation engine 686. In some embodiments, for example, the presenter module 672 can receive a data packet for providing to a user device 106 from the recommendation engine 686, and in some embodiments, the presenter module 672 can receive an identifier of a data packet for providing to a user device 106 via a view module 674. This can be received from the recommendation engine 686 via a message channel 412. Specifically, in some embodiments, the recommendation engine 686 can provide data to the message channel 412 indicating the identification and/or selection of a data packet for providing to a user via a user device 106. In some embodiments, this data indicating the identification and/or selection of the data packet can identify the data packet and/or can identify the intended recipient of the data packet.

The message channel 412 can output this received data in the form of a data stream 690 which can be received by, for example, the presenter module 672, the model engine 682, and/or the recommendation engine 686. In some embodiments, some or all of: the presenter module 672, the model engine 682, and/or the recommendation engine 686 can be configured to parse and/or filter the data stream 690 to identify data and/or events relevant to their operation. Thus, for example, the presenter module 672 can be configured to parse the data stream for information and/or events relevant to the operation of the presenter module 672.

In some embodiments, the presenter module 672 can, extract the data packet from the data stream 690 and/or extract data identifying the data packet and/or indicating the selecting of a data packet from the data stream. In the event that data identifying the data packet is extracted from the data stream 690, the presenter module 672 can request and receive the data packet from the database server 104, and specifically from the content library database 303. In embodiments in which data indicating the selection of a data packet is extracted from the data stream 690, the presenter module 672 can request and receive identification of the data packet from the recommendation engine 686 and then request and receive the data packet from the database server 104, and specifically from the content library database 303, and in some embodiments in which data indicating the selection of a data packet is extracted from the data stream 690, the presenter module 672 can request and receive the data packet from the recommendation engine 686.

The presenter module can then, provide the data packet and/or portions of the data packet to the view module 674. In some embodiments, for example, the presenter module 672 can retrieve one or several rules and/or conditions that can be, for example, associated with the data packet and/or stored in the database server 104. In some embodiments, these rules and/or conditions can identify portions of a data packet for providing to the view module 674 and/or portions of a data packet to not provide to the view module 674. In some embodiments, for example, sensitive portions of a data packet, such as, for example, solution information to any questions associated with a data packet, is not provided to the view module 674 to prevent the possibility of undesired access to those sensitive portions of the data packet. Thus, in some embodiments, the one or several rules and/or conditions can identify portions of the data packet for providing to the view module 674 and/or portions of the data packet for not providing to the view module.

In some embodiments, the presenter module 672 can, according to the one or more rules and/or conditions, generate and transmit an electronic message containing all or portions of the data packet to the view module 674. The view module 674 can receive these all or portions of the data packet and can provide all or portions of this information to the user of the user device 106 associated with the view module 674 via, for example, the I/O subsystem 526. In some embodiments, as part of the providing of all or portions of the data packet to the user of the view module 674, one or several user responses can be received by the view module 674. In some embodiments, these one or several user responses can be received via the I/O subsystem 526 of the user device 106.

After one or several user responses have been received, the view module 674 can provide the one or several user responses to the response processor 678. In some embodiments, these one or several responses can be directly provided to the response processor 678, and in some embodiments, these one or several responses can be provided indirectly to the response processor 678 via the message channel 412.

After the response processor 678 receives the one or several responses, the response processor 678 can determine whether the responses are desired responses and/or the degree to which the received responses are desired responses. In some embodiments, the response processor can make this determination via, for example, use of one or several techniques, including, for example, natural language processing (NLP), semantic analysis, or the like.

In some embodiments, the response processor can determine whether a response is a desired response and/or the degree to which a response is a desired response with comparative data which can be associated with the data packet. In some embodiments, this comparative data can comprise, for example, an indication of a desired response and/or an indication of one or several undesired responses, a response key, a response rubric comprising one or several criterion for determining the degree to which a response is a desired response, or the like. In some embodiments, the comparative data can be received as a portion of and/or associated with a data packet. In some embodiments, the comparative data can be received by the response processor 678 from the presenter module 672 and/or from the message channel 412. In some embodiments, the response data received from the view module 674 can comprise data identifying the user and/or the data packet or portion of the data packet with which the response is associated. In some embodiments in which the response processor 678 merely receives data identifying the data packet and/or portion of the data packet associated with the one or several responses, the response processor 678 can request and/or receive comparative data from the database server 104, and specifically from the content library database 303 of the database server 104.

After the comparative data has been received, the response processor 678 determines whether the one or several responses comprise desired responses and/or the degree to which the one or several responses comprise desired responses. The response processor can then provide the data characterizing whether the one or several responses comprises desired responses and/or the degree to which the one or several responses comprise desired responses to the message channel 412. The message channel can, as discussed above, include the output of the response processor 678 in the data stream 690 which can be constantly output by the message channel 412.

In some embodiments, the model engine 682 can subscribe to the data stream 690 of the message channel 412 and can thus receive the data stream 690 of the message channel 412 as indicated in FIG. 9. The model engine 682 can monitor the data stream 690 to identify data and/or events relevant to the operation of the model engine. In some embodiments, the model engine 682 can monitor the data stream 690 to identify data and/or events relevant to the determination of whether a response is a desired response and/or the degree to which a response is a desired response.

When a relevant event and/or relevant data is identified by the model engine, the model engine 682 can take the identified relevant event and/or relevant data and modify one or several models. In some embodiments, this can include updating and/or modifying one or several models relevant to the user who provided the responses, updating and/or modifying one or several models relevant to the data packet associated with the responses, and/or the like. In some embodiments, these models can be retrieved from the database server 104, and in some embodiments, can be retrieved from the model data source 309 of the database server 104.

After the models have been updated, the updated models can be stored in the database server 104. In some embodiments, the model engine 682 can send data indicative of the event of the completion of the model update to the message channel 412. The message channel 412 can incorporate this information into the data stream 690 which can be received by the recommendation engine 686. The recommendation engine 686 can monitor the data stream 690 to identify data and/or events relevant to the operation of the recommendation engine 686. In some embodiments, the recommendation engine 686 can monitor the data stream 690 to identify data and/or events relevant to the updating of one or several models by the model engine 682.

When the recommendation engine 686 identifies information in the data stream 690 indicating the completion of the summary model process 680 for models relevant to the user providing the response and/or for models relevant to the data packet provided to the user, the recommendation engine 686 can identify and/or select a next data packet for providing to the user and/or to the presentation process 470. In some embodiments, this selection of the next data packet can be performed according to one or several rules and/or conditions. After the next data packet has been selected, the recommendation engine 686 can provide information to the model engine 682 identifying the next selected data packet and/or to the message channel 412 indicating the event of the selection of the next content item. After the message channel 412 receives information identifying the selection of the next content item and/or receives the next content item, the message channel 412 can include this information in the data stream 690 and the process discussed with respect to FIG. 9 can be repeated.

With reference now to FIG. 10, a schematic illustration of a second embodiment of communication or processing that can be in the platform layer 654 and/or applications layer 656 via the message channel 412 is shown. In the embodiment depicted in FIG. 10, the data packet provided to the presenter module 672 and then to the view module 674 does not include a prompt for a user response and/or does not result in the receipt of a user response. As no response is received, when the data packet is completed, nothing is provided to the response processor 678, but rather data indicating the completion of the data packet is provided from one of the view module 674 and/or the presenter module 672 to the message channel 412. The data is then included in the data stream 690 and is received by the model engine 682 which uses the data to update one or several models. After the model engine 682 has updated the one or several models, the model engine 682 provides data indicating the completion of the model updates to the message channel 412. The message channel 412 then includes the data indicating the completion of the model updates in the data stream 690 and the recommendation engine 686, which can subscribe to the data stream 690, can extract the data indicating the completion of the model updates from the data stream 690. The recommendation engine 686 can then identify a next one or several data packets for providing to the presenter module 672, and the recommendation engine 686 can then, either directly or indirectly, provide the next one or several data packets to the presenter module 672.

With reference now to FIG. 11, a schematic illustration of an embodiment of dual communication, or hybrid communication, in the platform layer 654 and/or applications layer 656 is shown. Specifically, in this embodiment, some communication is synchronous with the completion of one or several tasks and some communication is asynchronous. Thus, in the embodiment depicted in FIG. 11, the presenter module 672 communicates synchronously with the model engine 682 via a direct communication 692 and communicates asynchronously with the model engine 682 via the message channel 412.

Specifically, and with reference to FIG. 11, the presenter module 672 can receive and/or select a data packet for presentation to the user device 106 via the view module 674. In some embodiments, the presenter module 672 can identify all or portions of the data packet that can be provided to the view module 674 and portions of the data packet for retaining form the view module 674. In some embodiments, the presenter module can provide all or portions of the data packet to the view module 674. In some embodiments, and in response to the receipt of all or portions of the data packet, the view module 674 can provide a confirmation of receipt of the all or portions of the data packet and can provide those all or portions of the data packet to the user via the user device 106. In some embodiments, the view module 674 can provide those all or portions of the data packet to the user device 106 while controlling the inner loop of the presentation of the data packet to the user via the user device 106.

After those all or portions of the data packet have been provided to the user device 106, a response indicative of the completion of one or several tasks associated with the data packet can be received by the view module 674 from the user device 106, and specifically from the I/O subsystem 526 of the user device 106. In response to this receive, the view module 674 can provide an indication of this completion status to the presenter module 672 and/or can provide the response to the response processor 678.

After the response has been received by the response processor 678, the response processor 678 can determine whether the received response is a desired response. In some embodiments, this can include, for example, determining whether the response comprises a correct answer and/or the degree to which the response comprises a correct answer.

After the response processor has determined whether the received response is a desired response, the response processor 678 can provide an indicator of the result of the determination of whether the received response is a desired response to the presenter module 672. In response to the receipt of the indicator of whether the result of the determination of whether the received response is a desired response, the presenter module 672 can synchronously communicate with the model engine 682 via a direct communication 692 and can asynchronously communicate with model engine 682 via the message channel 412. In some embodiments, the synchronous communication can advantageously include two-way communication between the model engine 682 and the presenter module 672 such that the model engine 682 can provide an indication to the presenter module 672 when model updating is completed by the model engine.

After the model engine 682 has received one or both of the synchronous and asynchronous communications, the model engine 682 can update one or several models relating to, for example, the user, the data packet, or the like. After the model engine 682 has completed the updating of the one or several models, the model engine 682 can send a communication to the presenter module 672 indicating the completion of the updated one or several modules.

After the presenter module 672 receives the communication indicating the completion of the updating of the one or several models, the presenter module 672 can send a communication to the recommendation engine 686 requesting identification of a next data packet. As discussed above, the recommendation engine 686 can then retrieve the updated model and retrieve the user information. With the updated models and the user information, the recommendation engine can identify a next data packet for providing to the user, and can provide the data packet to the presenter module 672. In some embodiments, the recommendation engine 686 can further provide an indication of the next data packet to the model engine 682, which can use this information relating to the next data packet to update one or several models, either immediately, or after receiving a communication from the presenter module 672 subsequent to the determination of whether a received response for that data packet is a desired response.

Figure 12:
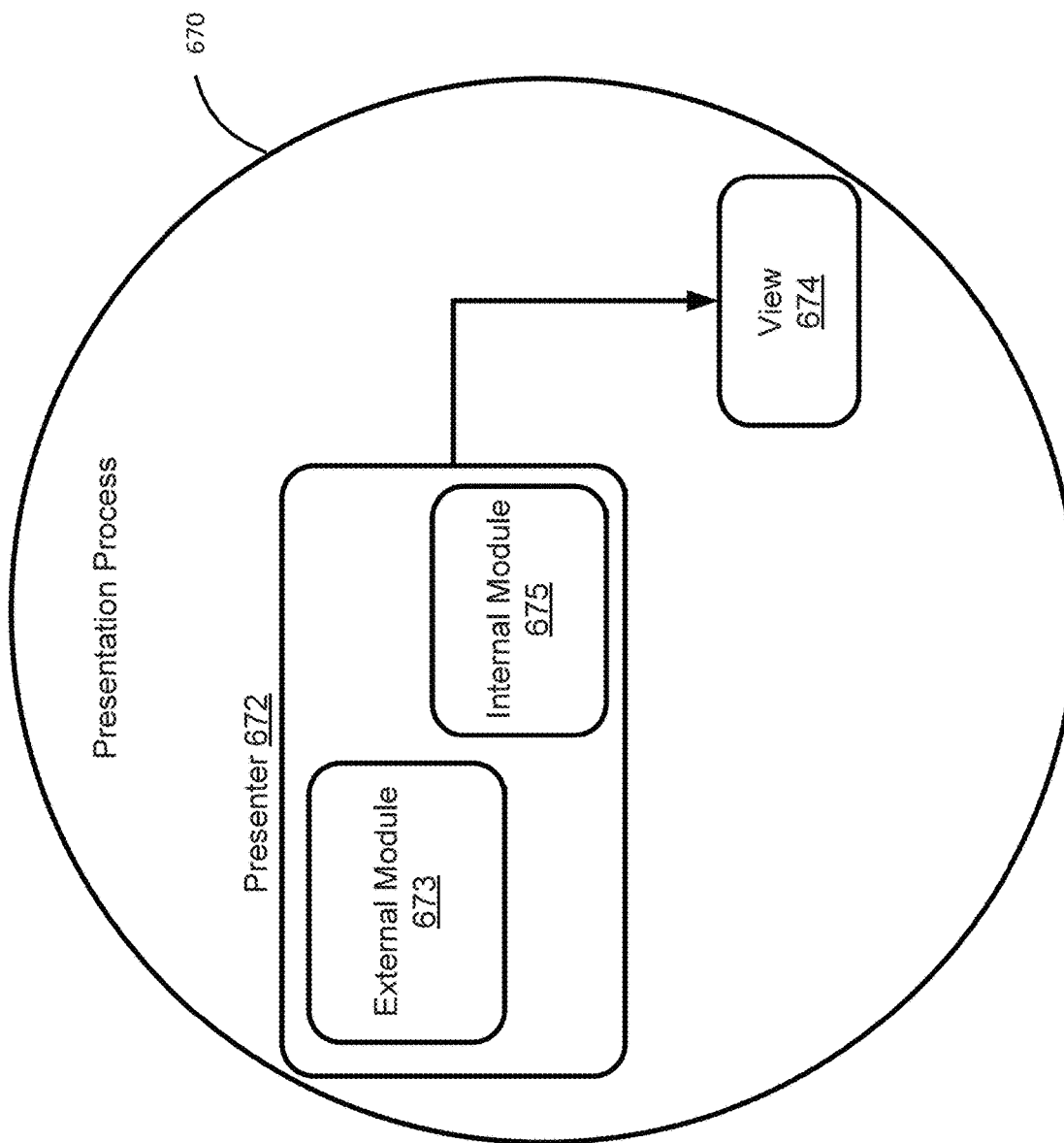
FIG. 12 is a schematic illustration of one embodiment of communication and processing flow of modules within the content distribution network.

With reference now to FIG. 12, a schematic illustration of one embodiment of the presentation process 670 is shown. Specifically, FIG. 12 depicts multiple portions of the presenter module 672, namely, the external portion 673 and the internal portion 675. In some embodiments, the external portion 673 of the presenter module 672 can be located in the server, and in some embodiments, the internal portion 675 of the presenter module 672 can be located in the user device 106. In some embodiments, the external portion 673 of the presenter module can be configured to communicate and/or exchange data with the internal portion 675 of the presenter module 672 as discussed herein. In some embodiments, for example, the external portion 673 of the presenter module 672 can receive a data packet and can parse the data packet into portions for providing to the internal portion 675 of the presenter module 672 and portions for not providing to the internal portion 675 of the presenter module 672. In some embodiments, the external portion 673 of the presenter module 672 can receive a request for additional data and/or an additional data packet from the internal portion 675 of the presenter module 672. In such an embodiment, the external portion 673 of the presenter module 672 can identify and retrieve the requested data and/or the additional data packet from, for example, the database server 104 and more specifically from the content library database 104.

Figure 13:
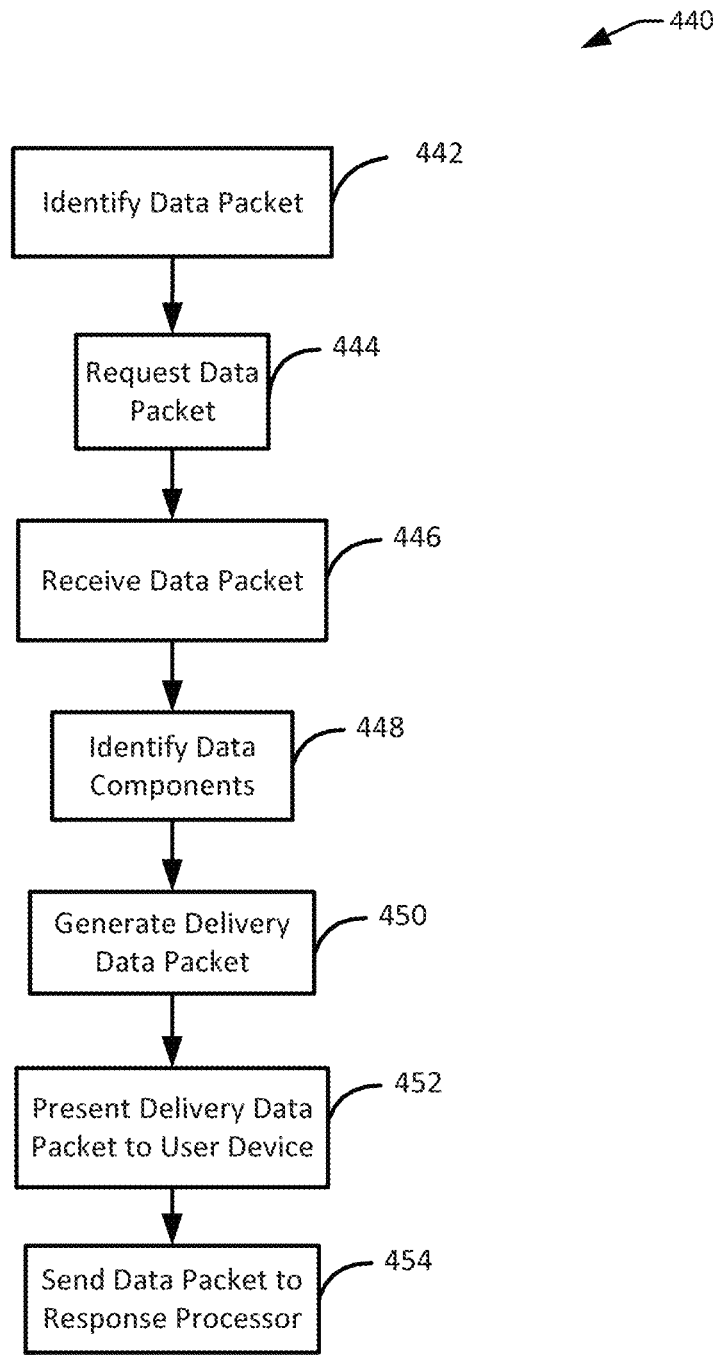
FIG. 13 is a flowchart illustrating one embodiment of a process for data management.

With reference now to FIG. 13, a flowchart illustrating one embodiment of a process 440 for data management is shown. In some embodiments, the process 440 can be performed by the content management server 102, and more specifically by the presentation system 408 and/or by the presentation module or presentation engine. In some embodiments, the process 440 can be performed as part of the presentation process 670.

The process 440 begins at block 442, wherein a data packet is identified. In some embodiments, the data packet can be a data packet for providing to a student-user. In some embodiments, the data packet can be identified based on a communication received either directly or indirectly from the recommendation engine 686.

After the data packet has been identified, the process 440 proceeds to block 444, wherein the data packet is requested. In some embodiments, this can include the requesting of information relating to the data packet such as the data forming the data packet. In some embodiments, this information can be requested from, for example, the content library database 303. After the data packet has been requested, the process 440 proceeds to block 446, wherein the data packet is received. In some embodiments, the data packet can be received by the presentation system 408 from, for example, the content library database 303.

After the data packet has been received, the process 440 proceeds to block 448, wherein one or several data components are identified. In some embodiments, for example, the data packet can include one or several data components which can, for example, contain different data. In some embodiments, one of these data components, referred to herein as a presentation component, can include content for providing to the user, which content can include one or several requests and/or questions and/or the like. In some embodiments, one of these data components, referred to herein as a response component, can include data used in evaluating one or several responses received from the user device 106 in response to the data packet, and specifically in response to the presentation component and/or the one or several requests and/or questions of the presentation component. Thus, in some embodiments, the response component of the data packet can be used to ascertain whether the user has provided a desired response or an undesired response.

After the data components have been identified, the process 440 proceeds to block 450, wherein a delivery data packet is identified. In some embodiments, the delivery data packet can include the one or several data components of the data packets for delivery to a user such as the user via the user device 106. In some embodiments, the delivery packet can include the presentation component, and in some embodiments, the delivery packet can exclude the response packet. After the delivery data packet has been generated, the process 440 proceeds to block 452, wherein the delivery data packet is provided to the user device 106 and more specifically to the view module 674. In some embodiments, this can include providing the delivery data packet to the user device 106 via, for example, the communication network 120.

After the delivery data packet has been provided to the user device 106, the process 440 proceeds to block 454, wherein the data packet and/or one or several components thereof is sent to and/or provided to the response processor 678. In some embodiments, this sending of the data packet and/or one or several components thereof to the response processor can include receiving a response from the user, and sending the response to the user to the response processor simultaneous with the sending of the data packet and/or one or several components thereof to the response processor. In some embodiments, for example, this can include providing the response component to the response processor. In some embodiments, the response component can be provided to the response processor from the presentation system 408.

Figure 14:
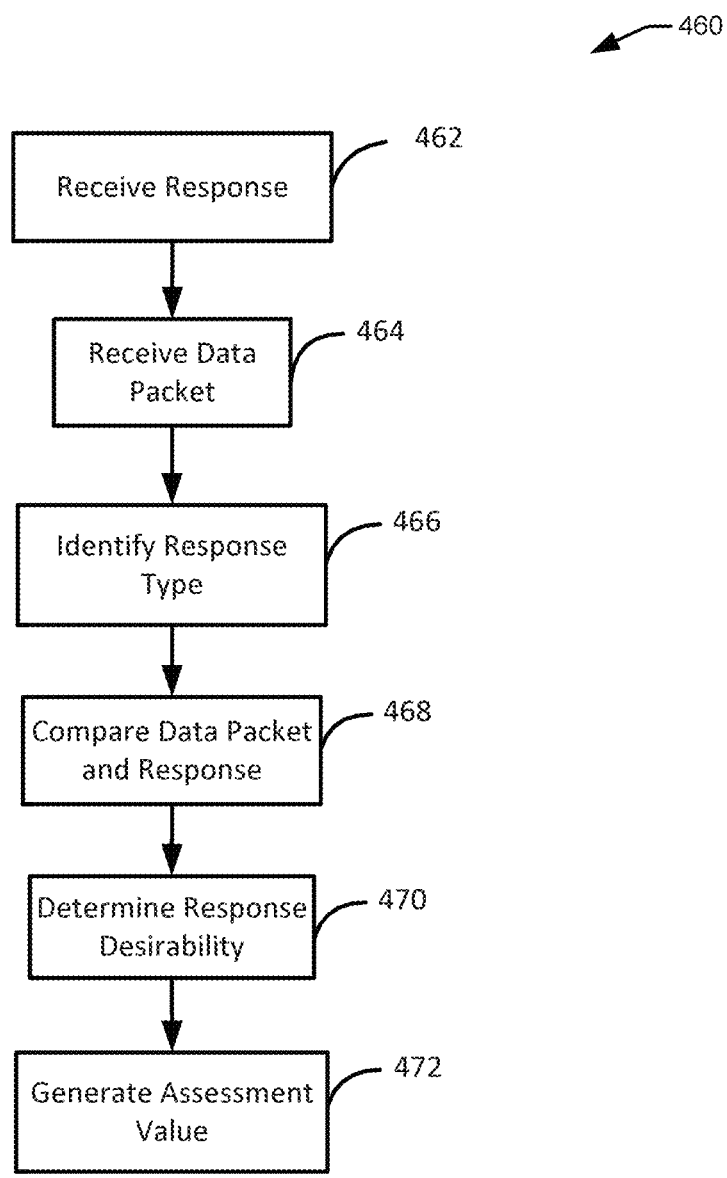
FIG. 14 is a flowchart illustrating one embodiment of a process for evaluating a response.

With reference now to FIG. 14, a flowchart illustrating one embodiment of a process 460 for evaluating a response is shown. In some embodiments, the process can be performed as a part of the response process 676 and can be performed by, for example, the response system 406 and/or by the response processor 678. In some embodiments, the process 460 can be performed by the response system 406 in response to the receipt of a response, either directly or indirectly, from the user device 106 or from the view module 674.

The process 460 begins at block 462, wherein a response is received from, for example, the user device 106 via, for example, the communication network 120. After the response has been received, the process 460 proceeds to block 464, wherein the data packet associated with the response is received. In some embodiments, this can include receiving all or one or several components of the data packet such as, for example, the response component of the data packet. In some embodiments, the data packet can be received by the response processor from the presentation engine.

After the data packet has been received, the process 460 proceeds to block 466, wherein the response type is identified. In some embodiments, this identification can be performed based on data, such as metadata associated with the response. In other embodiments, this identification can be performed based on data packet information such as the response component.

In some embodiments, the response type can identify one or several attributes of the one or several requests and/or questions of the data packet such as, for example, the request and/or question type. In some embodiments, this can include identifying some or all of the one or several requests and/or questions as true/false, multiple choice, short answer, essay, or the like.

After the response type has been identified, the process 460 proceeds to block 468, wherein the data packet and the response are compared to determine whether the response comprises a desired response and/or an undesired response.

In some embodiments, this can include comparing the received response and the data packet to determine if the received response matches all or portions of the response component of the data packet, to determine the degree to which the received response matches all or portions of the response component, to determine the degree to which the received response embodies one or several qualities identified in the response component of the data packet, or the like. In some embodiments, this can include classifying the response according to one or several rules. In some embodiments, these rules can be used to classify the response as either desired or undesired. In some embodiments, these rules can be used to identify one or several errors and/or misconceptions evidenced in the response. In some embodiments, this can include, for example: use of natural language processing software and/or algorithms; use of one or several digital thesauruses; use of lemmatization software, dictionaries, and/or algorithms; or the like.

After the data packet and the response have been compared, the process 460 proceeds to block 470 wherein response desirability is determined. In some embodiments this can include, based on the result of the comparison of the data packet and the response, whether the response is a desired response or is an undesired response. In some embodiments, this can further include quantifying the degree to which the response is a desired response. This determination can include, for example, determining if the response is a correct response, an incorrect response, a partially correct response, or the like. In some embodiments, the determination of response desirability can include the generation of a value characterizing the response desirability and the storing of this value in one of the databases 104 such as, for example, the user profile database 301. After the response desirability has been determined, the process 460 proceeds to block 472, wherein an assessment value is generated. In some embodiments, the assessment value can be an aggregate value characterizing response desirability for one or more of a plurality of responses. This assessment value can be stored in one of the databases 104 such as the user profile database 301.

In some embodiments, content provisioning performed in accordance with the processes of FIGS. 11 through 14 can provide significant benefits over current content provisioning with a computer, especially over current content provisioning with a computer in an educational environment. In some embodiments, content provisioning as described in FIGS. 11 through 14 can be based on real-time and dynamic prioritization that can be based on models of one or several user attributes such as user skill level, models of one or several task attributes, such as task difficulty levels, or the like. This provides the significant benefit of accurately selecting content most suited for delivery which increases the efficiency with which content is provided to the user.

Figure 15:
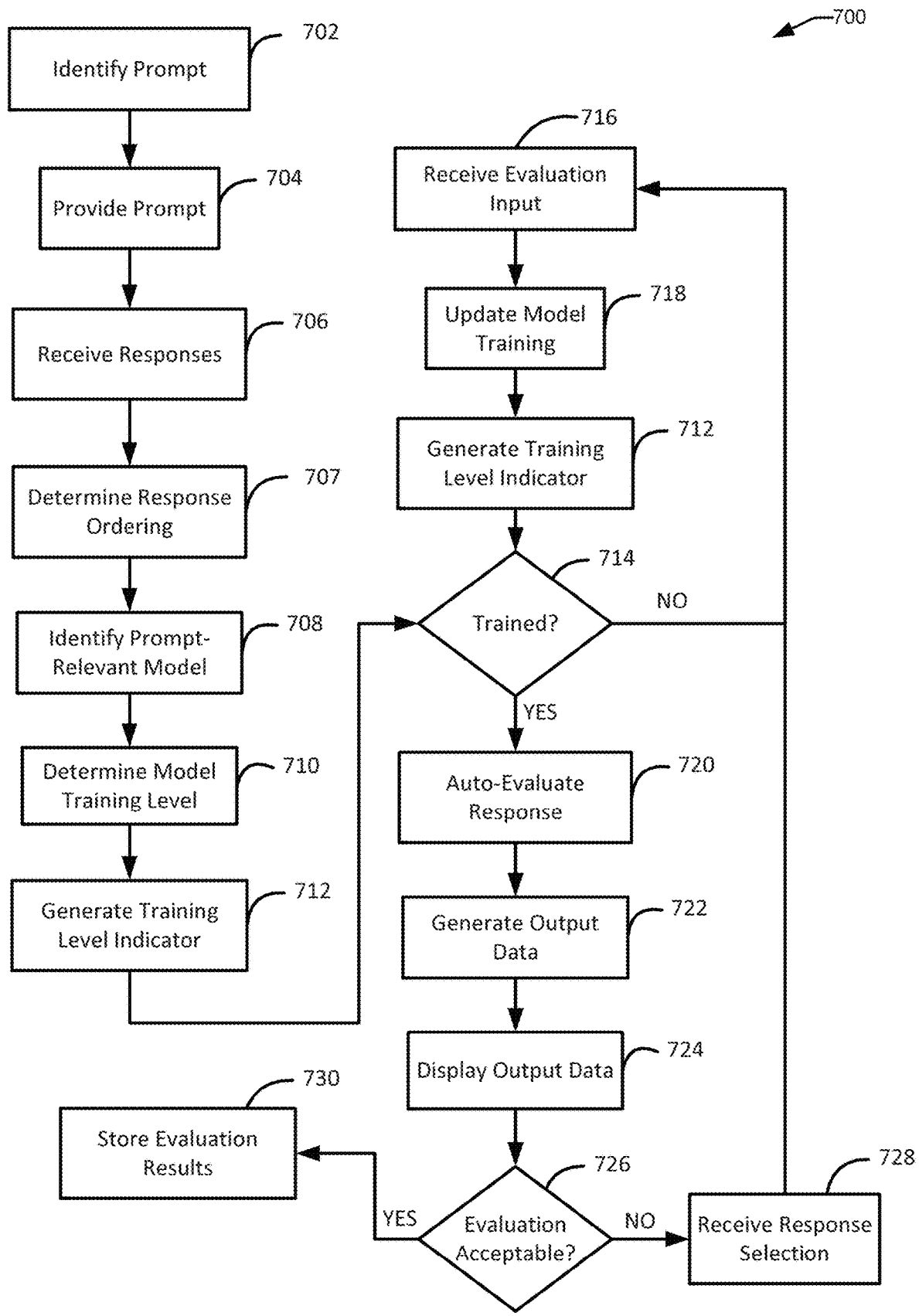
FIG. 15 is a flowchart illustrating one embodiment of a process for automated response evaluation.

With reference now to FIG. 15, a flowchart illustrating one embodiment of a process 700 for automated response evaluation is shown. The process 700 can be performed by all or portions of the content distribution network 100. The process 700 can be performed as a part of customizing a machine-learning model for use in evaluating a customize prompt and/or for custom evaluation. The process 700 begins at block 702 wherein a prompt is identified. In some embodiments, the prompt can be identified based on input received from a teacher via a supervisor device 110 identifying one or several prompts, for providing to one or several groups of students, such as, for example, students within one or several courses, classes, programs, or the like. In some embodiments, the prompt can be identified in response to a received request for a prompt, which request can be received from a user device 106 is a part of, for example, completion of an assignment, test, course, class, program, or the like. In such an embodiment, the prompt corresponding to the received request can be identified by the server 102. In some embodiments, for example, the server 102 can query the content library database 303 for a prompt corresponding to the received request.

After the prompt is been identified, the process 700 proceeds to block 700 for wherein the prompt is provided. In some embodiments, the prompt can be provided by the server 102 to one or several user devices 106. In some embodiments, this can include the generation of one or several signals or communications comprising the prompt, and specifically one or several communications, including the prompt. These one or several signals or communications can be sent from the server 102 to the user device 106 via the communication network 120. Upon receipt, the user device 106 and specifically the I/O subsystem 526 can provide the prompt to the user via, for example, launch of a user interface. In some embodiments, the prompt can be provided as a part of the presentation service 670.

In some embodiments, for example, the teacher may assign one or several prompts, an assignment, including one or several prompts, a test, a quiz, including one or several prompts, or the like to a set of students. The set of students can include all or portion of students within a class, course, program, or the like. In some embodiments, the step of block 704 can include the providing of the prompt or the providing of a plurality of problems to the students. In this set of students. In such an embodiment, the step of block 704 may be performed simultaneously for all of the students in the set of students, or alternatively, the step of block 704 may be performed at different times for some or all of the students in the set of students.

After the prompt has been provided, the process 700 proceeds to block 706, wherein responses to the provided prompt are received. In some embodiments, these responses can be received simultaneously or spread out over a period of time. This period of time may have a predetermined duration or alternatively may last as long as necessary for all responses to the provided prompt to be received. In some embodiments, the step of block 706 can be performed simultaneous with one or several of the other steps of process 700. In some embodiments, for example, some or all of the remaining steps of the process 700 can be performed after receipt of each of one or several responses, without waiting for receipt of all of the desired responses. The responses can be received by the server 102 from one or several user devices 106 via the communication network 120.

After the responses have been received, or as the responses are being received, the process 700 proceeds to block 707, wherein the ordering of responses is determined. In some embodiments, this ordering can be the ordering in which one or several responses are provided for manual evaluation result generation. In some embodiments, this ordering can be determined based on the estimated contribution of each response towards completion of training of the model and/or based on the estimated degree to which the response is representative of received responses. The ordering can be determined by the processor 102.

At block 708 of the process 700, one or several prompt relevant models identified. In some embodiments, block 708 can be performed subsequent to, simultaneous, or before the step of block 707. In some embodiments, for example, one or several models may be associated with a prompt and may be used to evaluate all or portions of that prompt. In some embodiments, for example, a prompt may be associated with multiple evaluation components such as may be contained within a rubric. In some embodiments, a single model may be used for evaluation of the prompt or a plurality of models may be used for evaluation of the prompt. In some embodiments, for example, a unique model can be associated with each of the evaluation components such that a score for each of the evaluation components is determined by the unique model of that evaluation component. In some embodiments, one or several of the evaluation components may include some criteria, some or all of which can be further associated with unique evaluation models. In some embodiments, the content library database 303 can include information identifying evaluation components of a prompt and this information can include one or several pointers to models stored within the model database 309. In some embodiments, the prompt relevant models can be identified by the server 102 by retrieving information identifying evaluation components of the prompt from the content library database 303 and following the pointers to the models in the model database 300.

After the prompt relevant models have been determined, the process 700 proceeds to block 710 wherein model training level is determined. In some embodiments, the model training level can be determined for each of the models associated with the prompt provided in block 704. In some embodiments, the model training level can be determined based on one or several values indicative of the accuracy of the model and/or the confidence in the accuracy of the model. In some embodiments, for example, the model training level can be indicated by a confidence value calculated for the model. In embodiments in which a prompt is associated with a plurality of models, a separate confidence value can be calculated for each of some or all of the plurality of models. In some embodiments, for example, some of the plurality of models may be completely trained, whereas others of the models may not be completely trained and/or may be insufficiently trained. The model training level can be determined by the processor 102.

After the training level has been determined, the process 700 proceeds to block 712, wherein the training level indicator is generated and/or wherein control signals for generation of a training level indicator are generated. In some embodiments, the training level indicator can comprise an indicator of the training level of the one or several models associated with the prompt provided in block 704. In some embodiments, the training level indicator can be provided to the supervisor via the supervisor device 110, and specifically, the training level indicator can comprise a graphical indicator that can be generated within the user interface of the supervisor device 110 and can indicate a training level of the one or several models associated with the prompt provided in block 704.

After the generation of the training level indicator, the process 700 proceeds to block 714 wherein it is determined if the one or several models associated with the prompt provided in block 704 are adequately trained. The determination of adequate training of the model can be performed using any desired technique or method. In some embodiments, this determination can be made based on a comparison of evaluation results generated by the one or several models and one or several manually generated evaluation results. In some embodiments, this can include a comparison of determined model training levels to one or several thresholds. Specifically, in some embodiments, this can include a comparison of a confidence value associated with each of the models associated with the provided prompt to a threshold delineating between adequate confidence levels, and inadequate confidence levels. This threshold can be retrieved from the database server 104 and specifically from the threshold database 310.

If it is determined that the model is inadequately trained, then the process 700 proceeds to block 716 wherein an evaluation input is received. In some embodiments, this step can include indicating to the teacher via the supervisor device 110 that one or several of the models associated with the provided prompt are inadequately trained, and requesting the teacher, to manually grade one or several additional responses. In some embodiments, these one or several additional responses can be selected according to a selection algorithm which identifies responses, most representative of the set of responses received to the provided prompt from the set of students to whom the prompt is provided. In some embodiments, these one or several additional responses can be selected according to a selection algorithm which identifies responses that will most quickly or effectively move the model towards adequate training. These one or several additional responses can be selected by the server 102 and can be provided to the teacher via the supervisor device 110. In some embodiments, the teacher can evaluate these one or several responses, and can provide an evaluation input via the user interface and/or the I/O subsystem 526 of the supervisor device 110. In some embodiments, this evaluation inputs can be provided to the server 102 from the supervisor device 110 via the communication network 120, and thus response evaluation inputs can be received by the server 102.

After receipt of one or several evaluation inputs, the process 700 proceeds to block 718, wherein model training is updated. In some embodiments, this can include adding received evaluation inputs to the set of training data and modify or retraining the model, based on the updated data training data. The model training can be updated by the server 102 and specifically by the model engine 682. After the model training has been updated, the process 700 returns to, and/or proceeds to block 712, wherein, as discussed above the training level indicator is generated and/or wherein control signals for generation of a training level indicator are generated. After the generation of the training level indicator, the process 700 proceeds again to decision state 714, wherein the level of training of the model is determined, and wherein it is determined if that level of training is adequate. If it is determined that that level of training is inadequate, then the process 700 returns to block 716, and proceeds as outlined above.

Alternatively, if it is determined in decision state 714, either following block 718 or immediately following block 712, that the training of the model is adequate, then the process 700 proceeds to block 720 wherein remaining responses in the set of responses received in block 706 are automatically evaluated. These responses are automatically evaluated by the model determined to be adequately trained at decision state 714. In some embodiments, the evaluation of the responses can be performed by the response server 676 and specifically by the response processor 678. As described in FIGS. 9 to 14 and the associated text.

After the responses have been auto-evaluated, the process 700 proceeds to block 722 wherein output data is generated. In some embodiments, this output data can characterize the result of the auto-evaluation of the responses. This can include generation of one or several graphics, reports, indicators, or the like, which can present the results of the auto-evaluation. In some embodiments, for example, the output data can comprise a graphical depiction of at least one of: a distribution of scores for responses, which scores can be the result of auto-evaluation and/or manual evaluation by the teacher; a confidence level of the evaluation model; and an accuracy level of the evaluation model. In some embodiments, the accuracy level of the evaluation model can be determined via a comparison of scores generated by the present evaluation model to scores generated by one or several previous evaluation models and/or by one or several teacher provided scores. In some embodiments, the output data can further identify one or several unexpected results, and/or outliers. These can include, for example, scores that are significantly higher or lower than expected for one or several students.

After the output data has been generated, the process 700 proceeds to block 724, wherein the output data is displayed. In some embodiments, this can include the generation and sending of one or several signals or communications from the server 102 to the supervisor device 110. These one or several signals or communications can cause the supervisor device 110 to launch a user interface and/or one or several windows, displays, or viewers within the user interface that include or present the output data. In some embodiments, this can include the generation of a graphical display of the distribution of scores.

After the output data has been displayed, the process 700 proceeds to decision state 726 wherein it is determined if the evaluation, and specifically the auto-evaluation is acceptable. In some embodiments, this determination can be based off one or several inputs received by the server 102 from the teacher via the supervisor device 110 and the communication network 120. In some embodiments, for example, and as a part of the display of the output data, the teacher can be prompted to indicate whether the evaluation is acceptable or unacceptable. In some embodiments, the acceptability of an auto-evaluation can be determined based on a determination of a correspondence between the auto-evaluation and historical evaluation results. In some embodiments, discrepancies between the auto-evaluation and historical evaluation results can be characterized as instances of outlier results. In some embodiments, for example, an auto-evaluation can be acceptable when a number of outlier results identified in the auto-evaluation is less than a threshold number and/or an auto-evaluation can be unacceptable when the number of outlier results identified in the auto-evaluation is greater than a threshold number. If the evaluation is unacceptable, the process 700 proceeds to block 728 wherein a response selection is received. This can include an updating of the ordering determined in block 707 based on remaining unevaluated responses. In some embodiments, this response selection can be the selection of one or several responses for reevaluation, which responses can be selected according to the updated ordering of the responses. After the response selection has been received, the process 700 returns to block 716, and proceeds as outlined above.

Alternatively, if it is determined at decision state 726, that the evaluation is acceptable, then the process 700 proceeds to block 730, where the evaluation results are stored. In some embodiments, these results can be stored in the user profile database 301, and specifically can be stored in association with the student who provided the response linked with each of the evaluation results.

Figure 16:
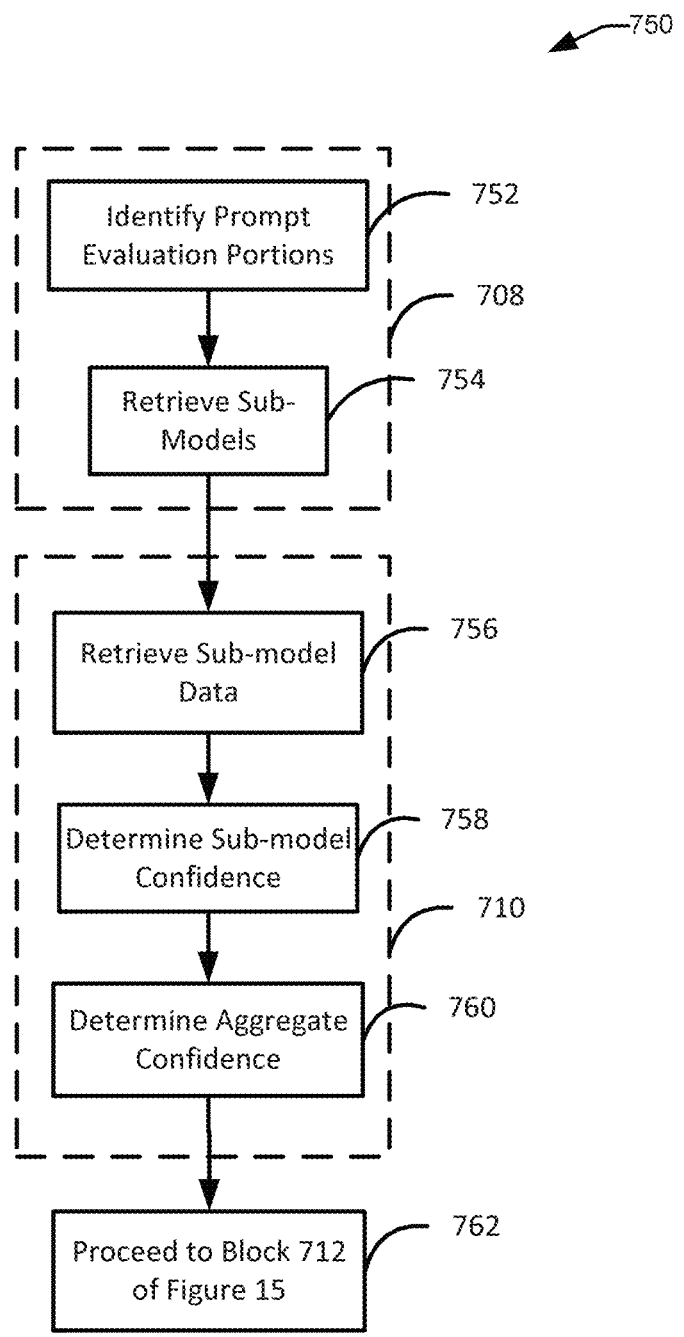
FIG. 16 is a flowchart illustrating one embodiment of a process for identifying one or several prompt relevant models and for determining a training level of those models.

With reference now to FIG. 16, a flowchart illustrating one embodiment of a process 750 for identifying one or several prompt relevant models and for determining a training level of those models is shown. In some embodiments, the process 750 can be performed as a part of, or in the place of steps 708 and 710 of the process 700 of FIG. 15. The process 750 can be performed by all or portions the content distribution network 100 including, for example, the processor 102.

The process 750 begins at block 752 wherein one or several prompt evaluation portions and/or evaluation components are identified. In some embodiments, each of these prompt evaluation portions can comprise an interface feature to allow entry of a score and each of the evaluation portions can be associated with an evaluation component of a rubric of the prompt. In some embodiments, a score can be generated for each of these individual evaluation portions and these scores can be combined, in/or can be used to generate a score for the entire response. In some embodiments, the prompt evaluation portions can be identified based on information associated with the prompt and stored in the content library database 303. The prompt evaluation portions can be identified by the server 102.

After the prompt evaluation portions and/or evaluation components have been identified, the process 750 proceeds to block 754 wherein one or several sub models are retrieved. In some embodiments, for example, each of the prompt evaluation portions can be associated with the model that can be used to generate a score for that prompt evaluation portion. As used herein, a sub-model refers to a model used in generating a score of a prompt evaluation portion and/or of a sub-portion of a prompt evaluation portions. In some embodiments, the sub-models can be retrieved by the server 102 by querying the database server 104, and specifically the content library database 303 for information identifying the evaluation portions of the prompt. In some embodiments, the content library database 303 can identify the evaluation portions of the prompt. In each of these evaluation portions can be associated with the pointer linking the evaluation portion to a model stored in the model database 309. In some embodiments, by querying the content library database 303, the server 102 can be directed via the pointer to the desired sub-models, and/or the server 102 can receive the desired sub-models via the pointer.

After the sub-models have been retrieved, the process 750 proceeds to block 756 wherein sub-model data is retrieved. In some embodiments, some or all of the sub-models can be associated with data indicative of the training of that sub-model. This can include, for example, an identification of the set of training data used in training that sub-model, the size of the set of training data used in training the sub-model, or the like. The sub-model data can be retrieved by the server 102 from the database server 104 and specifically from the model database 309.

After the sub-model data has been retrieved, the process 750 proceeds to block 758, wherein sub-model training level and/or confidence level is determined. In some embodiments, the sub-model training level can be determined for each of the sub-model retrieved in block 754. In some embodiments, the sub-model training level can be determined based on one or several values indicative of the accuracy of the model and/or the confidence in the accuracy of the sub-model. In some embodiments, for example, the sub-model training level can be indicated by a confidence value calculated for the sub-model. The sub-model training level can be determined by the processor 102.

After the sub-model training level and/or confidence level has been determined, the process 750 proceeds to block 760, wherein an aggregate confidence level is determined. In some embodiments, this aggregate confidence level can comprise a value that is representative and/or is an aggregation of the training levels and/or confidence levels of the sub-models. In some embodiments, the aggregate training level and/or confidence level can be the average of the training levels and/or confidence levels of the sub-models. The aggregate confidence level can be determined by the server 102. After the aggregate confidence level is determined, the process 750 proceeds to block 762 and continues at block 712 of the process 700 of FIG. 15.

Figure 17:
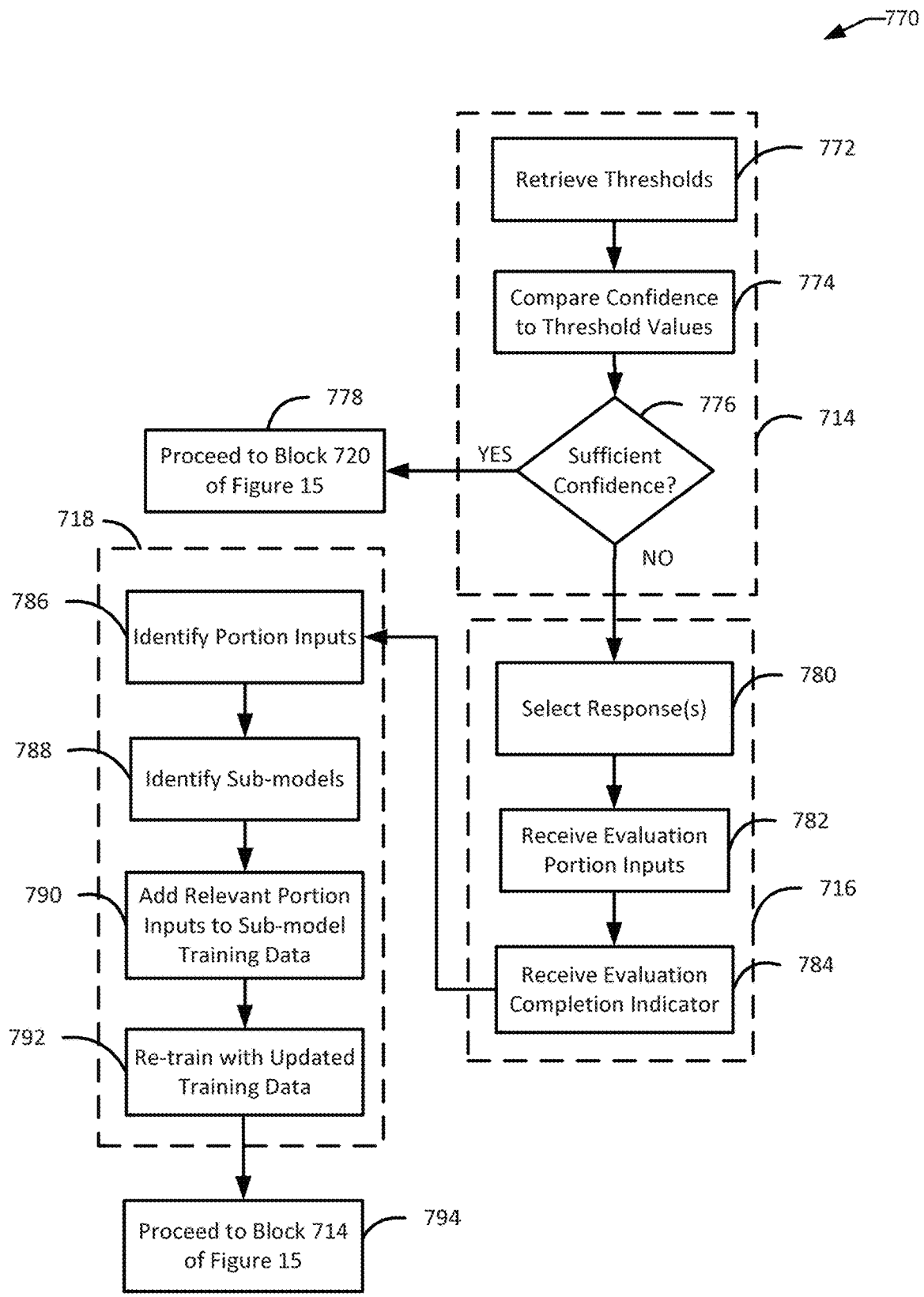
FIG. 17 is a flowchart illustrating one embodiment of a process for determining and updating training of one or several models.

With reference now to FIG. 17, a flowchart illustrating one embodiment of a process 770 for determining and updating training of one or several models is shown. The process 770 can be performed as a part of or in the place of the steps of block 714, 716, and 718 of process 700 of FIG. 15. The process 770 can be performed by the content distribution network 100 and specifically can be performed by the server 102. The process 770 begins a block 772 wherein one or several thresholds are retrieved. In some embodiments, these one or several thresholds can delineate between acceptable trained and unacceptably trained machine-learning models. These thresholds can be retrieved from the database server 104 and specifically from the threshold database 310.

After the thresholds been retrieved, the process 770 proceeds to block 774 wherein values indicative of training level of one or several of the models are compared to the thresholds. In some embodiments, this can include comparing confidence levels to the threshold values. This comparison can be performed by the server 102. After the comparison, the process 770 proceeds to decision state 776 wherein it is determined if the one or several models are adequately trained. In some embodiments, this determination is based on the result of the comparison of block 774. If it is determined that the models are adequately trained, then the process 770 proceeds to block 778 and continues to block 720 of FIG. 15.

In some embodiments, and as an alternative to a threshold related steps of blocks 772, 774, 776, the process 770 can compare one or several manually generated evaluation results to one or several evaluation results generated by the model. If the comparison indicates that the one or several models are adequately trained, then the process 770 proceeds to block 778 and continues to block 720 of FIG. 15. Alternatively, if it is determined that the one or several models are not adequately trained, then the process 770 proceeds to block 780 as discussed below.

Returning again to decision state 776, if it is determined that one or several of the models are inadequately trained, then the process 770 proceeds to block 780 wherein one or several responses are selected. In some embodiments, this can include the selection of one or several responses based on the degree to which they represent the set of responses and/or the degree to which they will improve the training of the one or several models. In some embodiments, this determination can be performed by the processor 102.

In some embodiments, the selection of one or several responses can include the presentation of those one or several responses for manual evaluation. The one or several responses can be provided to the teacher for manual evaluation, and in some embodiments, can be provided to the teacher for manual evaluation via the user interface of the supervisor device 110 operated by the I/O subsystem 526 of the supervisor device 110.

After one or several responses have been selected, and/or provided, the process 770 proceeds to block 782, wherein evaluation portion inputs are received. In some embodiments, for example, the teacher can provide inputs received by the user interface controlled by the I/O subsystem 526 of the supervisor device. In some embodiments, some or all of these inputs can comprise a numeric value entered or selected by the teacher. In some embodiments, these inputs can be receive via the manipulation of one or several features in the user interface by the teacher.

After the evaluation portion inputs have been received, the process 770 proceeds to block 784 wherein an evaluation completion indicator is received. In some embodiments, this can include the manipulation of one or several features in the user interface to indicate completion of the evaluation. In some embodiments, the evaluation completion indicator can be received by the I/O subsystem 526 of the supervisor device 110 and can be provided to the server 102 by the supervisor device 110 via the communication network 120.

After the evaluation completion indicator has been received, the process 770 proceeds to block 786, wherein evaluation portion inputs are identified. In some embodiments, this can include identifying the evaluation portion inputs received in block 782 of the process 770. After the evaluation portion inputs have been identified, the process 770 proceeds to block 788, wherein one or several sub-models are identified. In some embodiments, these one or several sub-models are associated with the evaluation portion inputs identified in block 786. These sub-models can be identified based on information relating to the prompt retrieved from the database server 104 and specifically from the content library database 303.

After one or several sub-models have been identified, the process 770 proceeds to block 790, wherein relevant portion inputs are added to sub-model training data. In some embodiments, this can include matching sub-models to portion inputs such that a received portion input is linked to the sub-model associated with the evaluation portion for which the portion input was received. In some embodiments, the set of training data for the relevant sub-model can be updated with the relevant portion inputs. The updated set of training data can be stored in the database server 104 and specifically within the model database 309.

After the relevant portion inputs of been added to the sub-model training data, the process 770 proceeds to block 792, wherein the sub-models are retrained with their updated training data. This retraining can be performed by the server 102 and specifically by the model engine 682 of the summary model process 680. After the retraining of the model, the process 770 proceeds to block 794 and continues at block 714 of the process 700 shown in FIG. 15.

Figure 18:
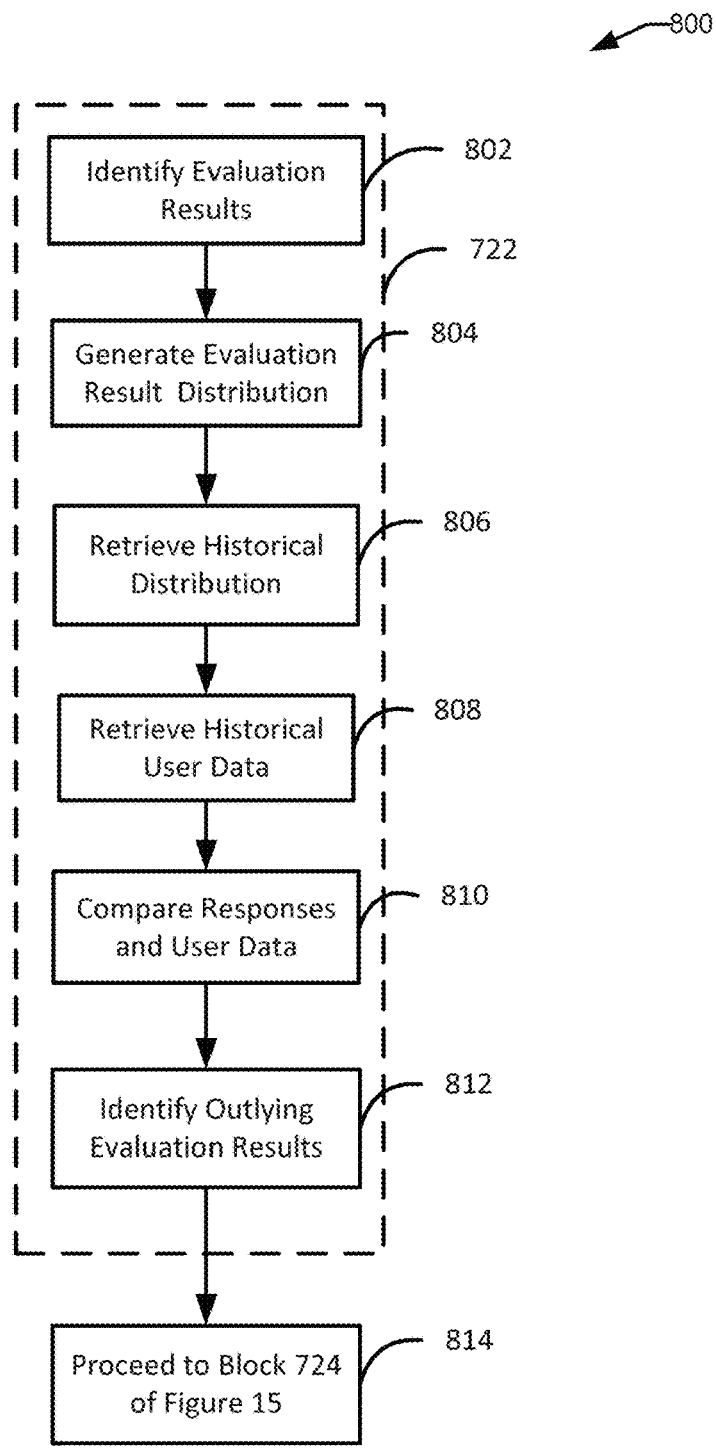
FIG. 18 is a flowchart illustrating one embodiment of a process for generating output data.

With reference now to FIG. 18, a flowchart illustrating one embodiment of a process 800 for generating output data is shown. The process 800 can be performed as a part of, or in the place of the step of block 722 shown in FIG. 15. The process 800 can be performed by all or portions of the content distribution network 100 including, for example, the server 102. The process 800 begins a block 802 wherein evaluation results are identified. In some embodiments, these evaluation results can be the results of the auto-evaluation performed in block 720 of the process 700 shown in FIG. 15. In some embodiments, these evaluation results can be identified from a database within the database server 104 including, for example, the user profile database 301, and/or the content library database 303.

After the evaluation result to been identified, the process 800 proceeds to block 804 wherein an evaluation result distribution is generated. In some embodiments, this can include identifying one or several grouping and sorting evaluation results such that each evaluation result is categorized as belonging to one of the one or several groupings. The evaluation result distribution can be generated by the processor 102.

After the evaluation result distribution has been generated, the process 800 proceeds to block 806, wherein historical evaluation result distribution information is retrieved. In some embodiments, this can include the retrieval of one or several evaluation distribution results for the teacher, and/or from other similarly situated teachers, classes, courses, programs, or the like. In some embodiments, the historical distribution can further comprise a teacher, specify distribution which can, for example, specify a desired number, and/or percentage scores for each of the one or several groupings that together form the distribution. The historical distribution information can be retrieved from the database server 104 and specifically from the user profile database 301.

After the historical distribution information has been retrieved, the process 800 proceeds to block 808 wherein historical user data information is retrieved. In some embodiments, this can comprise the retrieval of one or several user profiles and/or portions one or several user profiles from the user profile database 301 of the database server 104. In some embodiments, the retrieved information can identify aspects of one or several students previously received scores. In some embodiments, for example, one or several statistical measures can be included in this historical user data, which one or several statistical measures can identify, for example, the average score received by each of one or several students, the standard deviation of scores for the each of the one or several students, or the like.

After the historical user data has been retrieved, the process 800 proceeds to block 810, wherein the evaluation results and the retrieved historical data are compared. This can include, a comparison of the evaluation result distribution and the historical evaluation result distribution and/or a comparison of evaluation results and user historical data. After the comparison of historical data and evaluation results, the process 800 can proceed to block 812, wherein outlier evaluation results identified. In some embodiments, these outlying results may be indicative of an error in training of the model and/or may be indicative of a need for further training of the model. In some embodiments, an outlier evaluation result is a result of a student that deviates from historical user data for that student by more than a predetermined amount and/or an evaluation result distribution that deviates from the historical evaluation result distribution by more than a predetermined amount. In some embodiments, this predetermined amount can comprise, for example, at least: 1, 2, 3, 4, 5, 6, or any other or intermediate of standard deviations from the average score received by that student and/or from an average distribution size and/or shape. Outlying results can be identified by the processor 102. After the outlying evaluation results have been identified, the process 800 proceeds to block 814 and continues at block 724 of the process 700 of FIG. 15.

Figure 19:
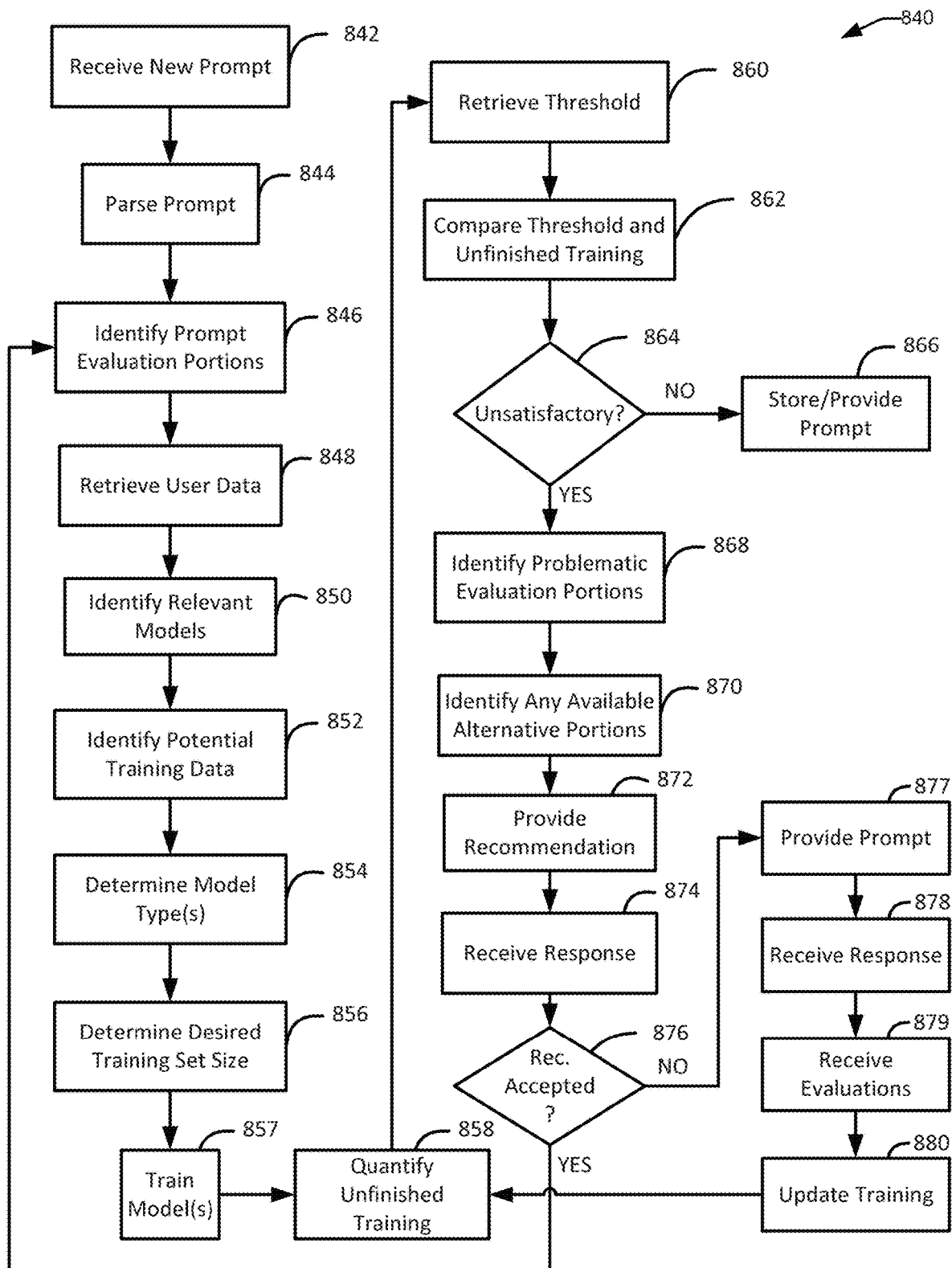
FIG. 19 is a flowchart illustrating one embodiment of a process for new prompt model creation.

With reference now to FIG. 19, a flowchart illustrating one embodiment of a process 840 for new prompt model creation is shown. In some embodiments, the process can be performed as a part of the creation of a new prompt and/or modified prompt, such as a new and/or modified question, and to generate a model trained for custom evaluation of responses received to that new and/or modified prompt. In some embodiments, the process 840 can enable allow the use of auto-evaluation for custom prompts by leveraging pre-existing models and/or data to decrease and/or minimize training efforts. The minimization of the training efforts can include minimizing the size of the set of data used to successfully and/or adequately train the model, minimizing the amount of new data to be gathered to successfully and/or adequately train the model, or the like. The process 840 can be performed by all or portions of the content distribution network 100 including the server 102. In some embodiments, the process 840 can be performed subsequent to the teachers creation of a new prompt and/or modification of a previously existing prompt including, for example, modification of evaluation components of the pre-existing prompt. The process 840 begins a block 842 wherein a new prompt is received and/or wherein a pre-existing prompt is modified. In some embodiments, the new prompt can be received by the server 102 from, for example, the supervisor device 110. Similarly, in some embodiments, the modified pre-existing prompt can be received by the server 102 from the supervisor device. In some embodiments, the new prompt can be created and/or the pre-existing prompt can be modified via one or several user interactions with the supervisor device, and specifically with the user interface operated by the I/O subsystem 526 of the supervisor device 110. In some embodiments, this can include one or several interactions with the user interface as discussed below with respect to FIGS. 20 through 30, and specifically, in some embodiments, the prompt can be received via an assignment window 976, an assignment creation window 982, and/or an assignment editing window 990.

After the new or modified prompt has been received, the process 840 proceeds to block 844, wherein the received prompt is parsed. The parsing can be performed by the processor 102. In some embodiments, this parsing can include a parsing of evaluation components associated with the received prompt and/or parsing of text included in the prompt such as, for example, the text of the question, for providing to one or several students. In some embodiments, the prompt can be parsed to identify one or several: words such as nouns, verbs, adjectives, or the like; phrases such as noun phrases, prepositional phrases, adjective phrases, adverb phrases, verb phrases, infinitive phrases, gerund phrases, participle phrases, or the like, or the like. In some embodiments, the parsing can be used to create a parse tree.

In some embodiments, the prompt can be parsed to extract evaluation components, evaluation portions, evaluation sub-portions, and/or evaluation sub-components associated with the prompt. This parsing of the prompt can further include determining a complexity of one or several extracted evaluation components, evaluation portions, evaluation sub-portions, and/or evaluation sub-components associated with the prompt. In some embodiments, the complexity of one or several extracted evaluation components, evaluation portions, evaluation sub-portions, and/or evaluation sub-components associated with the prompt can be determined based on the complexity of the parse tree associated with the same. For example, an extracted evaluation component having a simple parse tree can be identified as uncomplex and an extracted evaluation component having a complex parse tree can be identified as complex. In some embodiments, the complexity of one or several extracted evaluation components, valuation portions, evaluation sub-portions, and/or evaluation sub-components associated with the prompt can be determined based the number and/or type of on one or several words, phrases, or the like associated with the same.

In some embodiments, and as a part of the parsing, one or several modifications to the prompt can be provided and/or proposed to the author of the prompt. The one or several modifications can be identified and/or proposed to simplify all or portions of the prompt to thereby simplify model training for evaluation of those all or portions of the prompt. In some embodiments, identifying and/or proposing one or several modifications can include a preliminary identification of one or several types of models expected for use in evaluating some or all of the prompt evaluation portions, preexisting similar models from which all or portions of models for use in evaluating some or all of the prompt evaluation portions could be generated and/or derived, and/or preexisting potential training data available for use in partially or completely training one or several models relevant to prompt evaluation portions. In some embodiments, and based on this preliminary identification, expected unfinished training of models associated with some or all of the prompt evaluation portions can be identified and/or quantified and compared to one or several threshold levels. If it is determined that the expected unfinished training is greater than one or several threshold levels, then one or several modifications to the prompt and/or modifications to portions of the prompt can be generated and/or provided. In some embodiments, these modifications can be generated via a machine learning model trained generate one or several new and/or modified prompts based on components of all or portions of the previously received prompt such as, for example, words, phrases, and/or segments of the parse tree associated with all or portions of the previously received prompt.

In some embodiments, these modifications can, for example, change all or portions of the prompt including, for example, changing a structure of the prompt, changing one or several words of the prompt, changing evaluation components of the prompt, changing evaluation criteria of the prompt, or the like. In some embodiments, the providing and/or recommending of modifications can be an iterative process in which the user provides and/or edits the prompt, and modifications and/or proposed modifications are provided to the user. Thus, in some embodiments, the user can receive iterative feedback relating to a prompt authored by the user and he user can iteratively modify the prompt based on iterative feedback. In some embodiments, this iterative process can continue until the iterative process and/or the prompt meets and/or exceeds one or several thresholds.

At block 846, any extracted evaluation portions and/or evaluation sub-portions can be identified. In some embodiments, this can include associating an identified with the evaluation portions and/or evaluation sub-portions identified in the parsing and/or can include storing the evaluation portions and/or evaluation sub-portions identified in the parsing.

After the parsing of the prompt and/or identifying of the prompt evaluation portions, also referred to herein as evaluation components, and/or evaluation sub-portions, also referred to herein as evaluation sub-components, the process 840 proceeds to the steps of blocks 848 through 852, wherein preexisting data relevant to the model for evaluation of the prompt received in block 842 is identified. This can include identifying one or several preexisting models relevant to all or portions of the prompt and/or identifying preexisting data (e.g. preexisting response data) usable in training the model(s) for evaluating all or portions of the prompt. Specifically, the process 840 proceeds to block 848, wherein user data for the creator or modifier of the prompt received in block 842, is retrieved. In some embodiments, this user data can be retrieved from the database server 104 and specifically from the user profile database 301. This user data can include information relating to one or several models previously trained for this particular user, sets of previously generated training data, or the like.

After the user data has been retrieved, the process 840 proceeds to block 850 wherein any relevant pre-existing models are identified. In some embodiments, these preexisting models can be identified based, at least in part, on the user data retrieved in block 848. In some embodiments, for example, the identification of pre-existing models can include a comparison of the identified prompt evaluation portions, and/or evaluation sub-portions of the prompt received in block 842 to evaluation portions and/or evaluation sub-portions of prompts previously provided by the creator or modifier of the prompt received in block 842. If an evaluation sub-portion, and/or evaluation portion of the prompt received in block 842 corresponds to an evaluation sub-portion and/or evaluation portion of a prompt previously provided by the creator and/or modifier of the prompt received in block 842, then the model of the evaluation sub-portion, and/or evaluation portion of the prompt previously provided can be identified as a relevant model. In some embodiments, an evaluation sub-portion and/or evaluation portion of the prompt received in block 842 can correspond to one or several evaluation sub-portions and/or evaluation portions when one or several aspects of the evaluation sub-portion and/or evaluation portion of the prompt received in block 842 matches one or several aspects of the evaluation sub-portion and/or evaluation portion of a previously received prompt. In some embodiments, this matching may be determined based on, for example, use of same or similar words—including nouns, verbs, adjectives, or the like, use of same or similar phrase, similarity in parse tree, or the like. In some embodiments, matching may be determined via the use of one or several similarity scores. In some embodiments, these similarity scores can be used for matching via application of a clustering algorithm to the similarity scores. The clustering algorithm can identify clusters of evaluation sub-portions and/or evaluation portions of previously received prompts. The clustering algorithm can then identify, a cluster for each of some or all of the evaluation sub-portions and/or evaluation portions of the prompt received in block 842. In some embodiments, some or all of the evaluation portions and/or evaluation sub-portions of the prompt received in block 842 may have no preexisting cluster. Relevant models can be identified by the server 102 based on data retrieved from, for example, the content library database 303, the evaluation database 308, and/or the model database 309.

After any relevant models have been identified, the process 840 proceeds to block 852 wherein any potential existing training data is identified. In some embodiments, this can include identifying evaluations, and particularly manual evaluations to prompts, similar to the prompt received in block 842, and/or to prompts, having evaluation portions and/or evaluation sub-portions similar to one or several of the evaluation portions and/or evaluation sub-portions of the prompt received in block 842. In some embodiments, the potential training data can be identified from evaluations generated by the creator and/or modifier of the prompt received in block 842, and in some embodiments, the potential training data can be identified from evaluations generated by users other than the creator and/or modifier of the prompt received in block 842. In some embodiments, for example, one or several users similar to the creator and/or modifier of the prompt received in block 842 can be identified. These users can be identified based on having created and/or provided prompts, similar to the prompt received in block 842. The similarity can be based on the content of the prompts, between evaluation portions and/or evaluation sub-portions of the prompts, or the like. In some embodiments, these similar users can be identified by the server 102 based on an evaluation of data relating to teacher stored in the user profile database 301 of the database server 104.

After any potential training data has been identified, the process 840 proceeds to block 854 wherein model types are determined. In some embodiments, for example, a type of model can be selected and/or determined for: a prompt; an evaluation component; and/or an evaluation sub-component of the prompt. This type of model can be selected, in some embodiments, based on the complexity of the prompt, the evaluation component, and/or the evaluation subcomponent of the prompt and/or based on identified relevant models, and/or identified potential training data. In some embodiments, for example, a first model type may be capable of resolving questions of high complexity but may require a large set of training data, whereas, a second model type may be less capable of resolving questions of high complexity but may require a smaller set of training data. In some embodiments, exemplary models can include, for example, a logistic regression model, a random forest model, a decision tree model, a probabilistic model, deep learning model, a neural network, a Bayesian network, or the like. In some embodiments, for example, a random forest model, and/or a logistic regression model may be the easy to fully train, whereas, a deep learning model, a neural network, and/or Bayesian network may better address issues of high complexity but may also be more difficult to train. In some embodiments, based on the combination of available resources and the complexity of all or portions of the prompt determined in block 844, a model type can be selected for the prompt and/or for one or several of the evaluation components. In some embodiments in which a prompt includes a plurality of evaluation components, some or all of the plurality of evaluation components share a common model type, and in some embodiments in which a prompt includes a plurality of evaluation components, none of the plurality of evaluation components share a common model type. The model type can be determined by the processor 102.

After the model type has been determined, the process 840 proceeds to block 856 wherein a desired training set size is determined. In some embodiments, this can include determining, based on the determined model type an estimated training set size for completely training the model.

After the desired training set size has been determined, the process 840 proceeds to block 857 wherein one or several models for evaluation of the prompt received in block 842, and specifically wherein one or several models for evaluation of the identified evaluation components and/or evaluation sub-components of the prompt received in block 842, are trained. In some embodiments, this can training can be a partial training or a complete training. In some embodiments, this training can include training based on all or portions of the potential training data identified in block 852 and/or model generation based on some or all or the models identified as relevant in block 850. In some embodiments, the training can be supervised and/or unsupervised. In some embodiments, the model trained for each of the prompts and/or for the one or several evaluation components and/or evaluation sub-components of the prompt can be of the model type(s) determined in block 854.

At block 858 unfinished training is quantified and/or the number of additional pieces of training data for completion of training of the models is determined. In some embodiments, this can be an estimate of the quantification of unfinished training and/or the number of pieces required to finish training started in block 857. In some embodiments, the unfinished training can be quantified based on a discrepancy between on or several manually generated evaluation results and one or several evaluation results generated by the model. In such an embodiments, a test set of data can include one or several prompts each having manually generated evaluation results. An evaluation result can be generated for each of these one or several prompts by the one or several models trained in block 857, and the evaluation results generated by the models can be compared to the manually generated evaluation results. In some embodiments, a discrepancy value can generated for each response, the discrepancy value characterizing a difference between the manually generated response evaluation and the response evaluation generated by the trained model. Discrepancy values relevant to each of the models can be combined to generate an aggregate discrepancy value for each of the models. In some embodiments, the aggregate discrepancy value of a model can characterize and/or quantify unfinished training for that model. In some embodiments, based on the model type, a discrepancy value of a model can be used to generate a predicted number of additional data pieces to bring the training of that model to completion.

After unfinished training has been quantified or estimated, the process 840 proceeds to block 860, wherein one or several thresholds are retrieved. In some embodiments, these thresholds can delineate between satisfactory levels of unfinished training and unsatisfactory levels of unfinished training and/or delineate between sufficiently trained models and insufficiently trained models. These one or several thresholds can be retrieved from the threshold database 310. After the thresholds been retrieved, the process 840 proceeds to block 862, wherein the retrieved one or several thresholds are compared to the quantification of the unfinished training of the models. At decision state 864 it is determined, based on the comparison of block 862 if the level of unfinished training of the models is unsatisfactory. This determination can be made by the server 102 for some or all of the models of the prompt received in block 842.

If it is determined that the level of unfinished training is sufficiently low, then the process 840 proceeds to block 866 wherein the received prompt is stored in the database server 104 and specifically in the content library database 303 and/or is provided to one or several students via user devices 106 of those one or several students.

Returning again to decision state 864, if it is determined that the level of unfinished training is unsatisfactory, and the process 840 proceeds to block 868, wherein evaluation components and/or evaluation portions associated with the models having unsatisfactory levels of unfinished training are identified. After these evaluation components and/or evaluation portions of an identified, the process 840 proceeds to block 870 wherein one or several alternative evaluation components and/or evaluation portions are identified. In some embodiments, these alternative evaluation components and/or evaluation portions can comprise one or several evaluation components and/or evaluation portions that score based on similar criteria to one or several of the evaluation components and/or evaluation portions that are identified in block 868. In some embodiments, these alternative evaluation components and/or evaluation portions can be identified based on the result of the parsing of the prompt, including the parsing of the evaluation components and/or evaluation portions performed in block 844, and a result of parsing of stored evaluation components and/or evaluation portions. The alternative evaluation components and/or evaluation portions can be identified by the server 102.

After available evaluation can components and/or evaluation portions of an identified, the process 840 proceeds to block 872, wherein a recommendation is provided. In some embodiments, the recommendation can comprise a recommendation to change one or several of the evaluation components and/or evaluation portions identified in block 868 to one or several of the alternative evaluation components and/or evaluation portions identified in block 870. The recommendation can be provided to the creator, and/or modifier of the prompt received in block 842 via the supervisor device 110, and specifically via the I/O subsystem 526 of the supervisor device 110.

After the recommendation has been provided, the process 840 proceeds to block 874. Where in response to the provided recommendation is received. This response can comprise an indication from the creator and/or modifier of the prompt received in block 842, to accept or refuse one or several of the alternative evaluation components and/or evaluation portions. In some embodiments, the response can comprise a direction to replace one or several of the problematic evaluation components and/or evaluation portions identified in block 868, with one or several of the evaluation components and/or evaluation portions identified in block 870.

After the responses been received, the process 840 proceeds to decision state 876, wherein it is determined if the recommendation provided in 872 is accepted. If it is determined that the recommendation has not been accepted, then the process 840 returns to block 877 wherein the prompt received in block 842 is stored and/or is provided to one or several students. In some embodiments, the prompt can be provided to the one or several students identified by the creator of the prompt for receipt of the prompt. In some embodiments, the prompt can be provided as a part of the presentation process, and as indicated in block 878, one or several responses to the provided prompt can be received. Specifically, in some embodiments, a response can be received from each of the one or several students to whom the prompt is provided. The response can be received as a part of the presentation process 670.

After the response has been received, the process 840 proceeds to block 879, wherein one or several evaluation are received and/or generated. In some embodiments, this can include the receipt of a manual evaluation for some or all of the received responses and the generation of a response according to the one or several trained and/or partially trained models for each of the some or all of the received responses. In some embodiments, these evaluations can be generated according to response process 676 by, for example, the response processor 678. In some embodiments, the manual generation of the evaluation can include the presentation of the response to an evaluator via, for example, the evaluation interface 920 discussed below.

After the receipt and/or generation of the evaluations, the process 840 proceeds to block 880 wherein training is updated for the one or several models used to generate an evaluation of the response and for which a manual evaluation was generated. In some embodiments, this training can be updated using via the addition of the one or several received responses and/or the manual evaluations of the same to the training set. After the training of these one or several models has been updated, the process 840 returns to block 858 and proceeds as outlined above. In some embodiments, however, if it is determined that training of some or all of the models is still insufficient at decision state 864 after gathering further training data according to blocks 877 through 880, the process 840 can skip steps 868 through 876 and continue to gather further data and further train the models according to steps 877 through 880 until a sufficient level of training is attained and/or until no further prompt recipients are identified and/or until no further prompt responses are received.

Returning again to decision state 876, if it is determined that the recommendation has been accepted, and the process returns to block 846 and proceeds as outlined above. In some embodiments, this return to block 846 can comprise the evaluation of the training level, and/or the unfinished training level of the accepted alternative evaluation components and/or evaluation portions.

Figure 20:
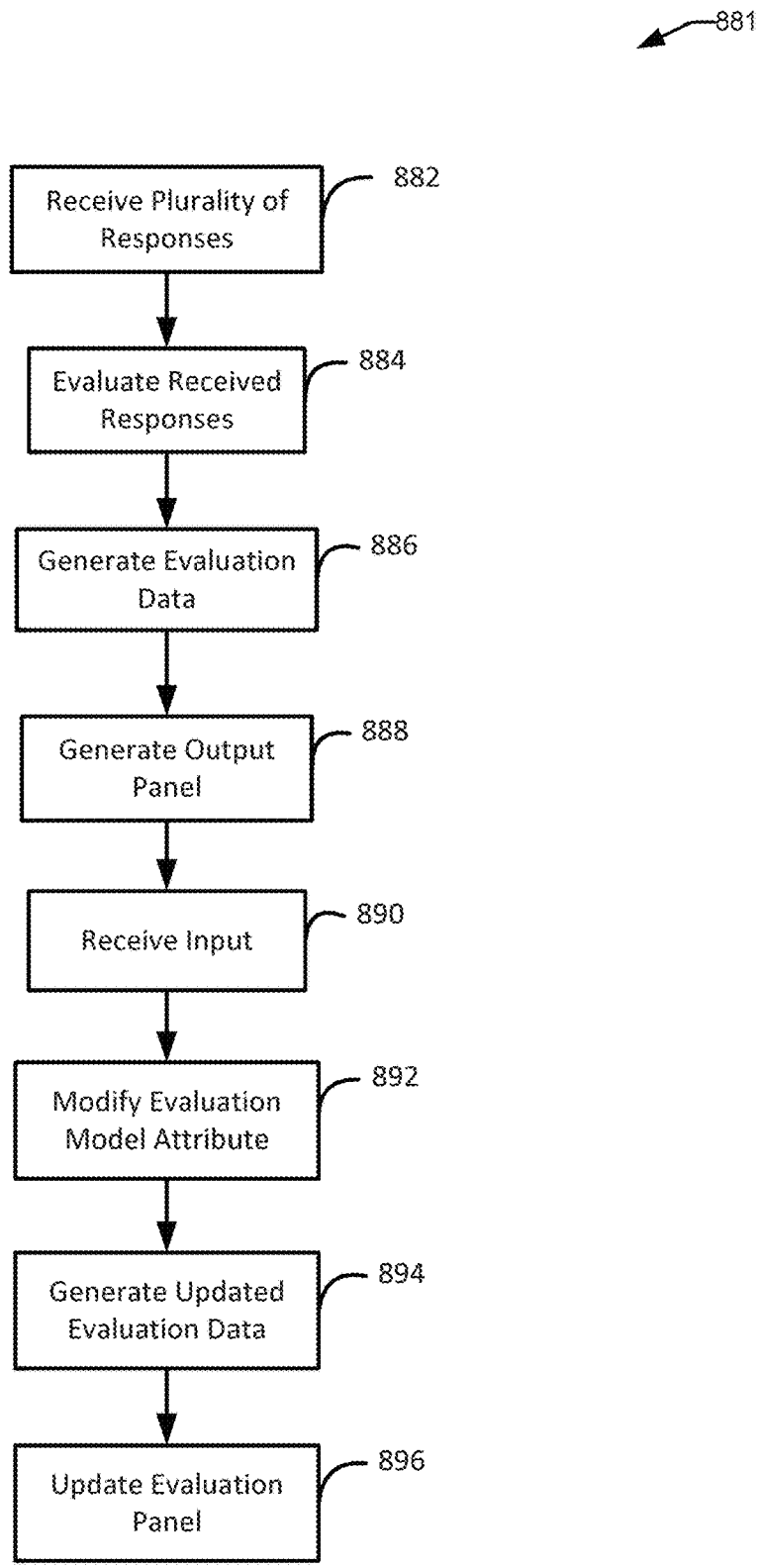
FIG. 20 is a flowchart illustrating one embodiment of a process for interface based evaluation output customization.

With reference now to FIG. 20, a flowchart illustrating one embodiment of a process 881 for interface based evaluation output customization is shown. The process can be performed by all or portions of the system 100. In some embodiments, performance of the process 881 can allow customization of evaluation results generated by the evaluation model without affecting training of the evaluation model. Thus, in some embodiments, the outputs of the evaluation model can be customized without retraining all or portions of the model.

The process 881 begins at block 882, wherein a plurality of responses are received. In some embodiments, the responses in the plurality of responses can be received from a plurality of users in response to one or several prompts. In some embodiments, these responses can be received by the view module 674 and can be provided to the presenter module 672.

The received responses can be evaluated as indicated at block 884. In some embodiments, this step can include the performing of some or all of the steps of process 700 of FIG. 15. In some embodiments, this step can be performed with a pre-existing trained model, an untrained model, and/or partially trained model. In embodiments in which the model is trained, the process 700 can be truncated and can, for example, skip to block 720.

In some embodiments, the responses can be provided by the presenter module 672 to the response processor 678, which response processor can evaluate the responses. In some embodiments, the response processor 678 can evaluate the received responses via an evaluation model that can, in some embodiments, be trained for evaluating responses received to one or several prompts. This evaluation model can be a machine learning model trained to output a score relevant to at least one portion of the response.

At block 886, evaluation data is generated. In some embodiments, this evaluation data characterizes at least one attribute of the evaluated plurality of responses. This evaluation data can, in some embodiments, include a first score for each of the received responses. In some embodiments, the attribute characterized by the evaluation data can be relevant to the plurality of responses as a group. In some embodiments, for example, this attribute can comprise a distribution of scores for the received responses, which scores can be generated by the evaluation model. In some embodiments, this attribute can comprise a comparison of score generated by the evaluation model to evaluations provided by the teacher.

At block 888, an output panel is generated. In some embodiments, the output panel can be generated in the user interface. The output panel can include one or several windows providing information relating to the evaluation of the received responses. This output panel can further include one or several input features through which the user can provide inputs to modify one or several attributes of the evaluated responses. In one embodiment, for example, some or all of these input features can be manipulable to change one or several of the at least one attribute characterized by the evaluation data. In some embodiments, these inputs can cause a shift in some or all of the scores generated by the evaluation model.

In some embodiments, the output panel can include at least one performance modification interface. The performance modification interface can include one or several windows and/or features. The performance modification interface can identify, or more specifically can provide information, relating to the at least one attribute of the evaluated plurality of responses. The performance modification interface can further include a input feature, the manipulation of which can modify the at least one attribute of the evaluated plurality of response for which information is provided via the performance modification interface.

The output panel can include a model panel that can include information characterizing at least one attribute of the evaluation model. This at least one attribute of the evaluation model can include at least one of: a generic evaluation parameter; and a model identifier. The generic evaluation parameter can, in some embodiments identify some of one or several parameters used by the evaluation model, or in other words, the evaluation parameter can identify some of the one or several parameters corresponding to features used by the evaluation model in generating evaluations. IN some embodiments, these generic parameters can include, for example, a formatting style, a language, and/or a proficiency level such as, for example, a grammatical proficiency level, a spelling proficiency level, or the like. In some embodiments the generic parameters included in the model panel can be limited to parameters used by the evaluation model in generating evaluations, and in some embodiments, the generic parameters included in the model panel are not limited to parameters used by the model in generating evaluations.

In some embodiments, the model panel can identify one or several generic evaluation parameters such as, for example, one or several evaluation parameters used by the current model. In some embodiments, the model panel can include a selection features, such as a drop-down menu, whereby a user can select one or several evaluation parameters. In some embodiments, the model panel can allow selection and modification of one of the one or several evaluation parameters, and in some embodiments, the model panel can allow selection and modification of a plurality of the one or several evaluation parameters. In embodiments in which a plurality of the one or several evaluation parameters are selected and modified, some or all of this plurality of the one or several evaluation parameters can be simultaneously displayed. In some embodiments, these plurality of parameters can be independently modified and/or simultaneously modified.

In some embodiments, after selection of one or several of the one or several evaluation parameters, the model panel can show the selected evaluation parameter. In some embodiments, the model panel can include an input feature through which the user can control stringency of application of the some or all of the one or several evaluation parameters. The model panel can, for example, show a selected evaluation parameter and an indicator of the application stringency of that application parameter.

At block 890, a user input is received. In some embodiments, this input can be received via manipulation of the input feature. This input can, in some embodiments cause a change of at least one attribute characterized by the evaluation data. In some embodiments, for example, this received input can change at least one of: a shape of the score distribution, a width of the score distribution, and a center of the score distribution. In some embodiments, the user input can change the stringency of application of one or several of the evaluation parameters. In some embodiments, the shape of the distribution can be changed via the addition or removal of one or several modes of the distribution. Similarly, in some embodiments, the user input may select one or several pre-determined model filters via which the output of the evaluation model can be matched to a predetermined shape, distribution, width, or the like.

After the input has been received, the process 881 proceeds to block 892, wherein one or several evaluation model attributes associated with the received input are modified. In some embodiments, this can include adjusting one or several parameters associated with the evaluation model based on the received inputs. At block 894, updated evaluation data is generated. In some embodiments, the updated evaluation data is generated based on the modified one or several evaluation attributes. In some embodiments, the updating of evaluation data can include updating evaluations for some or all of the plurality of responses. In some embodiments, for example, a second score can be generated for each of the received responses. This second score can be generated, at least in part, based on the input received via the input feature. In some embodiments, these second scores can be generated by modifying one or several evaluation parameters, but without retraining the evaluation model.

At block 896, the output panel is updated to reflect the updated evaluation data. In some embodiments, this updated output panel can provide information based on the generated second scores. In some embodiments, further inputs can be received, and thus the process 881 can repeat steps 890 through 896 until no further inputs are received.

With reference now to FIGS. 21 through 34, depictions of user interfaces for use in connection with the process of FIG. 15 through 20 are shown. FIG. 21 is a depiction of a landing window 970. The landing window 970 can display course information relevant to a user. The landing window 970 can be accessed by a user subsequent to providing information identifying the user such as, for example, a username, a password, a unique user identifier, or the like. In some embodiments, the landing window 970 can identify one or several courses associated with the user, and specifically can identify one or several courses taught and/or instructed by a teacher and/or instructor. As seen in FIG. 21, a course 972 is identified in the landing interface. In some embodiments, all or portions of the identifiers of the course can comprise user-manipulable features that can cause a change in the user interface, and specifically in the state or the view of the user interface. In some embodiments, all or portions of the identifiers of the course can comprise a link to another portion of a user interface.

As further seen in FIG. 21, the landing window 970 can further include one or several features and/or capabilities to enable the user to add a course. In some embodiments, this can include a manipulable feature 974 that, when manipulated, allows the addition of a course to the landing window 970. In some embodiments, manipulation of the manipulable feature 974 can cause a change in the user interface, and specifically can cause a change from the landing window 970 to another window within the user interface.

Figure 22:
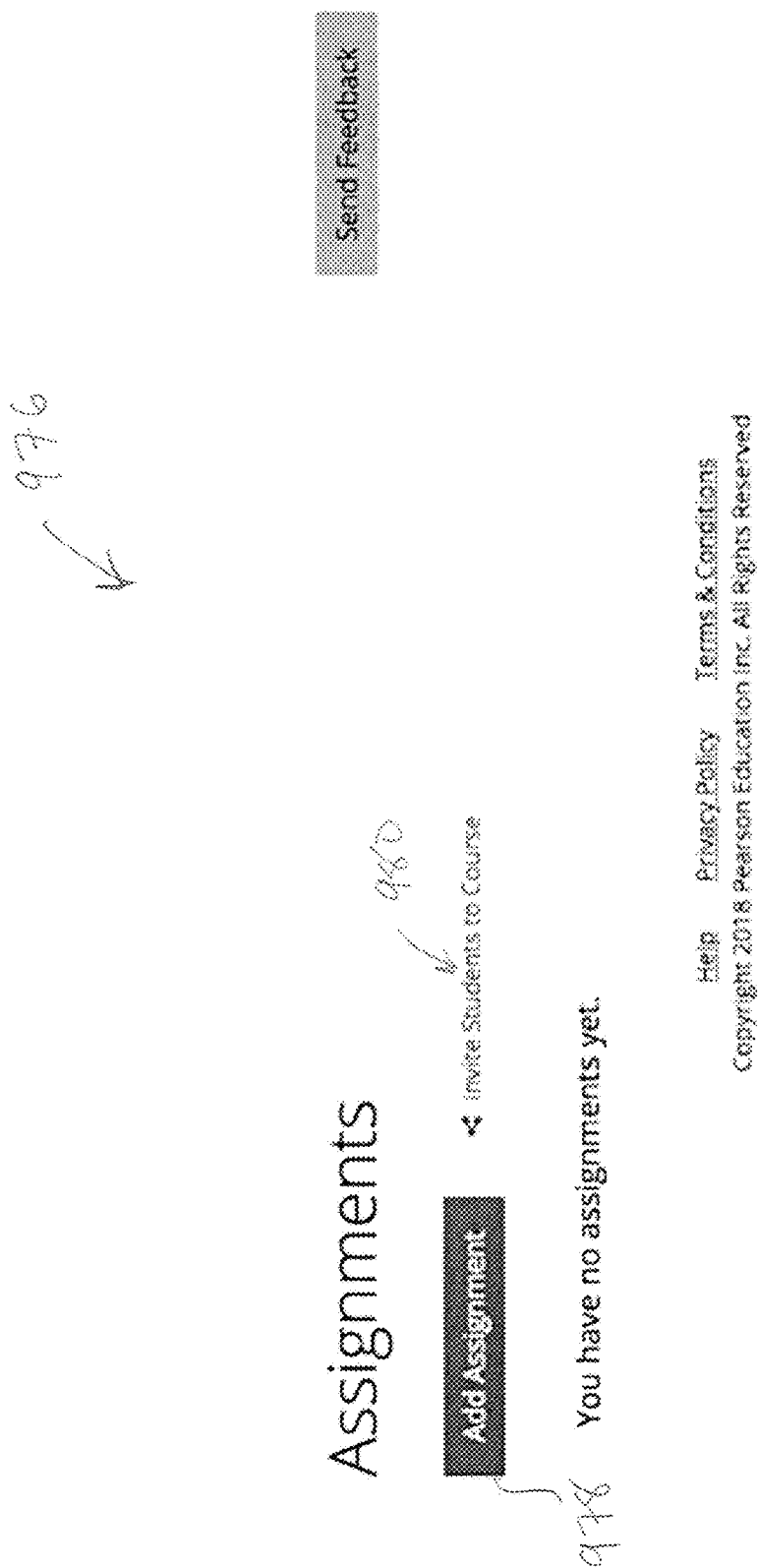
FIG. 22 is a graphical depiction of one embodiment of an assignment window.

Upon selection of a course from the landing window 970, the user interface can change such that an assignment window 976, as shown in FIG. 22, is displayed to the user. The assignment window 976 can display information relating to one or several assignments associated with the selected course. In some embodiments, the assignment window 976 can further include an assignment addition button 978 that when manipulated allows the addition of an assignment to the course and an invitation button 980 that when manipulated allows the invitation of one or several students to participate in the course.

Figure 23:
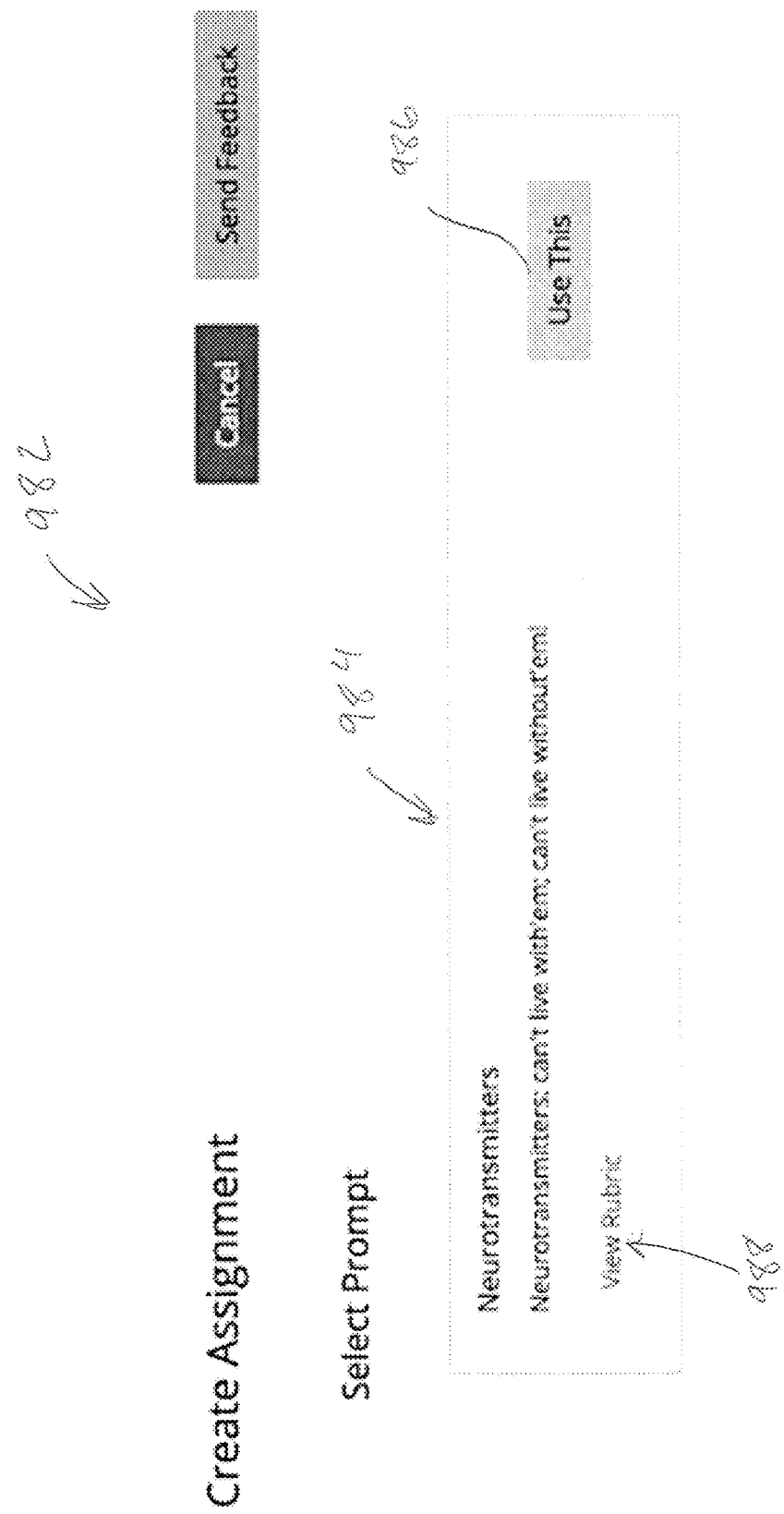
FIG. 23 is a graphical depiction of one embodiment of an assignment creation window.

An assignment creation window 982 is shown in FIG. 23. The assignment creation window 982 can be displayed to the user subsequent to the user manipulation of the assignment addition button 978. The assignment creation window 982 can include one or several features to facilitate the creation and/or the addition of an assignment to the course. In some embodiments, this can include a prompt window 984. The prompt window can display one or several prompts that can be selected for use in the assignment. In some embodiments, each of the one or several prompts can have an associated selection button 986 that can be manipulated to select the prompt for use in the assignment, and the prompts can have an associated rubric feature 988 that upon manipulation directs the user interface to display all or portions of a rubric associated with the prompt to the user.

An assignment editing window 990 is shown in FIG. 24. The assignment editing window 990 displays information relating to an assignment selected and/or created in the assignment creation window 982 and can allow the editing of the same. In some embodiments, the assignment editing window 990 can include a details portion 992, wherein details relating to the assignment can be provided. These details can include, for example, a due date, and/or one or several learning objectives.

Figure 25:
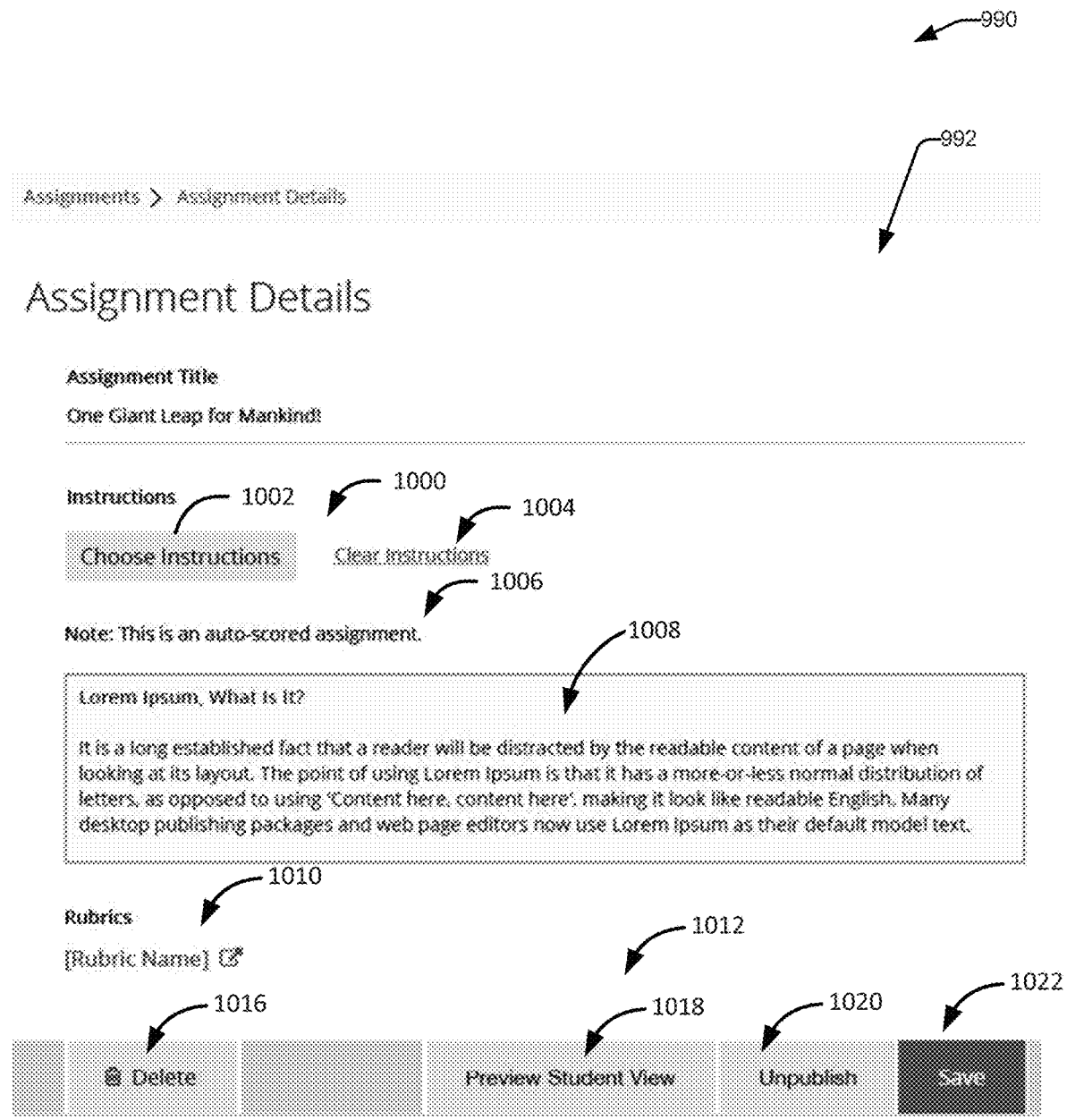
FIG. 25 is a graphical depiction of another embodiment of an assignment editing window.

Another embodiment of an assignment editing window 990 is shown in FIG. 25. The assignment editing window includes the details portion 992 providing details relating to the assignment. As seen in FIG. 25, the details portion 992 includes instruction control features 1000 including a selection feature 1002, the manipulation of which allows a user to select instructions for providing with a prompt and a delete feature 1004, the manipulation of which allows the user to clear instructions. The details portion 992 further includes an evaluation message 1006 indicating whether the assignment is designated for auto-evaluation or manual evaluation, and an instruction window 1008 displaying instructions associated with the prompt. The details portion 992 further includes a rubrics section 1010 in which a rubric can be created and/or uploaded in associated with the assignment being created and/or edited. The assignment editing window 990 further includes a plurality of control buttons 1012 including a delete button 1016 manipulable to delete the assignment being created and/or edited in the assignment editing window 990, and preview button 1018 manipulable to cause generation of a preview of the assignment as would be viewable to the student, a retraction button 1020 manipulable to cause the unpublishing of the assignment and/or prompt being created and/or edited in the assignment editing window 990, and a save button 1022 manipulable to cause the saving of the assignment and/or prompt being created and/or edited in the assignment editing window 990.

Figure 26:
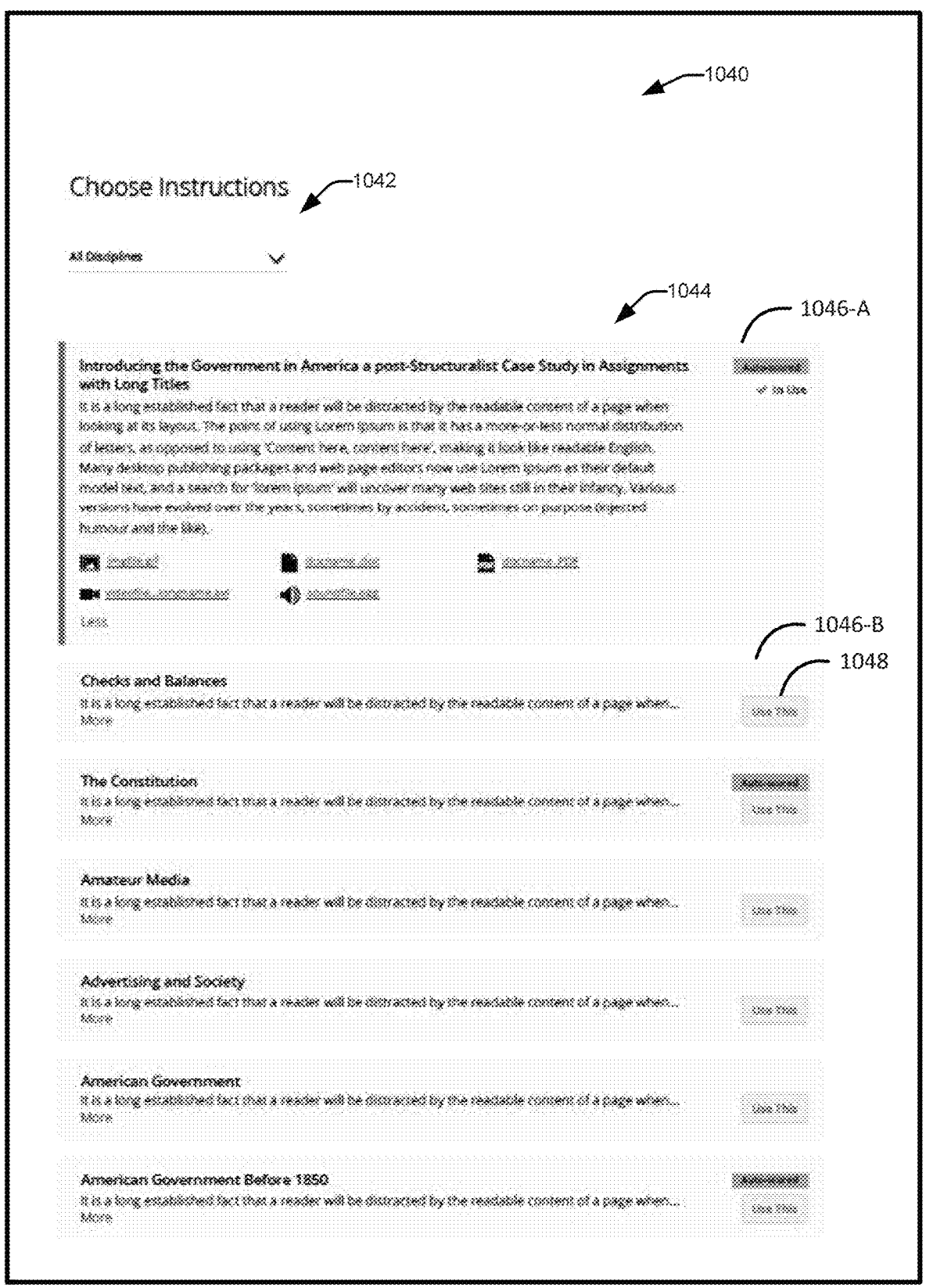
FIG. 26 is a graphical depiction of one embodiment of an instruction selection window.

In some embodiments, manipulation of the selection feature 1002 can cause the interface to update to display an instruction selection window 1040 as shown in FIG. 26. The instruction selection window 1040 presents available instructions to the teacher to allow the selection of instructions for association with the prompt and/or assignment being created and/or edited in the assignment editing window 990. In some embodiments, the instruction selection window 1040 can further allow the authoring of instructions for association with the prompt and/or assignment being created and/or edited in the assignment editing window 990.

The instruction selection window 1040 can include a search feature 1042 manipulable to narrow the number of potential instructions presented by the instruction selection window 1040. In FIG. 26, the search feature 1042 comprises a drop-down menu having categorizations associated with disciplines. Via selection of a discipline with the drop-down menu, instructions shown to the user are limited to instructions associated with that discipline.

The instruction window 1040 can include an instruction list 1044 which can include one or several instructions available for selection. In some embodiments, each set of instructions available for selection can be represented in an instruction panel 1046 which can include links to documents or filed relating to the instructions represented in the instruction panel 1046, a description of the instructions represented in the panel, and/or information relating to that set of instructions such as, for example, the selection status of the set of instructions, and/or the training status of the model associated with the set of instructions. Thus, as seen in instruction panel 1046-A, the instructions represented in that panel are currently selected for use with the assignment being edited and/or created via the assignment editing window 990, and the model associated with these instructions is sufficiently trained for auto-evaluation, also referred to herein as auto-scoring. In contrast, the instructions associated with panel 1046-B are not currently selected for use with the assignment being edited and/or created via the assignment editing window 990, and the model associated with these instructions is insufficiently trained to enable auto-evaluation. For instructions not currently selected for use with the assignment, the instruction panel 1046 can include a selection feature 1048, the manipulation of which can select the instructions of the associated instruction panel for use with the assignment being edited and/or created via the assignment editing window 990.

In some embodiments, a user, such as a teacher, logging in to the user interface can be directed to the landing window 970. At the landing window 970, the user can be provided with information identifying one or several courses with which the user is identified. When one of the one or several courses is selected, the user interface advances from the landing window 970 to the assignment window 976, which can display one or several assignments associated with the selected course and/or can allow the addition of a new assignment or the invitation of one or several students to the course. When creation of an assignment is selected, the user interface can advance to the assignment creation window 982, where the user can select a prompt for associating with the assignment. Upon selection of the prompt, the user interface can, in some embodiments, advance to the assignment editing window 990, wherein the user can provide additional information relevant to the assignment and/or prompt and/or can edit information associated with the assignment and/or prompt.

In some embodiments, a user such as a teacher can author a prompt using the user interface, and specifically using the assignment window 976, the assignment creation window 982, and the assignment editing window 990. In some embodiments, this prompt can be created in a prompt creation window and/or editing window 991. In some embodiments, the prompt creation window and/or editing window 991, while depicted in the assignment editing window 990, can be in any of the assignment window 976, the assignment creation window 982, and the assignment editing window 990. In some embodiments, the user can enter a prompt into the prompt creation and/or editing window 991 in any desired manner including, for example, typing, speech recognition, pasting, or the like. After the prompt has been entered into the prompt creation and/or editing window 991, the prompt can be stored and/or saved.

Figure 27:
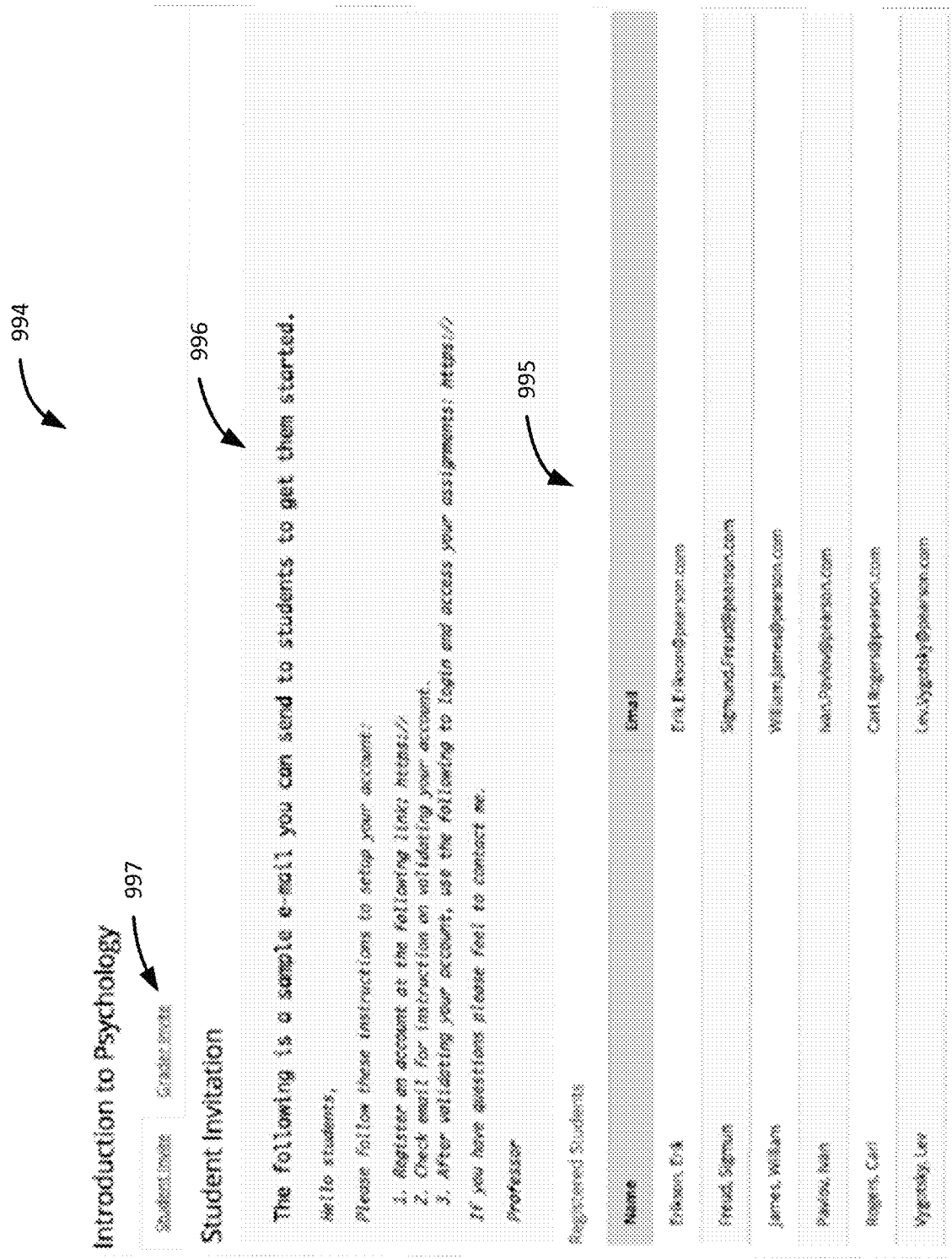
FIG. 27 is a graphical depiction of one embodiment of an invitation window.

In some embodiments, and in the event that the user manipulates the invitation button 980, the user interface can advance to an invitation window 994 as shown in FIG. 27. The invitation window 994 can include one or several features that can be used to invite one or several students to participate in a course and/or to receive an assignment and/or one or several graders to grade the assignment and/or to participate in grading of the assignment. In some embodiments, the invitation window 994 can include an recipient information portion 995 that can include information identifying one or several students and/or graders in the course and/or for inviting to the course. In some embodiments, the invitation window 994 can further include invitation text, which can include an invitation email. The invitation text can be displayed in the invitation portion 996 of the invitation window 994 and the invitation text can include instructions for a recipient to setup an account and/or to join the course and/or assignment to which the student is invited. The invitation window 994 can further include a recipient-class selection feature 997. The recipient-class selection feature 997 can be manipulated to select a class of recipients such as, for example, to select one or several students to participate in a course and/or to receive an assignment, and/or one or several graders to grade the assignment and/or to participate in grading of the assignment.

Figure 28:
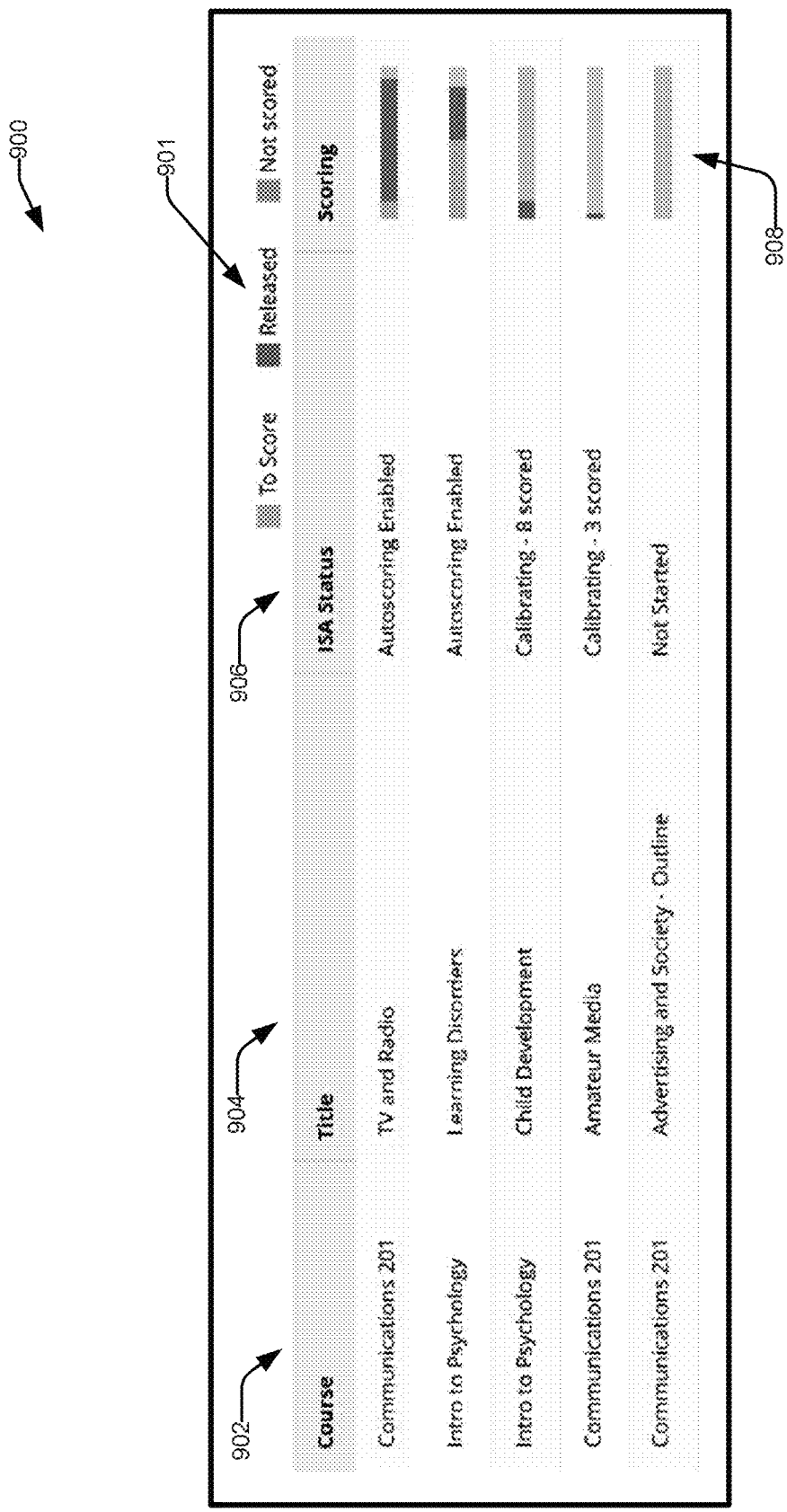
FIG. 28 is a graphical depiction of one embodiment of an overview interface.

FIG. 28 depicts one embodiment of an overview interface 900. The overview interface 900 The overview interface 900 can include a key portion 901 that can identify indicators of progress status of responses. The progress status is can include a first category of responses for scoring, a second category of responses having release scores, and the third category of unscored responses. As further seen, the overview interface 900 can contain a list comprising a plurality of rows arrange in a plurality of columns. The first column 902 can identify a course name, a second column 904 can identify a title of the provided assessment and/or of the provided prompt, a third column 906 can identify the status indicative of the training level of the model associated with the provided assessment and/or prompt, and a fourth column 908 can identify a breakdown of scoring of received responses.

Figure 29:
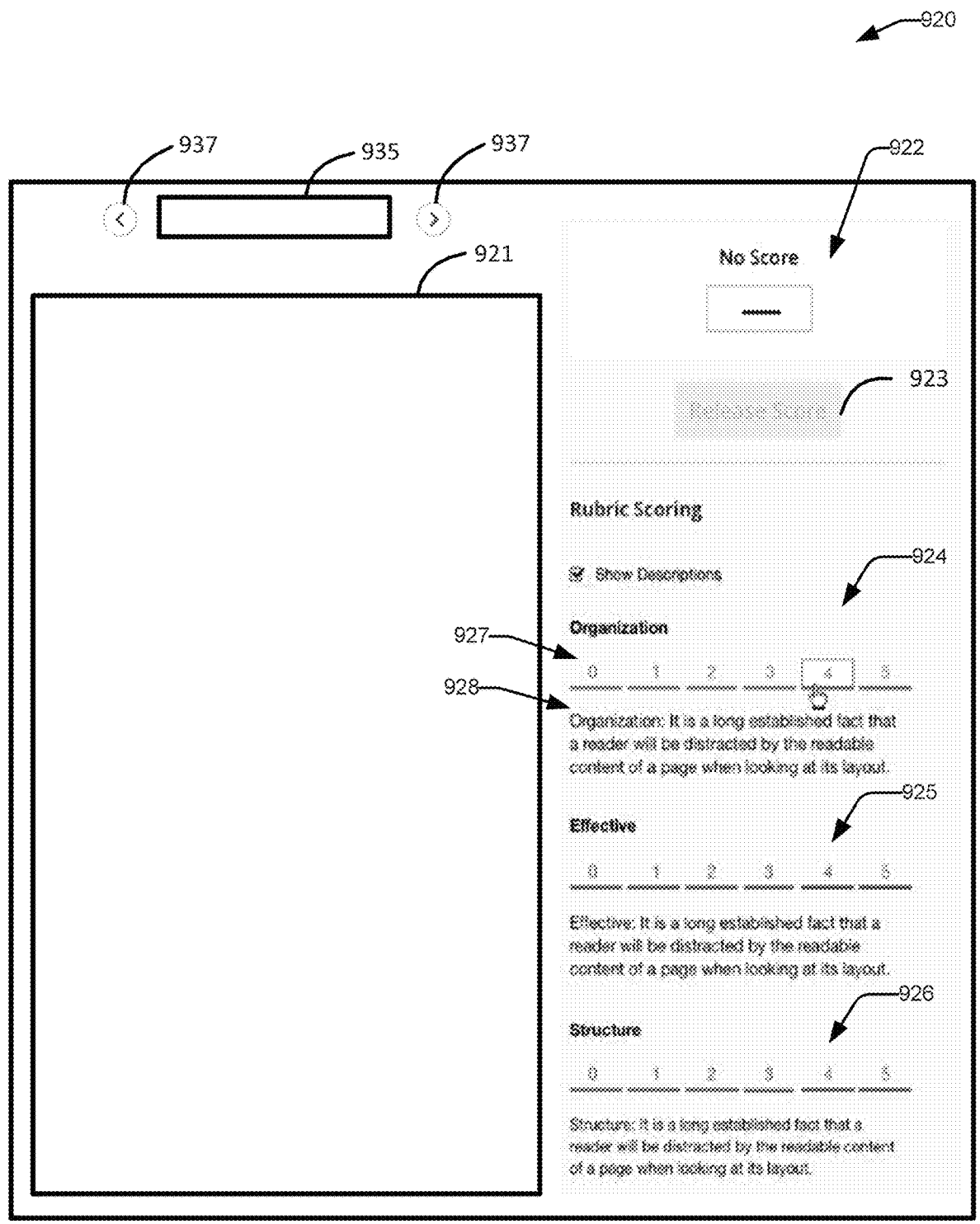
FIG. 29 is a graphical depiction of one embodiment of an evaluation interface without a score.

FIGS. 29 through 32, depict an embodiment of an evaluation interface 920. The evaluation interface 920 can be viewable by a teacher via the supervisor device 110. The evaluation interface 920 can be generated for a teacher to manually generate an evaluation of a response to a prompt and/or to review an auto-evaluation generated by a model to a response to a prompt. The evaluation interface 920 can include a text window 921, wherein a received response can be displayed to allow evaluation by the teacher and/or review by the teacher of an auto-evaluation of a response generated by the evaluation model. The evaluation interface can further include a prompt score window 922, which can display a score for a prompt which score can be calculated based on inputs received at evaluation portions 924, 925, 926. In some embodiments, the score can be calculated according to a weighting function created by the teacher, and/or according to a machine learning model trained to generate a score for the assessment and/or prompt based on inputs received at the evaluation portions 924, 925, 926. As seen in FIG. 29, the evaluation portions 924, 925, 926 can include an input feature 927, which can allow the teacher to input a score for each of the evaluation portions 924, 925, 926, and the display feature 928 that displays the evaluation component associated with the evaluation portion 924, 925, 926.

The evaluation interface 920 can further include an accept button 923, which, when manipulated, can indicate completion of scoring for an assignment and/or prompt, and can finalize scoring for the assignment and/or prompt. In some embodiments, upon manipulation of the accept button 923, the score can be stored, and in some embodiments, manipulation of the accept button 923 can allow the score to be viewable by the student who authored the response associated with the score. In some embodiments, the evaluation interface 920 can include a release button, the manipulation of which can allow the score to be viewable by the student who authored the response associated with the score.

Figure 30:
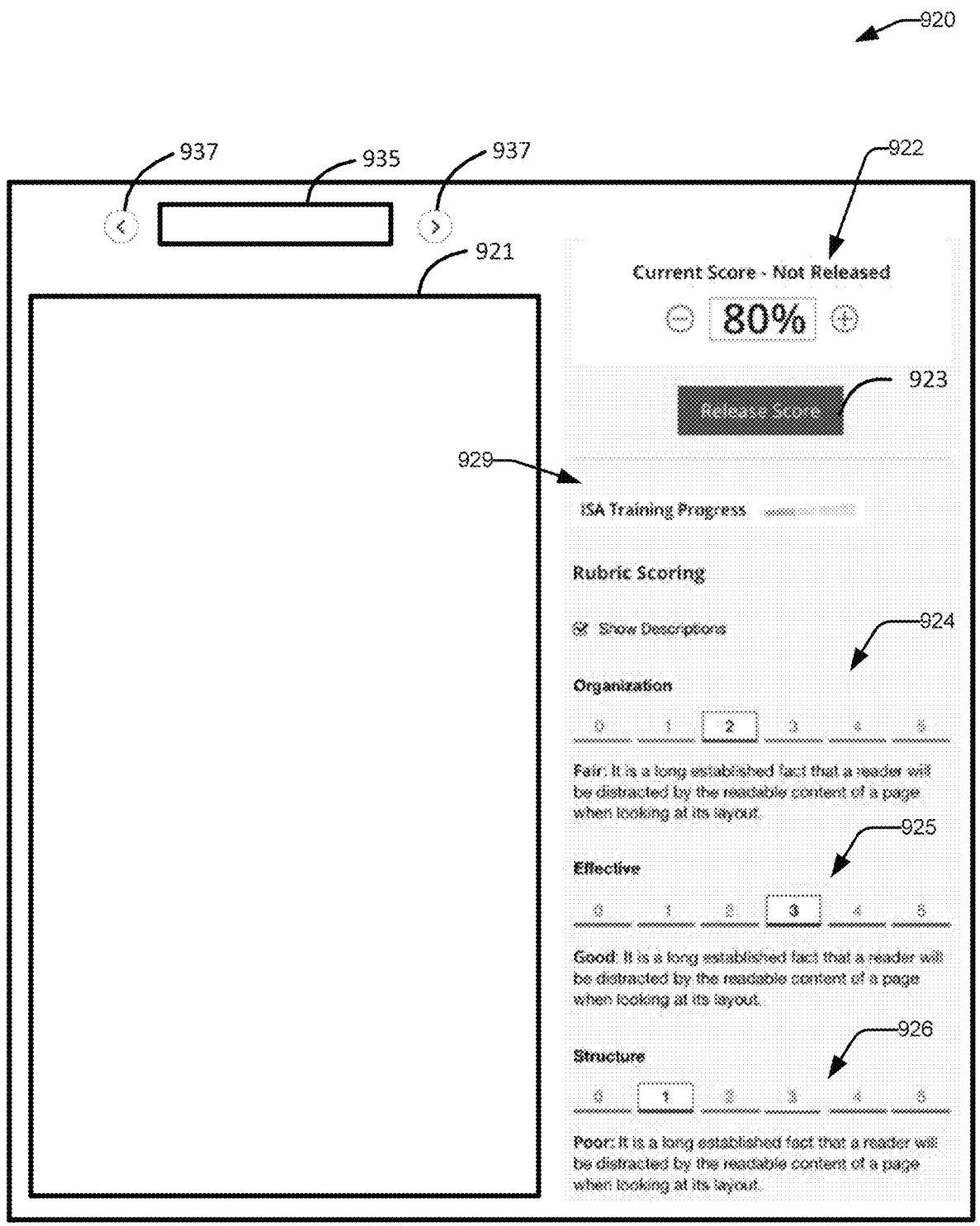
FIG. 30 is a graphical depiction of one embodiment of an evaluation interface with a score.

In FIG. 29, the evaluation interface 920 is shown before inputs have been provided with the input features 927 for each of the evaluation portions 924, 925, 926, whereas in FIG. 30, the evaluation interface and 20 is shown after inputs have been provided with the input features 927 for each of the evaluation portions 924, 925, 926. As seen in FIG. 30, and as a result of the providing of inputs with the input features 927, a score for the assignment and/or prompt has been generated, and is displayed in the prompt score window 922. As further seen in FIG. 30, the evaluation interface 920 can include the training level indicator 929. The training level indicator can identify the progress towards the training of one or several models associated with the prompt being evaluated. In some embodiments, the view shown in FIG. 30 can be also provided to the teacher when the system has begun using the trained and/or partially trained model for evaluation. In such an embodiment, the teacher can use this window to provide feedback to the model, which feedback can be in the form of an acceptance of the score provided by the model or a modification to all or portions of the score provided by the model. In some embodiments, for example, the user use the input features 927 of one or more of the evaluation portions 924, 925, 926 to change all or portions of the score of the received response. These changes and/or modifications to all or portions of the score can then be provided to the system for use in further training the model.

Figure 31:
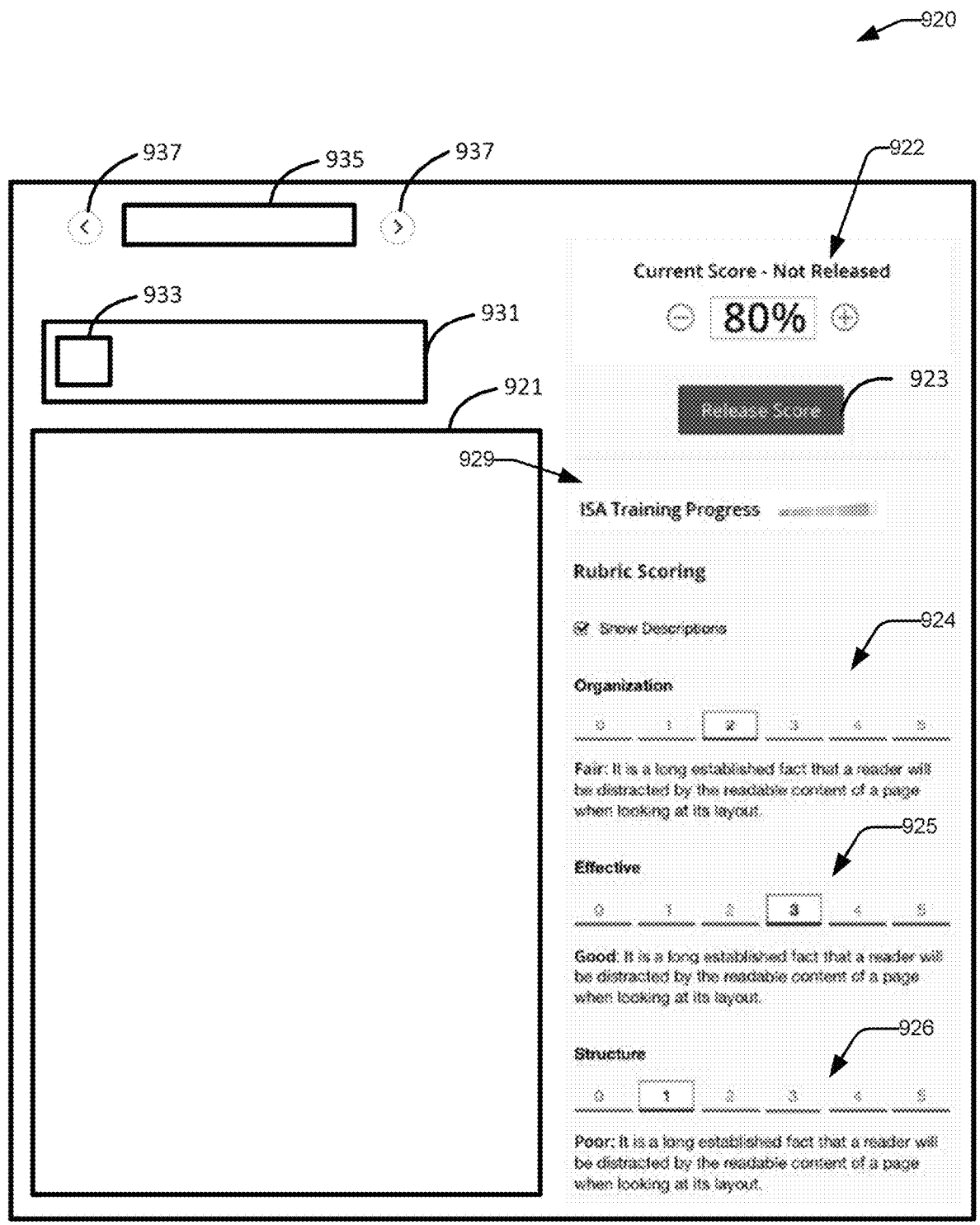
FIG. 31 is a graphical depiction of one embodiment of an evaluation interface having a training level indicator showing a trained model.

As seen in FIG. 31, when training of the model is determined to be sufficient, the training level indicator 929 can indicate sufficiency of training. In some embodiments, when training of the model for auto-evaluation of the prompt is sufficient, a launch window 931 can be generated in the evaluation interface 920, which launch window can include an indicator of completion of the training of the model. In some embodiments, the launch window can be any desired alert, and more specifically can be any desired visual alert. In some embodiments, this indicator can comprise a message indicating launch of auto-evaluation of responses to the prompt. In some embodiments, this message can further indicate that the teacher no longer needs to generate evaluations of responses, but merely review auto-evaluations of responses generated by the trained model. In some embodiments, the launch window 931 can further include a feature 933, the manipulation of which initiates auto-evaluation of responses to the prompt. In some embodiments, the feature 933 can comprise a button, a toggle, a slider, a wheel, a check-box, or any other graphic manipulable by the user to receive a user input.

Figure 32:
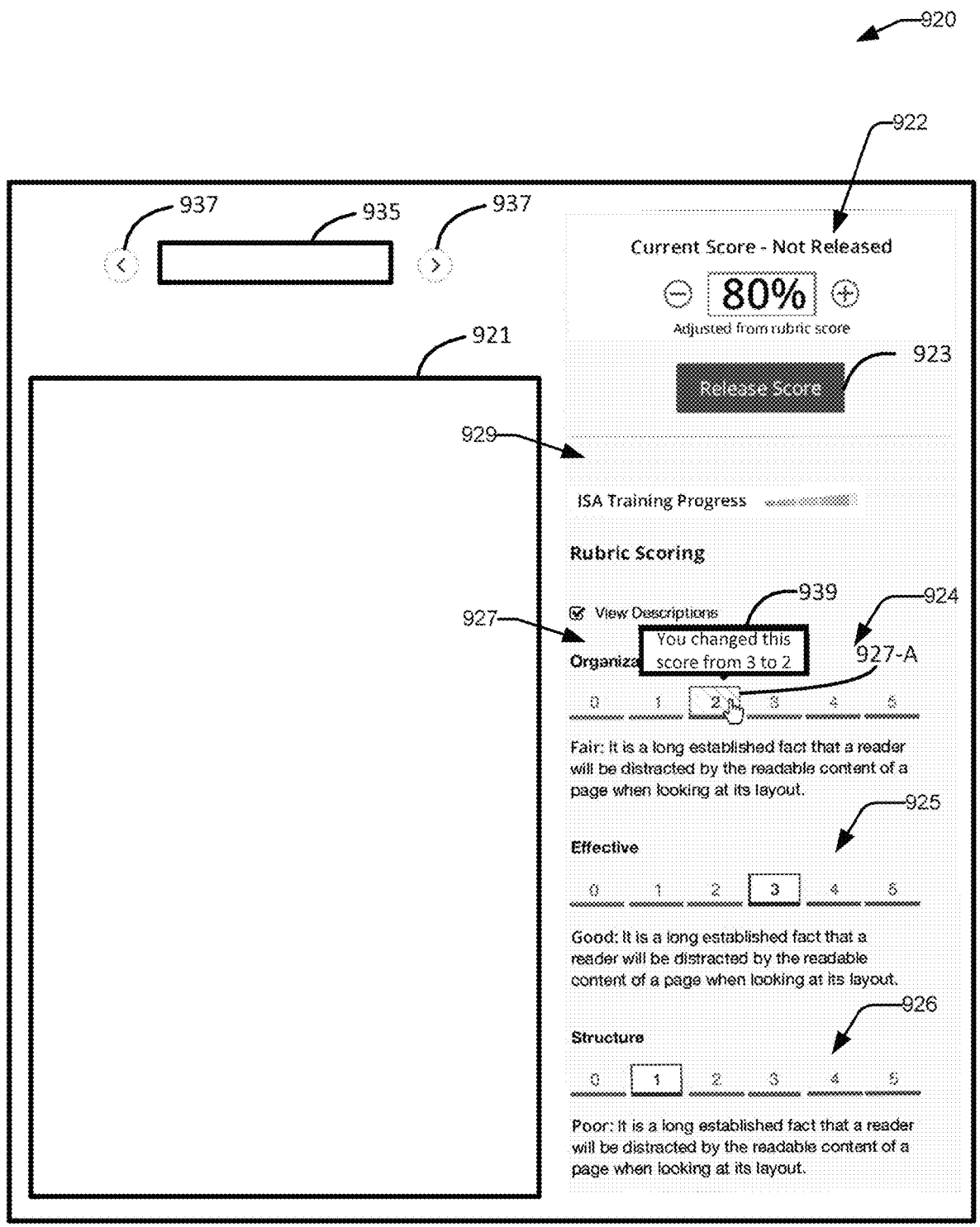
FIG. 32 is a graphical depiction of one embodiment of an evaluation interface used for review of an auto-evaluation of a response.

FIG. 32 depicts an embodiment of the evaluation interface 920 used for review of auto-evaluation scores from prompt responses generated by a model trained for generating those auto-evaluations. The evaluation interface 920 can include an identification window 935 which can display an identifier of the author of the response being evaluated and/or having its auto-evaluation reviewed. In some embodiments, this identifier can be a student name, a student identification number, a user name, or the like. The evaluation interface 920 can further include navigation features 937 which can change the response displayed in the evaluation interface 920. Specifically, for example, in an embodiment in which multiple response have been received for a prompt, manipulation of navigation features 937 can change the response displayed to the user in the evaluation interface 920, and specifically displayed to the user in the text window 921 of the evaluation interface 920.

As seen in FIG. 32, the evaluation interface 920 can provide a change window 939 which can include a change message indicating when a score of an evaluation component 924, 925, 926 has been changed. In some embodiments, and as seen in FIG. 29, the a visual appearance of the input feature 927 indicating a change in score for an evaluation component can change. Specifically, input feature 927-A associated with evaluation component 924 having a score changed from 3 to 2 has a changed appearance—having diagonal line fill—as compared to the others of the input features 927 not indicating a changed score.

In some embodiments, the evaluation interface 920 can be generated upon selection of a response for manual evaluation by the teacher. The teacher can input scores to one or several evaluation portions 924, 925, 926 via the input features. Based on these input scores, a score for the assignment and/or prompt can be generated and can displayed in the prompt score window 922. In some embodiments, the evaluation interface 920 can be generated to enable review of auto-evaluation of one or several prompts. In such an embodiment, the score from the auto-evaluation for the assignment and/or prompt can be displayed in the prompt score window 922, and input features 927 can be configured to indicate scores for one or several evaluation portions 924, 925, 926 generated in the auto-evaluation and used to determine the assignment and/or prompt score. In some embodiments, a teacher can modify a score for the assignment and/or prompt and/or can modify a score for one or several of the evaluation portions 924, 925, 926 via manipulation of one or several of the input features 927. In some embodiments, and as a result of the modification of the score via manipulation of one or several of the input features 927, the evaluation interface 920 can graphically depict the one or several of the input features 927 that were manipulated such as, for example, change a visual attribute of each of those one or several input features 927 that were manipulated. An updated assignment and/or prompt score can be generated based on the modified score for the one or several evaluation portions, which modified score can be displayed in the prompt score window 922.

Figure 33:
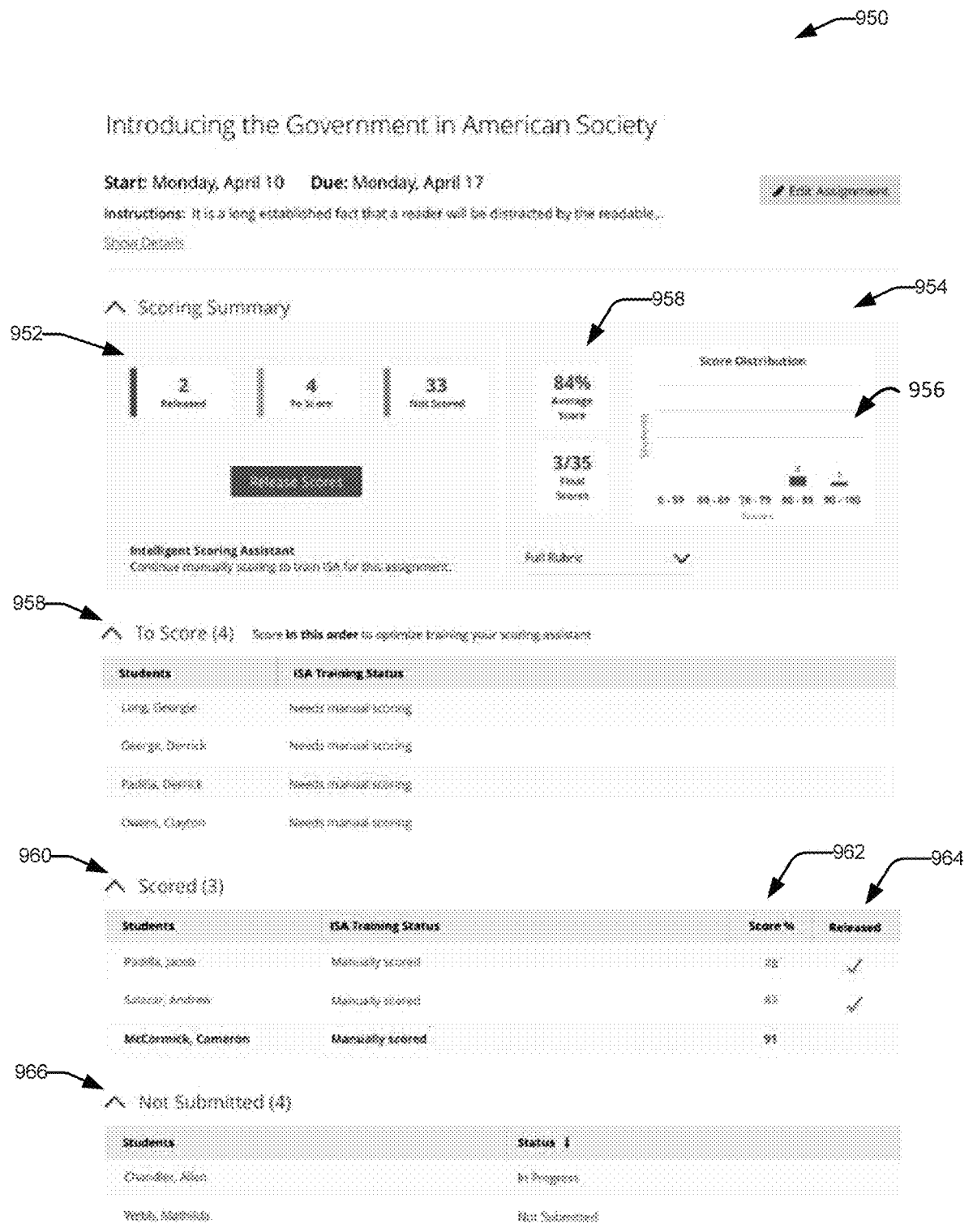

In FIG. 33, an output data interface 950 is shown. The output data interface 950 can be viewable by a teacher via the supervisor device 110. The output data interface 950 can provide output data generated in block 722 of FIG. 15 to the teacher as a part of the step of block 724 of FIG. 15. The output data interface 950 can include a scoring summary window 952 which can identify scoring status of responses received to a provided prompt. These statuses can include, for example, released, to score, and/or not scored. The output data interface 950 can further include a distribution window 954, which can include a graphical display, 956 of a distribution of evaluations of responses. The distribution window 954 can further include data windows 958, which can, for example, characterize an average score and/or a fraction of received responses that have been evaluated.

The output interface 950 can further include a task window 958, which can identify responses for scoring and specifically responses for manual scoring. In some embodiments, responses for manual scoring identified in the task window 958 can be responses selected for manual scoring as part of initial training of the model and/or responses selected for manual scoring to improve training of the model. The output interface can include a scored window 960, which can identify responses that have been scored, and can include a first column 962 identifying an evaluation result for a response, and a second column 964 identifying whether the evaluation result is released. The output interface 950 can further include an in completed response window 966, which can identify students who have yet to complete an/or provide a response to the provided prompt.

Figure 34:
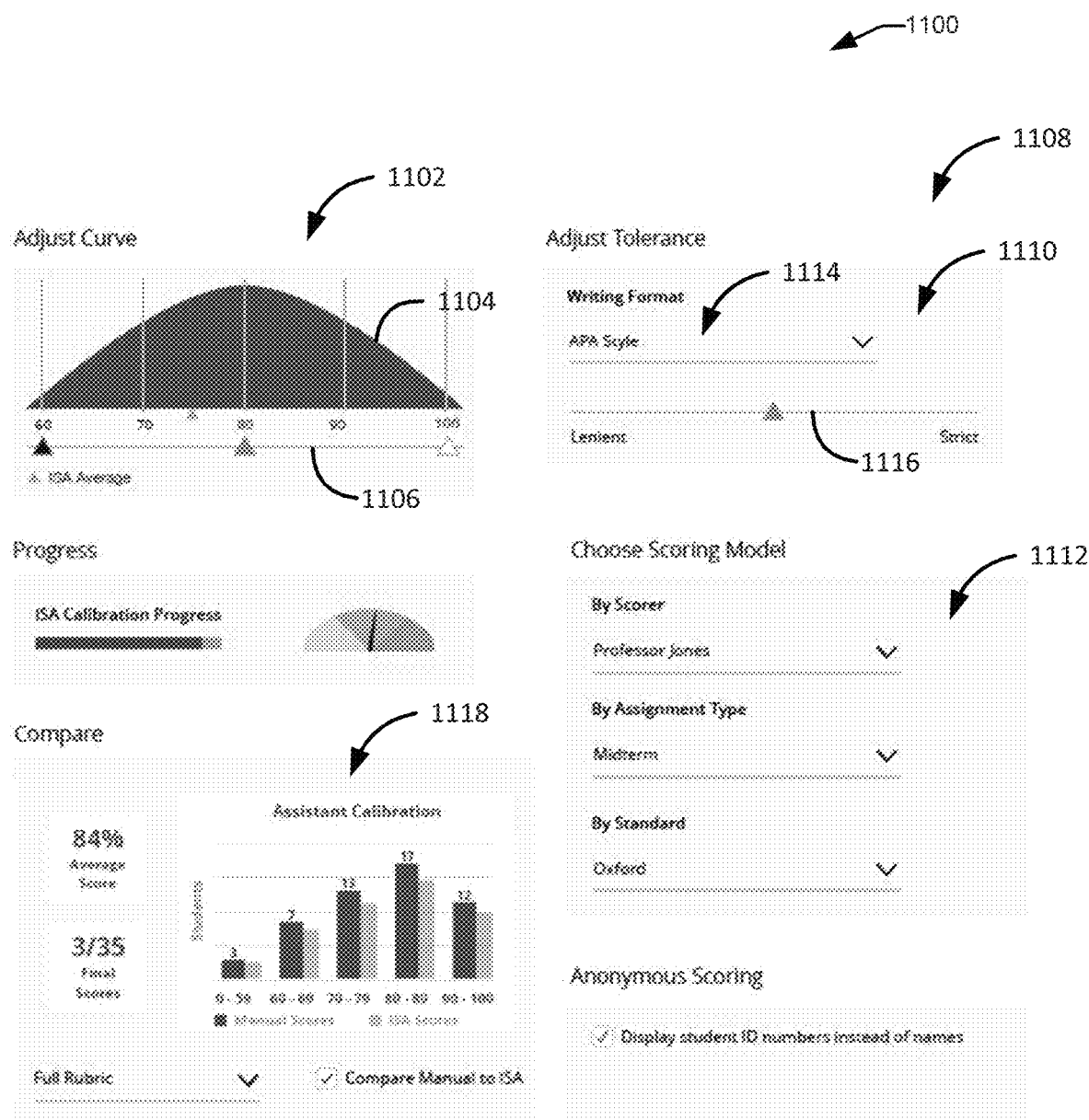
FIG. 34 is a graphical depiction of one embodiment of an output panel.

With reference to FIG. 34, one embodiment of an output panel 1100 is shown. The output panel 1100 can be generated as a panel and/or window within the user interface and can be used as outlined in FIG. 20. The output panel 1100 can include a performance modification interface 1102. The performance modification interface 1102 can include one or several windows and/or features. As seen in FIG. 34, the performance modification interface 1102 include a graphical depiction of an attribute of the evaluated plurality or responses, and particularly includes a depiction of a distribution 1104 of evaluation scores. The performance modification interface 1102 further include an input feature 1106, whereby a user can change one or several attributes of the distribution, including, for example, the distribution shape, the distribution width, and/or the distribution center.

The output panel 1100 can further include a model panel 1108 that can include information characterizing at least one attribute of the evaluation model. This at least one attribute of the evaluation model can include at least one of: a generic evaluation parameter shown in an evaluation parameter panel 1110; and a model identifier shown in a model identifier panel 1112.

In some embodiments, the model panel 1108, and specifically the evaluation parameter panel 1110 can identify one or several generic evaluation parameters such as, for example, one or several evaluation parameters used by the current model. The model panel includes the selection feature 1114 which is a drop-down menu. The selection feature of FIG. 34 displays the selected evaluation parameter. In some embodiments, the model panel 1108 include the input feature 1116 through which the user controls stringency of application of the selected evaluation parameter.

The output panel 1100, and specifically the model panel 1108 includes the model identifier panel 1112, also referred to herein as the filter panel 1112. The user can, via the model identifier panel 1112, select one or several filters for application to the evaluation model. These one or several filters can be predetermined model filters that can modify the output of the evaluation model. For example, a filter may identify one or several assignment types such as a test, a quiz, practice, homework, or the like. In some embodiments, each of these filters may have a different distribution shape, different center, different width, or the like. In some embodiments, selection of one or several of these filters can eliminate the need for the user to custom modify input features, but can rather apply preset inputs to the evaluation model. In some embodiments, these one or several filters can be selected via one or several drop-down menus.

The output panel 1100 can further include a comparison panel 1118. The comparison panel 1118 can provide a graphical depiction of a comparison of evaluations generated by the evaluation model and evaluation generated by the user. In some embodiments, this can include a bar graph as shown in FIG. 34.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for interface-based evaluation output customization, the system comprising:
    a memory comprising:
        a content library database containing a plurality of prompts and evaluation data associated with each of the plurality of prompts; and
        a model database comprising a plurality of evaluation models for automated evaluation of received user responses, wherein the evaluation data of each of the plurality of prompts comprises a pointer linking to the associated evaluation model; and
    at least one processor configured to:
        receive a plurality of responses from a plurality of users to a provided prompt from the plurality of prompts;
        evaluate the received plurality of responses with an evaluation model from the plurality of evaluation models, the evaluation model comprising a machine learning model trained to output a score relevant to at least portions of a response;
        generate evaluation data characterizing at least one attribute of the evaluated plurality of responses;
        generate an output panel comprising at least one performance modification interface, wherein the at least one performance modification interface identifies an attribute of the evaluated plurality of responses, and wherein the at least one performance modification interface comprises an input feature, wherein the input feature is user manipulable to directly change the attribute of the evaluated plurality of responses after receipt of the plurality of responses;
        receive an input via the input feature;
        modify the attribute of the evaluated plurality of responses; and
        generate updated evaluation data based at least in part on the modified attribute of the evaluated plurality of responses.

2. The system of claim 1, wherein the attribute of the evaluated plurality of responses comprises a score distribution generated by the evaluation model.

3. The system of claim 2, wherein the input received via the input feature changes at least one of: a shape of the score distribution and a width of the score distribution.

4. The system of claim 2, wherein evaluating the received responses comprises generating a first score for each of the received response; and wherein generating updated evaluation data comprises generating a second score for each of the received responses, wherein the second score is generated at least in part based on the input received via the input feature.

5. The system of claim 4, wherein the output panel further comprises a model panel characterizing at least one attribute of the evaluation model.

6. The system of claim 5, wherein the at least one attribute of the evaluation model comprises at least one of: a generic evaluation parameter; and a model identifier.

7. The system of claim 6, wherein the generic evaluation parameter identifies an application stringency.

8. The system of claim 7, wherein the generic evaluation parameter comprises at least one of: a formatting style; a proficiency level; and a language.

9. The system of claim 7, wherein the output panel comprises selection feature whereby a user can select one of a plurality of generic evaluation parameters, and wherein the evaluation model training is based at least in part of each of the plurality of generic evaluation parameters.

10. A method for interface-based evaluation output customization, the method comprising:
    receiving a plurality of responses from a plurality of users to a provided prompt from a plurality of prompts included in a content library database;
    evaluating the received plurality of responses with an evaluation model from a plurality of evaluation models included in a model database, the evaluation model comprising a machine learning model trained to output a score relevant to at least portions of a response;
    generating evaluation data characterizing at least one attribute of the evaluated plurality of responses;
    generating an output panel comprising at least one performance modification interface, wherein the at least one performance modification interface identifies an attribute of the evaluated plurality of responses, and wherein the at least one performance modification interface comprises an input feature, wherein the input feature is user manipulable to directly change the attribute of the evaluated plurality of responses after receipt of the plurality of responses;
    receiving an input via the input feature;
    modifying the attribute of the evaluated plurality of responses; and
    generating updated evaluation data based at least in part on the modified attribute of the evaluated plurality of responses.

11. The method of claim 10, wherein the attribute of the evaluated plurality of responses comprises a score distribution generated by the evaluation model.

12. The method of claim 11, wherein the input received via the input feature changes at least one of: a shape of the score distribution; a width of the score distribution; and a center of the score distribution.

13. The method of claim 11, wherein evaluating the received responses comprises generating a first score for each of the received response; and wherein generating updated evaluation data comprises generating a second score for each of the received responses, wherein the second score is generated at least in part based on the input received via the input feature.

14. The method of claim 13, wherein the output panel further comprises a model panel characterizing at least one attribute of the evaluation model.

15. The method of claim 14, wherein the at least one attribute of the evaluation model comprises at least one of: a generic evaluation parameter; and a model identifier.

16. The method of claim 15, wherein the generic evaluation parameter identifies: a selected generic evaluation parameter; and an application stringency.

17. The method of claim 16, wherein the generic evaluation parameter comprises at least one of: a formatting style; a proficiency level; and a language.

18. The method of claim 16, wherein the output panel comprises selection feature whereby a user can select one of a plurality of generic evaluation parameters, and wherein the evaluation model training is based at least in part of each of the plurality of generic evaluation parameters.

* * * * *